US012489397B2

(12) United States Patent
Yoscovich et al.

(10) Patent No.: US 12,489,397 B2
(45) Date of Patent: Dec. 2, 2025

(54) SYSTEM AND METHODS FOR DETERMINING CHARACTERISTICS OF A PHOTOVOLTAIC PANEL

(71) Applicant: Solaredge Technologies Ltd., Herzeliya (IL)

(72) Inventors: Ilan Yoscovich, Givatayim (IL); Yoav Galin, Raanana (IL); Ohad Gidon, Netanya (IL); Roy Shkoury, Hadera (IL); Gideon Eitan, Haifa (IL); Yan Dogadko, Petah Tikva (IL); Barak Hagbi, Harish (IL); Ori Aphek, Ramat Gan (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 18/636,897

(22) Filed: Apr. 16, 2024

(65) Prior Publication Data
US 2024/0356486 A1     Oct. 24, 2024

Related U.S. Application Data

(60) Provisional application No. 63/496,549, filed on Apr. 17, 2023.

(51) Int. Cl.
*H02S 40/34*     (2014.01)
*H02J 7/35*     (2006.01)
(Continued)

(52) U.S. Cl.
CPC ............... *H02S 40/34* (2014.12); *H02J 7/35* (2013.01); *H02S 40/32* (2014.12); *H02S 40/36* (2014.12); *H02S 50/15* (2014.12)

(58) Field of Classification Search
CPC ..................... H02S 40/30–38; H02S 50/00–15
(Continued)

(56) References Cited

U.S. PATENT DOCUMENTS 9,966,899 B2    5/2018   Stratakos et al.
2010/0201374 A1   8/2010   Vasilyev et al.
(Continued)

FOREIGN PATENT DOCUMENTS

JP          6999911 B1     1/2022
WO    WO-2022206569 A1 *   10/2022     ............. H02S 50/10

OTHER PUBLICATIONS

WO-2022206569-A1 English (Year: 2022).*
(Continued)

*Primary Examiner* — Bach T Dinh
(74) *Attorney, Agent, or Firm* — Banner & Witcoff, Ltd.

(57) ABSTRACT

Systems and methods are described herein for providing power for enabling electroluminescence imaging of photovoltaic panels. The system may comprise a diode in a power converter, where the diode may restrict reverse current flow to the photovoltaic panel. The system may comprise a power device configured to be coupled to a photovoltaic panel. The power device may comprise an auxiliary power circuit which may provide power to the power device from the photovoltaic panel or form a power source connected to a power system controller. The power device may control a switch to provide a current path for reverse current to flow to the photovoltaic panel. An imager may capture an image of the panel.

19 Claims, 28 Drawing Sheets

(51) Int. Cl.
*H02S 40/32* (2014.01)
*H02S 40/36* (2014.01)
*H02S 50/15* (2014.01)

(58) Field of Classification Search
USPC .................................................. 136/243–265
See application file for complete search history.

(56) References Cited

U.S. PATENT DOCUMENTS

| | | |
|---|---|---|
| 2011/0153228 A1 | 6/2011 | Ahmad et al. |
| 2018/0287484 A1* | 10/2018 | Braginsky ............... H02J 3/381 |
| 2021/0111666 A1 | 4/2021 | Shkoury et al. |
| 2021/0126580 A1 | 4/2021 | Moslehi |
| 2022/0109400 A1* | 4/2022 | Xu ........................ H02M 7/537 |

OTHER PUBLICATIONS

J. Ballestin-Fuertes et al., "Novel Utility-Scale Photovoltaic Plant Electroluminescence Maintenance Technique by Means of Bidirectional Power Inverter Controller," Applied Sciences, vol. 10, Issue 9, Apr. 2020.

L. Koester et al., "Development of Daylight Photoluminescence Technique for Photovoltaic Modules and Investigation of Temperature Dependency," 37th European Photovoltaic Solar Energy Conference and Exhibition, Sep. 2020.

J. Morales-Aragones et al., "Online Distributed Measurement of Dark I-V Curves in Photovoltaic Plants," Applied Sciences, vol. 11, Issue 4, Feb. 2021.

Mar. 10, 2025—European Search Report—EP App. No. 24170882.5.

* cited by examiner

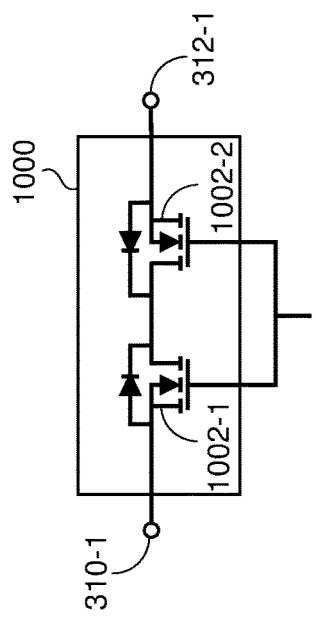
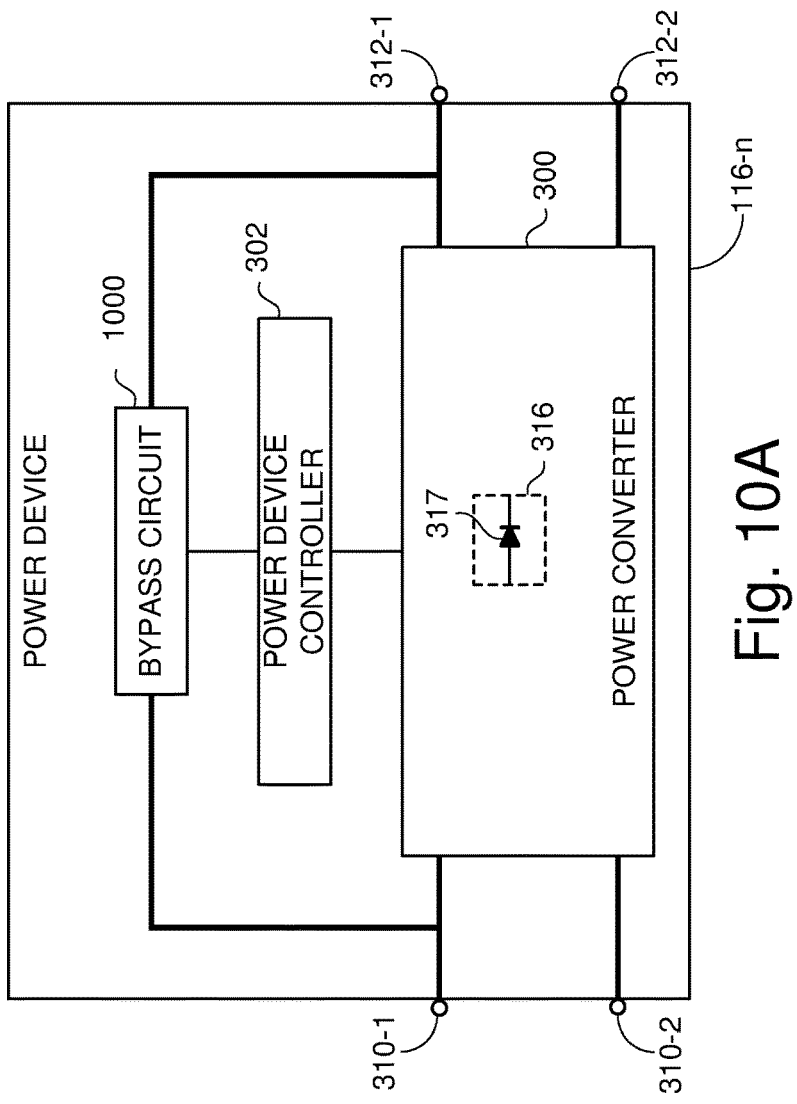
Fig. 10A
Fig. 10B

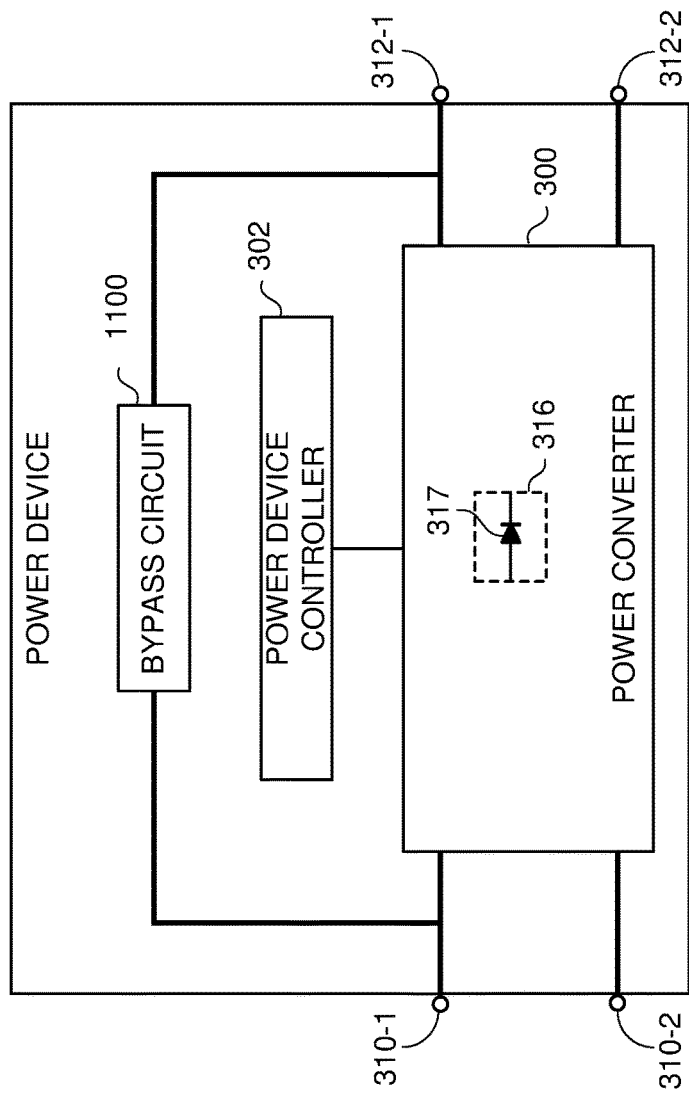
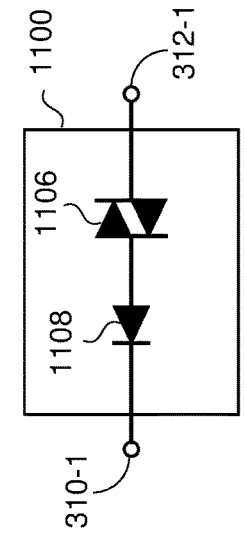
Fig. 11A
Fig. 11C
Fig. 11B

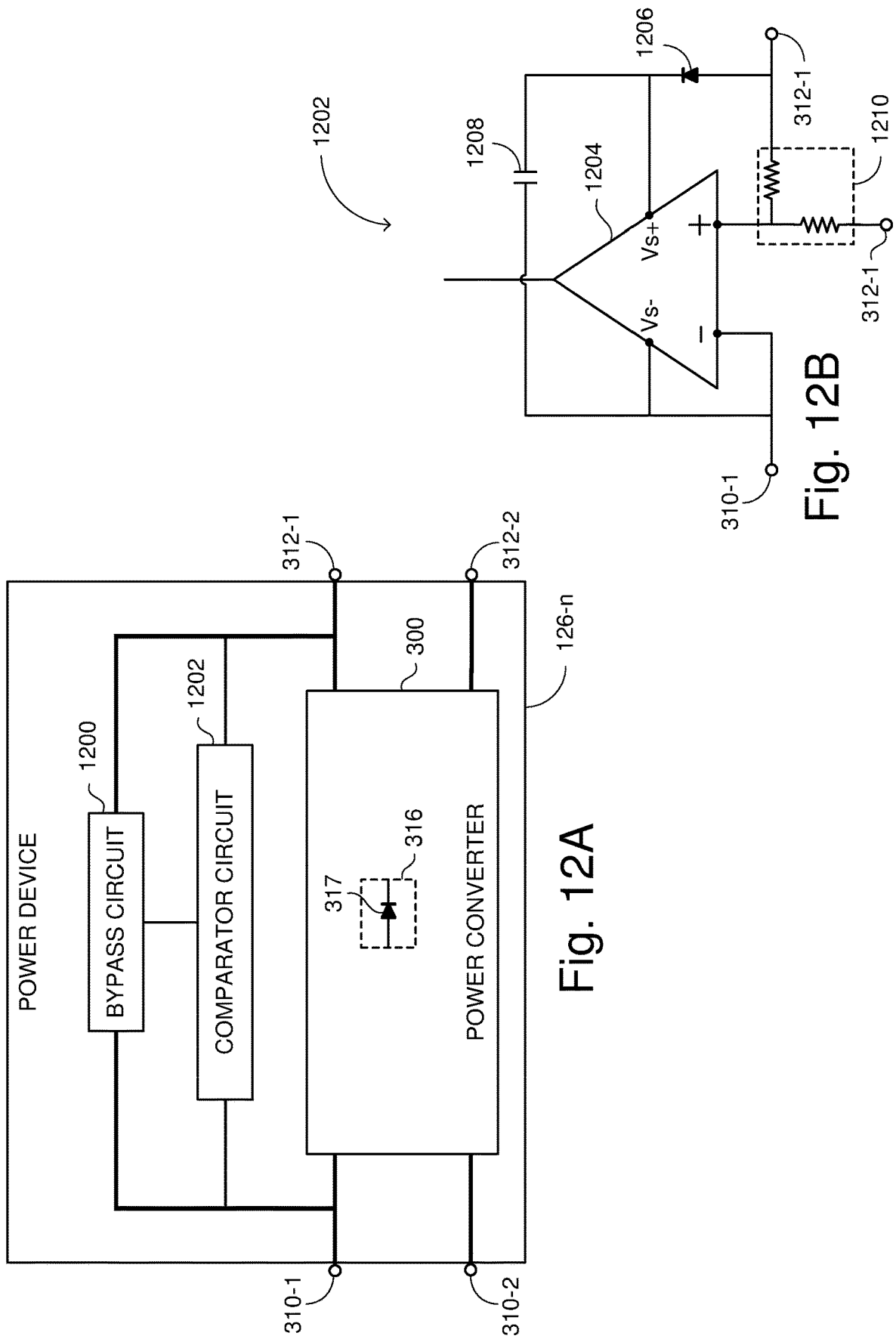

SYSTEM AND METHODS FOR DETERMINING CHARACTERISTICS OF A PHOTOVOLTAIC PANEL

CROSS REFERENCE TO RELATED APPLICATIONS

The present application claims priority benefit to U.S. Provisional Application 63/496,549, filed Apr. 17, 2023, which is incorporated by reference in its entirety

FIELD OF THE DISCLOSURE

The disclosure relates generally to photovoltaic power systems. More specifically, the disclosure relates to a system and method for capturing an image to determine a characteristic of a photovoltaic module.

BACKGROUND OF THE DISCLOSURE

Photovoltaic panels in real-world environments may be subjected to physical damage (e.g., cracks in photovoltaic cells, manufacturing defects, defects in the materials of the panels, disconnected conductors, hot spots, and the like). Such physical damage may affect the performance of the photovoltaic panel and may even be a safety concern (e.g., hot spots may lead to fire). It is beneficial to evaluate the physical state of the photovoltaic panels. However, when photovoltaic panels are wired into a power generation system, such evaluation can be difficult due to the panel's connection to other devices, such as power converters, system controllers, loads, etc.

BRIEF SUMMARY OF THE DISCLOSURE

The following presents a simplified summary of the disclosure to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

The disclosure herein relates to devices, systems, and methods for determining a characteristic or characteristics of a photovoltaic panel. Determining a characteristic of a photovoltaic panel may comprise evaluating a physical state of a photovoltaic panel, using, for example, electroluminescence imaging or dark I-V curve measurements. Determining a characteristic or characteristics of a photovoltaic panel may comprise determining a physical location of the photovoltaic panel using electroluminescence imaging. Both electroluminescence imaging and dark I-V curve measurements may be performed when the photovoltaic panel does not produce power (e.g., during low irradiance conditions such as during the night). Performing I-V curve measurements when the photovoltaic panel does not produce power may be referred to as "dark I-V curve" measurements. Performing electroluminescence imaging and/or dark I-V curve measurements may include providing a reverse current to the photovoltaic panel.

According to the disclosure herein, providing reverse current to the photovoltaic panel during a low irradiance condition, for electroluminescence imaging purposes, and/or dark I-V curve measurements, may utilize a power device, where the power device may comprise an auxiliary power circuit that provides power to the power device from either the photovoltaic panel or the power source. The disclosure provides a power device that may comprise a diode restricting current flowing from the power source toward a photovoltaic panel (e.g., thereby limiting an auxiliary power circuit of the power device from operating). The power device may comprise a controller, which may control a switch to a conducting state, wherein the switch is connected across the diode, thus providing a path for current to flow from the power source to the photovoltaic panel. The switch may be a part of a power converter, and the controller may control the power converter to provide reverse current to the photovoltaic panel.

The disclosure further provides a system comprising a plurality of photovoltaic panels, where one or more of the photovoltaic panels may be coupled to a corresponding one or more power devices. The one or more power devices may be coupled to a power system controller. The power system controller may be coupled to a power source and to an imager. The power converter may comprise a diode, which may restrict a reverse current from flowing to the corresponding photovoltaic panel. The power device may also comprise an auxiliary power circuit, which may provide power to the power device from either the photovoltaic panel or the power source. The power device may comprise a controller that controls a switch to a conducting state, wherein the switch is connected across the diode, thus providing a path for current to flow from the power source to the photovoltaic panel.

Other aspects of the disclosure provide a method for capturing images for electroluminescence analysis in a photovoltaic power system. The method may comprise a power system controller determining to provide power, from a power source to a power device, for electroluminescence imaging of a photovoltaic panel. The photovoltaic panel may be connected to the power device. The power device may comprise a diode restricting current flow from the power source toward the photovoltaic panel. The method may comprise the power device detecting the receipt of auxiliary power from the power source and the receipt of an instruction to provide power to the photovoltaic panel. The method may comprise controlling the power device to provide power to the photovoltaic panel based on determining that the photovoltaic panel is not producing power. Controlling the power device to provide power to the photovoltaic panel may comprise controlling a switch to provide a current path from the power source to the photovoltaic panel. The method may also comprise controlling, by the power system controller, an imager to capture an image of the photovoltaic panel for electroluminescence analysis and analyzing, by a processor, the captured image to determine a physical state of the photovoltaic panel.

Other aspects of the disclosure may provide a method for performing dark I-V curve measurements, wherein a power system controller may produce a plurality of voltage levels to a string of serially connected power devices. Responsive to a voltage at its output terminals, a power device in the string may create a path for current to flow to a corresponding photovoltaic panel. The power system controller may increase the voltage level across the string, resulting in a reverse current flowing through the photovoltaic panel. Each power device may measure the voltage level across its output terminals and the reverse current through the corresponding photovoltaic panel. The power device or the power system controller may use these measurements for photovoltaic panel characterization.

Other aspects of the disclosure may provide a method for performing dark I-V curve measurements, wherein a power system controller may produce a voltage level to a string of serially connected power devices and transmit a plurality of power levels to each of the power devices in the string. Responsive to a voltage at its output terminals and based on the received power levels from the power system controller, a power device in the string may convert power to produce a voltage across, and a reverse current through, the corresponding photovoltaic panel. Each power device may measure the voltage level across, and the reverse current through, the corresponding photovoltaic panel. The power device or the power system controller may use these measurements for photovoltaic panel characterization.

Other aspects of the disclosure provide a method for capturing electroluminescence images for determining a physical location of a photovoltaic panel. The method may comprise a power system controller determining to provide power from a power source to a power device for electroluminescence imaging of a photovoltaic panel. The photovoltaic panel may be connected to the power device. The method may comprise the power device determining the receipt of auxiliary power from the power source and the receipt of instruction to provide power to the photovoltaic panel. The method may comprise controlling the power device to provide a reverse current to the photovoltaic panel. Controlling the power device to provide reverse current to the photovoltaic panel may comprise controlling a switch to provide a current path from the power source to the photovoltaic panel. The method may also comprise controlling, by the power system controller, an imager to capture an image of the photovoltaic panel for electroluminescence analysis and analyzing, by a processor, the captured image to determine a physical location of the photovoltaic panel. The method may also comprise determining an association between the photovoltaic panel and the corresponding power device.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein:

FIG. 10A shows an example of a power device with a bypass circuit according to aspects of the disclosure herein.

FIG. 10B shows an example of a bypass circuit according to aspects of the disclosure herein.

FIG. 11A shows an example of a power device with a bypass circuit according to aspects of the disclosure herein.

FIG. 11B shows an example of a bypass circuit according to aspects of the disclosure herein.

FIG. 11C shows an example of a bypass circuit according to aspects of the disclosure herein.

FIG. 12A shows an example of a power device with a bypass circuit according to aspects of the disclosure herein.

FIG. 12B shows an example of a comparator circuit according to aspects of the disclosure herein.

DETAILED DESCRIPTION OF THE DISCLOSURE

Figure 1A:
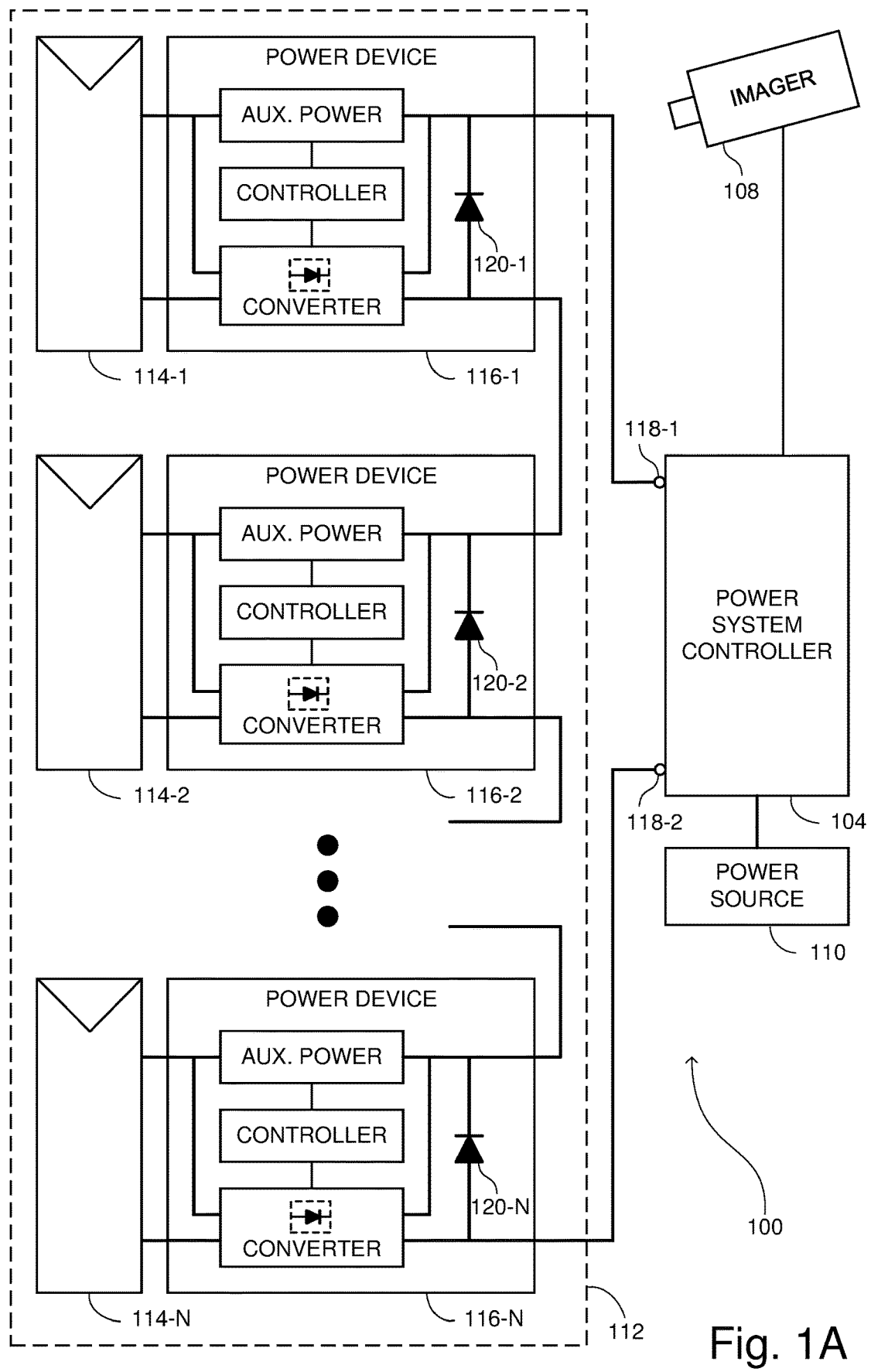
FIG. 1A shows an example of a power system where each photovoltaic panel may be connected to a corresponding power device according to aspects of the disclosure herein.

In the following description, reference is made to the accompanying drawings, which form a part hereof, and in which is shown by way of illustration how the disclosure may be practiced. It is to be understood that other embodiments may be utilized and structural and functional modifications may be made without departing from the scope of the present disclosure. For example, the term "connected" herein may refer to directly connected or indirectly connected.

According to aspects of the disclosure herein, it may be advantageous to determine a characteristic of a photovoltaic panel, where the photovoltaic panels are installed as part of a photovoltaic power system. Thus, the physical state of the photovoltaic panels may be evaluated "on-site" (e.g., at the location where the panels are installed). Determining a characteristic of a photovoltaic panel may comprise evaluating a physical state of a photovoltaic panel, for example, using electroluminescence imaging or dark I-V curve measurements. To use electroluminescence, a reverse current (e.g., a current in the opposite direction to current produced by the panel when illuminated) is provided to the panel when the panel is not producing power. Such a reverse current may cause the photovoltaic panel to emit radiation such as infrared radiation. An image (e.g., an infrared image) of the panel may be captured and an analysis of the captured image may provide information relating to the physical state and the performance of the panel. For example, cracks, hot-stops, and other damage, deterioration, or defects may be visible in the captured image. To use or dark I-V curve measurements, the physical state of a photovoltaic panel may be based on determining a current versus voltage curve (referred to as "I-V curve") of the photovoltaic panel when the photovoltaic panel does not produce power (e.g., during low irradiance conditions such as during the night). For example, an I-V curve of a photovoltaic panel may provide information relating to parameters of the photovoltaic panel such as the open circuit voltage (Voc), the short circuit current (Isc) the series resistance (Rs), the shunt resistance (Rsh), or fill factor (FF).

Determining a characteristic or characteristics of a photovoltaic panel may comprise determining a physical location (e.g., geo-location or relative location) of the photovoltaic panel in the site, using electroluminescence imaging. In some photovoltaic power systems, the photovoltaic panels may be coupled to corresponding power devices, which may control the power provided by the photovoltaic panel or panels. To perform electroluminescence imaging and/or dark I-V curve measurements, a power device coupled to a corresponding photovoltaic panel may provide a reverse current to the photovoltaic panel. The power device may comprise a power converter. Such power converters may comprise a diode, which may restrict a reverse current from flowing to the photovoltaic panel. In some power converters, the diode may be connected to, or be a part of, a switch (e.g., a body diode of a transistor switch). Examples of such power converters are shown in FIGS. 9A-9E. The power converters may include a diode 317 that restricts reverse current from flowing toward the corresponding photovoltaic panel (e.g., from downstream terminals 312 to upstream terminals 310). Diode 317 may be connected across a switch 316, which provides a path for the reverse current when controlled to a conducting state, for example, by the power device.

The power used by the power device for the operation of the various modules of the power devices (e.g., controller or controllers, gate drivers, communications interface to name a few), also referred to as auxiliary power, may be received from the corresponding photovoltaic panel. However, electroluminescence imaging and/or dark I-V curve measurements are performed when the photovoltaic panel is not producing power (e.g., during low irradiance conditions such as during the night). Thus, a power device, which receives the auxiliary power thereof only from the corresponding photovoltaic panel may not be able to operate, and (in view of a diode restricting reverse current flow) may not be able to provide a path for a reverse current to flow to the photovoltaic panel for electroluminescence imaging purposes and/or dark I-V curve measurements (e.g., the power device would not be able to control the switch to transition to a conducting state).

Aspects of the disclosure herein may provide a system comprising a plurality of photovoltaic panels, where one or more of the photovoltaic panels may be coupled to a corresponding one or more power devices. The one or more power devices may be coupled to a power system controller. The power system controller may be coupled to a power source and to an imager. Examples of such power systems are shown in FIGS. 1A-1D. The one or more power devices may comprise a power converter. The power converter may comprise a diode which may restrict a reverse current from flowing to the corresponding photovoltaic panel (e.g., as shown in FIGS. 9A-9E).

To overcome the challenges imposed by the diode mentioned above (e.g., in electroluminescence imaging and/or dark I-V curve measurements), a power device according to aspects of the disclosure herein may comprise an auxiliary power circuit, which may receive power either from the photovoltaic panel, from the power source (e.g., via power system controller), or from both. Examples of such power devices is shown in FIGS. 3A-3E, where auxiliary power circuit 308 may receive power from a photovoltaic panel (e.g., via first and second terminals 310-1 and 310-2), from a power source (e.g., via third and fourth terminals 312-1 and 312-2), or from both. Once the power device receives auxiliary power, a power device controller may control the switch connected to the diode (e.g., switch 316—FIGS. 3A, 9A-9E, 11A, 12B)) to transition to a conducting state, thus providing a path for a reverse current to flow to the corresponding photovoltaic panel. Receiving auxiliary power from a power source may have additional advantages. Such advantages may be updating a software of the power device during low irradiation conditions, detecting the presences of the corresponding photovoltaic panel (e.g., theft detection), communicating with the power system controller to name a few.

In order to perform electroluminescence imaging and/or dark I-V curve measurements (e.g., when the photovoltaic panel is not producing power), a power device according to aspects of the disclosure herein may receive power from a power source (e.g., via a power system controller), and employ that power for two purposes. The first purpose may be using the power from the power source as auxiliary power for the operation of the power device, and controlling the switch connected to the diode to transition to a conducting state. The second purpose may be using the power from the power source to provide reverse current to the photovoltaic panel for electroluminescence imaging and/or dark I-V curve measurements purposes. The power may be used for either or both purposes. Thus, a system according to the disclosure herein may provide on-site capabilities of evaluating the physical state of the photovoltaic panels (e.g., by detecting cracks, manufacturing defects, disconnected conductors, hot spots, estimating the series or shunt resistances and the like), thus increasing the reliability and safety of the system.

According to aspects of the disclosure herein, and as further described in FIGS. 11A-11C and 12A-12B, the power device may comprise a bypass circuit which may bypass the power converter, and may provide a path for a reverse current to flow to the corresponding photovoltaic panel or panels. Thus, a power device according to aspects of the disclosure herein may enable a reverse current flow for on-site electroluminescence imaging.

Reference is made to FIGS. 1A-1D, which show examples of a system, generally referenced 100, and aspects of the system. System 100 may be used for electroluminescence imaging of a photovoltaic panel or panels. For example, system 100 may enable electroluminescence imaging of a photovoltaic panel or panels on-site. System 100 may comprise a photovoltaic array 113 (shown in FIG. 2), which may comprise one or more strings such as string 112. String 112 may comprise one or more photovoltaic panels 114-1, 114-2, . . . , 114-N, and a one or more power devices 116-1, 116-2, . . . , 116-N connected in series. Examples of power device 116-N are further elaborated below in conjunction with FIGS. 3A-3E. System 100 may comprise an imager 108, a power source 110, and a server 115 (shown in FIG. 2). Power source 110 may be an energy storage device (e.g., a battery, a supercapacitor, or a flywheel). Power source 110 may be a power distribution network (e.g., a grid). Power source 110 may be a power generator (e.g., a fossil fuel-based power generator, or hydraulic based power generator). System 100 may optionally comprise a power system controller 104. Power system controller 104 may comprise terminals 118-1 and 118-2.

Figure 1B:
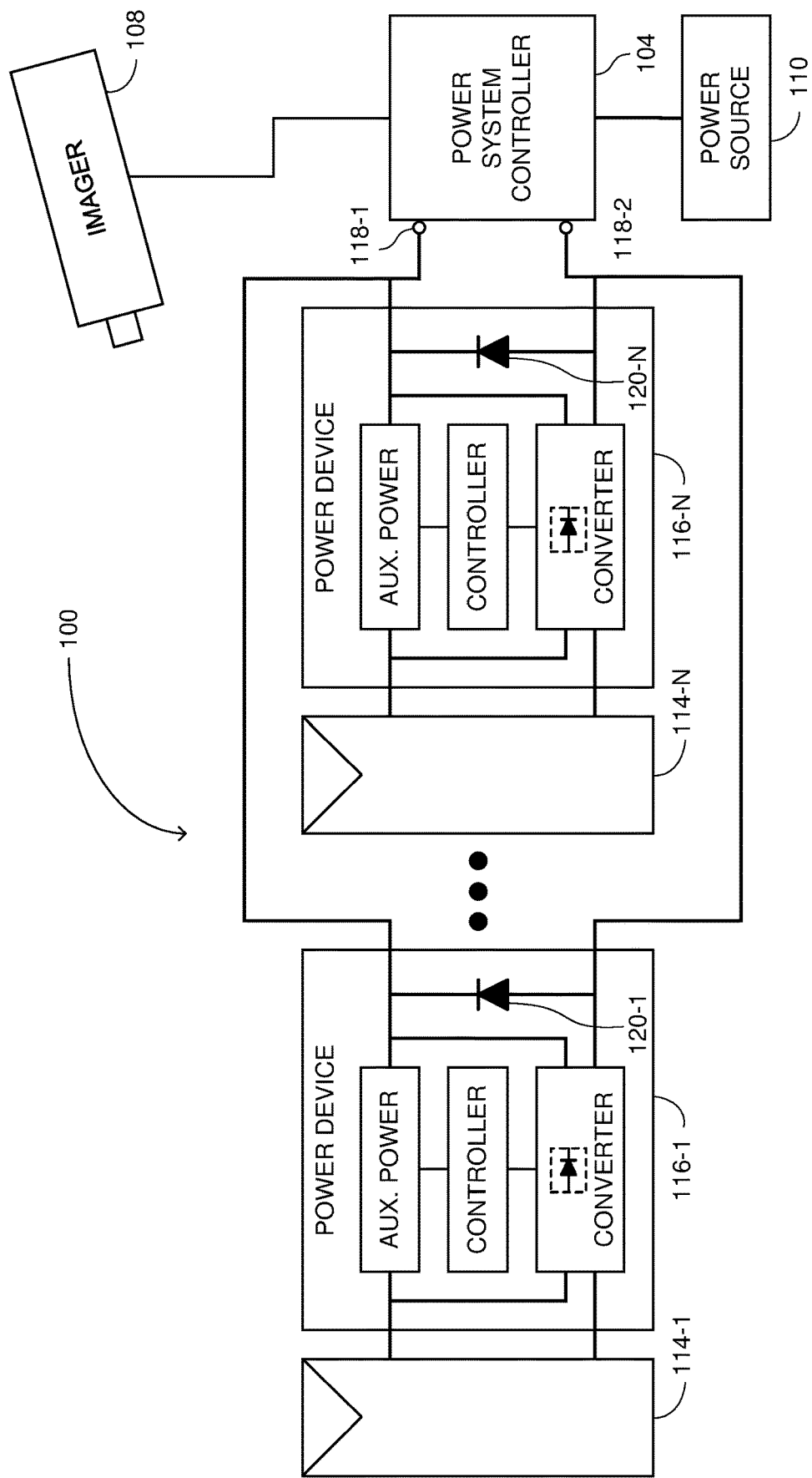
FIG. 1B shows an example of a power system where each photovoltaic panel may be connected to a corresponding power device according to aspects of the disclosure herein.
Figure 1C:
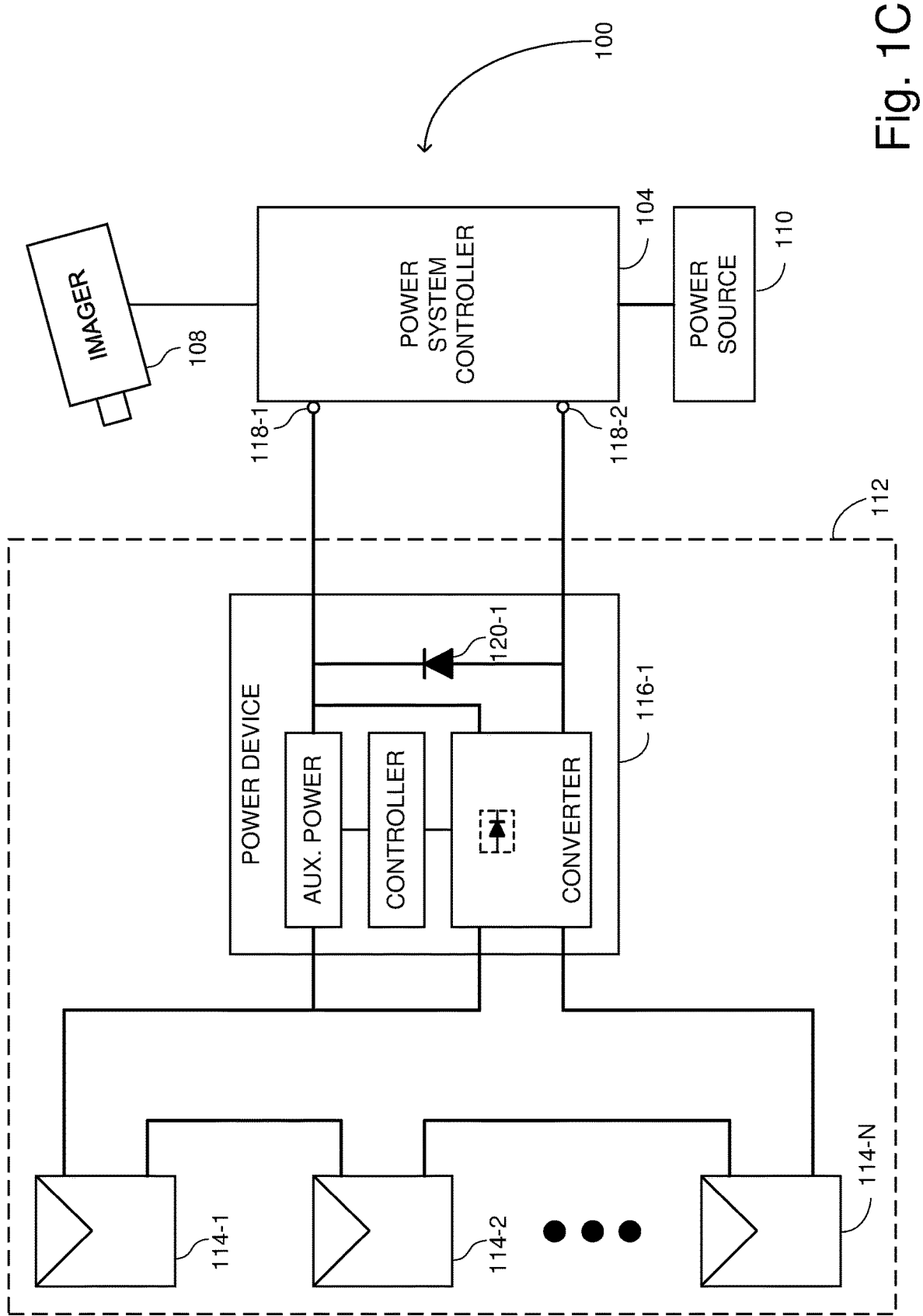
FIG. 1C shows an example of a power system where photovoltaic panels connected in series may be connected to a corresponding power device according to aspects of the disclosure herein.
Figure 1D:
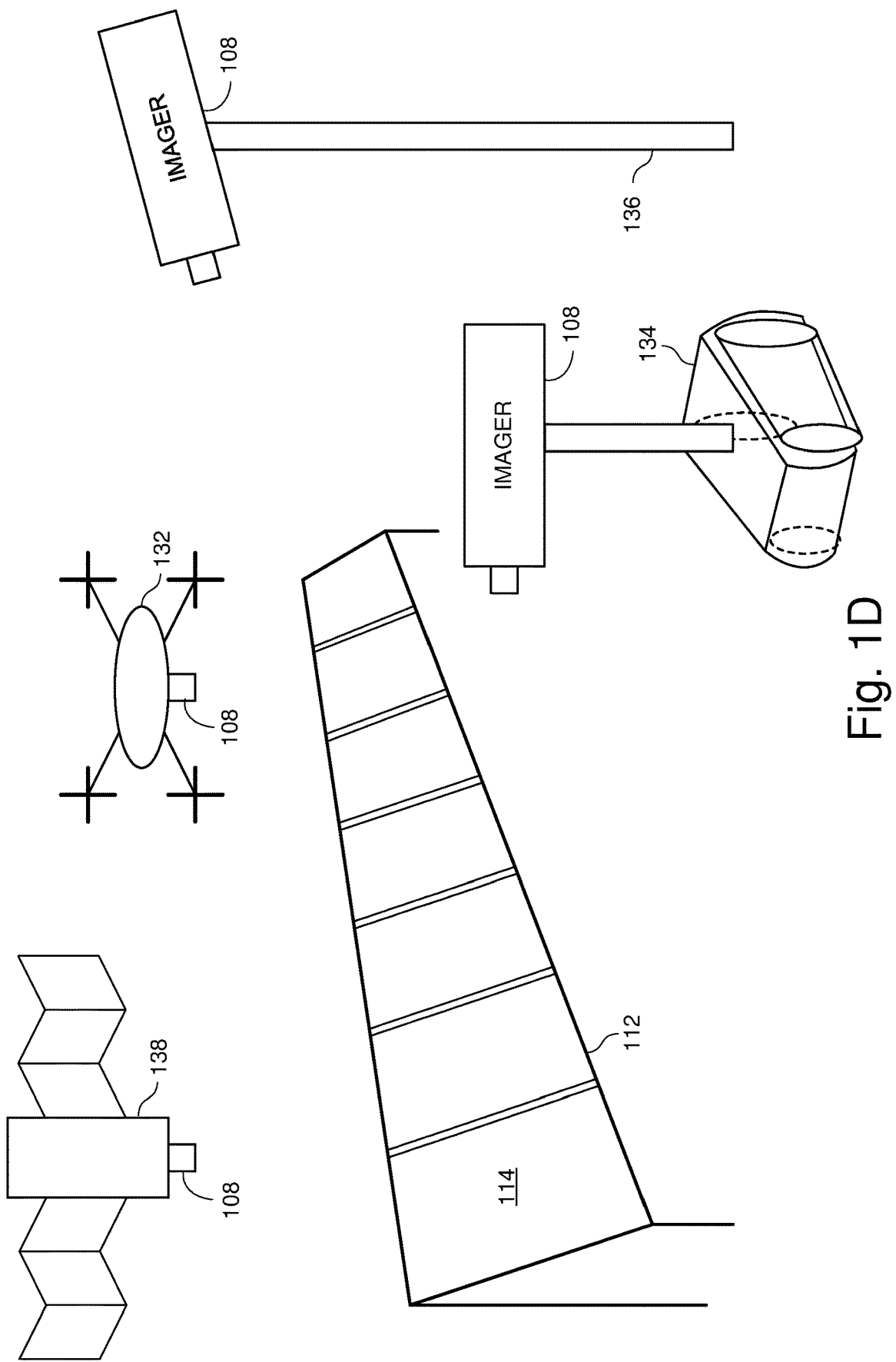
FIG. 1D may show various examples for mounting an imager according to aspects of the disclosure herein.

FIG. 1A shows an example wherein each photovoltaic panel 114 may be connected to a corresponding power device 116, and that outputs of power devices 116-1, 116-2, . . . , 116-N may be connected in a series string. FIG. 1B may show that each photovoltaic panel 114 may be connected to a corresponding power device 116, and that power devices 116-1, 116-2, . . . , 116-N may be connected in parallel. Power devices 116-1, 116-2, . . . , 116-N may be connected to terminals 118-1 and 118-2 of power system controller 104. Power system controller 104 may be connected to power source 110 and to imager 108. FIG. 1C shows that photovoltaic panels 114-1, 114-2, . . . , 114-N may be connected in series. The serially connected photovoltaic panels 114-1, 114-2, . . . , 114-N may be connected to a power device 116-1. FIG. 1D shows various examples for mounting imager 108, such as on an aerial vehicle 132 (e.g., a drone, a helicopter, an airplane). Imager 108 may be mounted on a robot 134 traversing string 112 (e.g., on wheels, or rails). Imager 108 may be mounted on a pole 136 (e.g., a telescopic pole) above string 112. Imager 108 may be mounted on satellite 138. Thus, imager 108 may be connected to power system controller 104 with wires or wirelessly, and the power system controller may send instructions to imager 108 or receive images from imager 108 via communications interface 206.

During high irradiance conditions (e.g., during daylight hours) photovoltaic panels 114-1, 114-2, . . . , 114-N, may produce power. Each of power devices 116-1, 116-2, . . . , 116-N may receive auxiliary power from a corresponding one of photovoltaic panels 114-1, 114-2, . . . 114-N, and convert power from the corresponding one of photovoltaic panels 114-1, 114-2, . . . 114-N. Power system controller 104 may provide the power from power devices 116-1, 116-2, . . . , 116-N to a load (e.g., a house, a factory, a power storage device/system, a power distribution network).

During low irradiance conditions (e.g., during nighttime) photovoltaic panels 114-1, 114-2, . . . , or 114-N may not produce power (or may produce a low level of power). As further elaborated below, and according to aspects of the disclosure herein, during low irradiance conditions, power system controller 104 may provide power at terminals 118-1 and 118-2 (e.g., from power source 110). For example, providing power may relate to generating a voltage between terminals 118-1 and 118-2 such that a current may be drawn from the power system controller 104 by one or more of power devices 116-1-116-N. Each of power devices 116-1, 116-2, . . . , 116-N may receive auxiliary power from the power source at terminals 118-1 and 118-2. Example structure and operation of a power device such as the power devices 116-1, 116-2, . . . , 116-N is further elaborated below in conjunction with FIGS. 3A-3E. Each of power devices 116-1, 116-2, . . . , 116-N may employ power from terminals 118-1 and 118-2, and provide a current, which may be referred to as reverse current, to the corresponding one of the photovoltaic panels 114-1, 114-2, . . . , 114-N. In a case where reverse current flows through photovoltaic panel 114, light or radiation (e.g., in the infrared spectrum) may be emitted by photovoltaic panel 114. Imager 108 may capture an image of the light or radiation emitted from photovoltaic panels 114-1, 114-2, . . . , 114-N for electroluminescence analysis.

Figure 2:
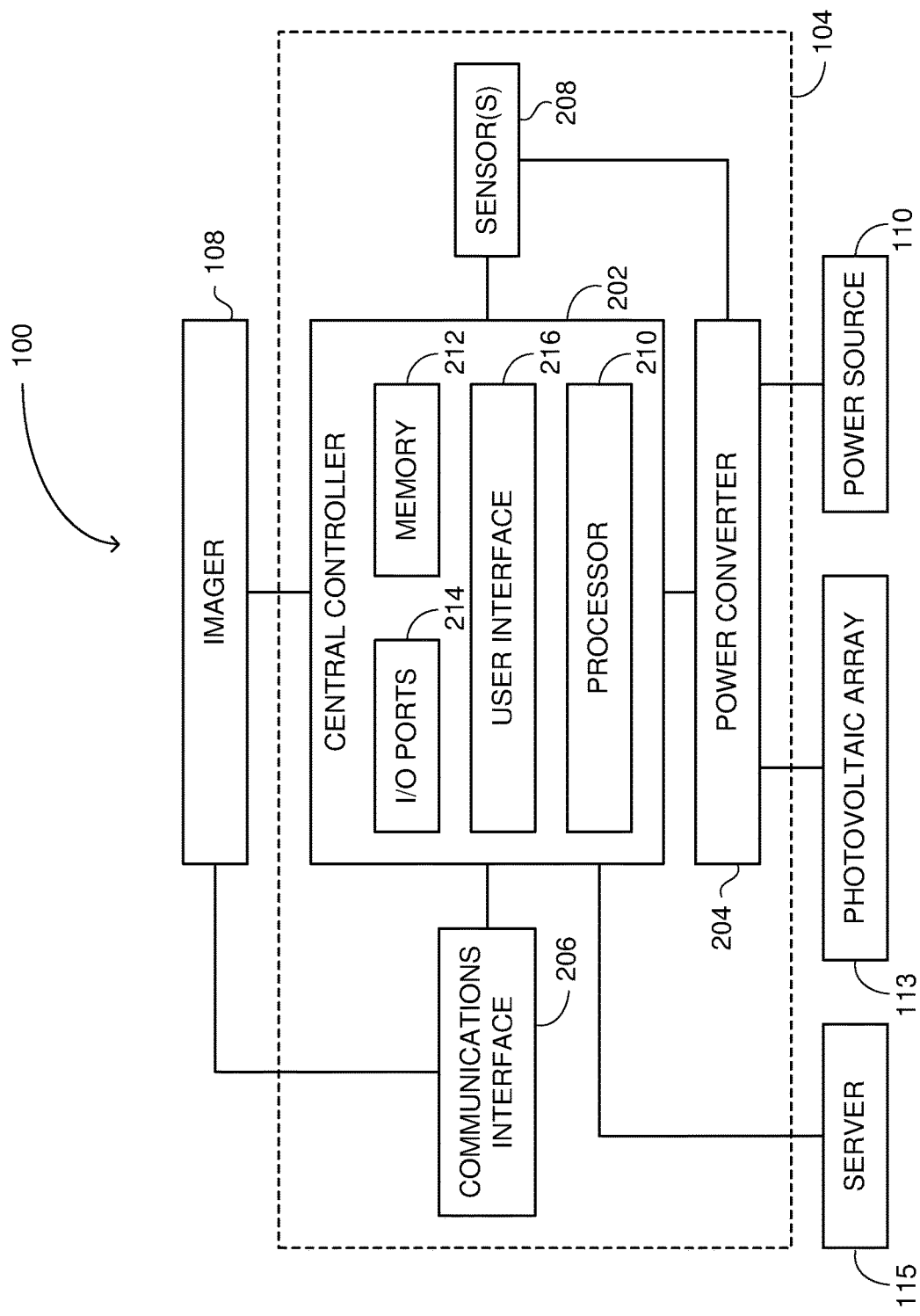
FIG. 2 shows an example of a power system controller according to aspects of the disclosure herein.

Reference is made to FIG. 2, which shows an example of a power system controller 104. In some instances, the power system controller 104 may comprise an inverter. Power system controller 104 may comprise a central controller 202, a power converter 204, a communications interface 206, and sensor(s) 208. Central controller 202, may be connected to power converter 204, to communications interface 206, to sensor(s) 208, and to imager 108. Power converter 204 may be connected to photovoltaic array 113 and to power source 110. It is noted that in a case where the one or more power devices 116-1, 116-2, . . . , 116-N produce AC power (e.g., in the instance of microinverters), power converter 204 may be replaced with a power combiner.

Central controller 202 may be partially or fully implemented as one or more computing devices or may include one or more processors, such as an Application Specific Integrated Circuit (ASIC) controller, Field Programmable Gate Array (FPGA) controller, a microcontroller, or a multipurpose computer. Central controller 202 may comprise one or more processors 210, connected to memory 212 and Input/Output (I/O) ports 214. Central controller 202 may comprise a user interface 216 (e.g., a keyboard, a mouse, a display, a microphone, a speaker, a touch screen, or a touchpad). Memory 212 may store computer readable instructions as well as data (e.g., measurements from sensor(s) 208 or parameters). I/O ports 214 may be configured to connect modules (e.g., sensor(s) 208, communication interface 206, power converter 204, imager 108, server 115, or other modules of system 100) to processor 210. The one or more processors 210 may execute the instructions, which may result in the processor 210 performing one or more steps or functions as described herein that are attributed to one or both of central controller 202 and processor 210.

Communications interface 206 may be a receiver, a transmitter, or a transceiver, and may be configured to communicate, based on a communications protocol, signals with one or more other transmitters, receivers, or transceivers, over a medium. The communication protocol may define one or more characteristics of the signals and/or of communications using signals, such as a transmission frequency or frequencies, a modulation scheme (e.g., Amplitude shift keying—ASK, Frequency shift keying—FSK, Quadrature Phase Shift Keying—QPSK, Quadrature Amplitude Modulation—QAM, ON OFF keying—OOK), multiple access scheme (e.g., Time Division Multiple Access—TDMA, Frequency Division Multiple Access—FDMA, Code Division Multiple Access—CDMA, Carrier Sense Multiple Access—CSMA, Aloha), encoding/decoding schemes (e.g., Non Return to Zero—NRZ, Manchester coding, Block coding), or any other characteristic. The medium may be a wired or a wireless medium. For example, a wired medium may be a dedicated communications cable (e.g., twisted pair, coaxial cable). A wired medium may include power lines connecting the power devices 116-1, 116-2, . . . , 116-N to the power converter 204.

Sensor(s) 208 may comprise one or more voltage sensors (e.g., implemented by employing a resistive or capacitive divider, a resistive or capacitive bridge, or comparators), one or more current sensors (e.g., implemented by employing a Current Transformer (CT) sensor, a Hall Effect sensor, or a zero flux sensor), or one or more frequency sensors.

Reference is made to FIGS. 3A-3F, which show examples of a power device 116 according to aspects of the disclosure herein. As mentioned above, and further elaborated below, power device 116 may receive auxiliary power either from a corresponding photovoltaic panel, from a power source, or from both. As mentioned above, power device 116 may comprise a power converter 300, a first terminal 310-1 a second terminal 310-2, a third terminal 312-1, and a fourth terminal 312-2. Power device 116 may comprise a power device controller 302, a power device communications interface 304, sensor(s) 306, and/or an auxiliary power circuit 308. Power device may comprise gate drivers 309. Power converter 300 may include a bi-directional DC-DC converter or a bi-directional DC-AC converter (e.g., an inverter, which may also operate as a rectifier), and may comprise a power converter that includes a plurality of switches, as may further be elaborated below in conjunction with FIGS. 9A-9E. Power converter 300 may comprise a switch 316, which may comprise a diode 317 (e.g., a body diode of switch 316, or a discrete diode connected across switch 316). The cathode of diode 317 may be coupled to the third terminal 312-1, and the anode of diode 317 may be coupled to first terminal 310-1. According to other examples the cathode of diode 317 may be coupled to second terminal 310-2, and the anode of diode 317 may be coupled to fourth terminal 312-2. Thus, in a case where switch 316 is in a non-conducting state, diode 317 may restrict current from flowing from third terminal 312-1 toward first terminal 310-1, or from second terminal 310-2 toward fourth terminal 312-2. For the sake of clarity of the description which follows, first terminal 310-1 and second terminal 310-2 may be abbreviated as terminals 310 or upstream terminals 310 or upstream interface 310. Third terminals 312-1 and fourth terminal 312-2 may be abbreviated as terminals 312 or downstream terminals 312 or downstream interface 312.

Power device communications interface 304 may configured to communicate with communications interface 206. Sensors 306 may be an example of sensors 208 (FIG. 2). Power device controller 302 may control power converter 300, optionally, via gate drivers 309. Power device controller 302 may be connected to power device communications interface 304 and to sensor(s) 306. Auxiliary power circuit 308 may be connected to first and second terminals 310-1 and 310-2, to third and fourth terminals 312-1 and 312-2, to power device controller 302, and to power device communications interface 304. As further explained below in conjunction with FIGS. 3B and 3C, auxiliary power circuit 308 may be configured to provide power to power device controller 302, to power device communications interface 304, or to both, from either first terminal 310-1 and second terminal 310-2, or from third terminal 312-1 and fourth terminal 312-2.

Power device controller 302 may control power converter 300, optionally via gate drivers 309, to convert power from the first and second terminals 310-1 and 310-2 to third and fourth terminals 312-1 and 312-2. Power device controller 302 may control power converter 300 to convert power from the third and fourth terminal 312-1 and 312-2, to the first and second terminals 310-1 and 310-2. For example, first and second terminals 310-1 and 310-2 may be connected to a photovoltaic panel, such as photovoltaic panel 114. Third and fourth terminals 312-1 and 312-2 may be connected to other power devices 116 (e.g., in a series string or in parallel) or to terminals 118-1 and 118-2 of the power system controller 104. For example, during high irradiance conditions (e.g., during the daytime), photovoltaic panel 114 may generate power. Auxiliary power circuit 308 may provide power for the operation of power device 116 from photovoltaic panel 114. Power device controller 302 may control power converter 300 to draw power from the photovoltaic panel 114, and provide (e.g., either directly or via string 112) power to power system controller 104. Power device controller 302 may control power converter 300 to draw power from photovoltaic panel 114 at an MPP of photovoltaic panel 114. For example, the power device controller 302 may use an MPP Tracking (MPPT) algorithm (e.g., using perturb and observe, incremental conductance, or ripple correlation). During low irradiance conditions, auxiliary power circuit 308 may provide power for the operation of power device 116 from another power source (e.g., via third and fourth terminals 312-1 and 312-2 from power source 110). Power device controller 302 may control power converter 300 to provide power (e.g., from power source 110 via power converter 204) to photovoltaic panel 114, to provide reverse current to photovoltaic panel 114, for example, for electroluminescence imaging or dark I-V curve measurements. Low irradiance conditions may be naturally occurring (e.g., during the night) or artificially occurring, by covering photovoltaic panel 114 (e.g., imager 108 may be located under the cover as well).

According to aspects of the disclosure herein, and as mentioned above, power device 116 may be configured to draw power produced by photovoltaic panel 114, or provide power to photovoltaic panel 114 (e.g., from power source 110). In both instances, power device controller 302 and/or power device communications interface 304 may need power to operate (e.g., may also be referred to as auxiliary power). In instances where a power converter includes a diode such as diode 317, and the auxiliary power circuit of the power converter is not connected to the downstream terminals of the power converter, or in instances where the corresponding photovoltaic panel does not produce power, the auxiliary power circuit may not provide power to power device. However, according to the disclosure herein, auxiliary power circuit 308 may be connected to first terminal 310-1 and second terminal 310-2, and to third terminal 312-1 and fourth terminal 312-2. Thus, power converter 300 may receive auxiliary power either from the corresponding photovoltaic panel 114 (e.g., coupled to first terminal 310-1 and second terminal 310-2), from power source 110 (e.g., coupled to first terminal 310-1 and second terminal 310-2 via power system controller 104), or from both. For example, in instances where photovoltaic panel 114 does not produce power, and power system controller 104 provides power from power source 110 to third and fourth terminals 312-1 and 312-2 of power device 116, and the power is received in the power device by auxiliary power circuit 308 to power components within the power device (e.g., power device controller 302, power device communications interface 304). Based on auxiliary power circuit 308 providing power to power device controller 302, power device controller 302 may control switch 316 to a conducting state, thus allowing current (e.g., reverse current) to flow to photovoltaic panel 114. In instances where photovoltaic panel 114 generates power at first and second terminals 310-1 and 310-2, but power system controller does not provide power to third and fourth terminals 312-1 and 312-2, auxiliary power circuit 308 may provide auxiliary power to the components within power device 116. In instances where both photovoltaic panel 114 and power system controller 104 provide power, auxiliary power circuit 308 may provide auxiliary power to the components within power device 116 from photovoltaic panel 114 and from power source 110.

Figure 3A:
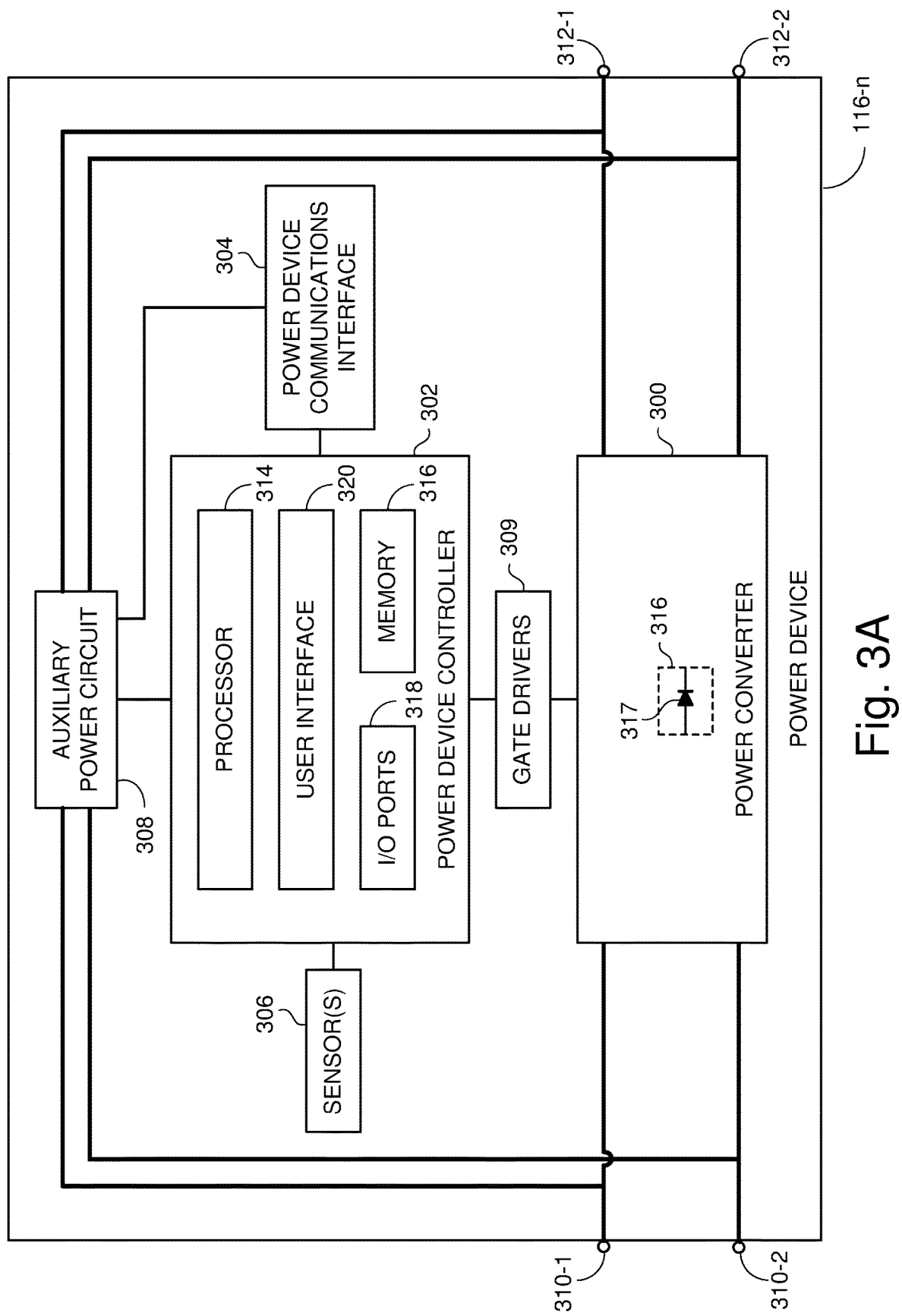
FIG. 3A shows an example of a power device according to aspects of the disclosure herein.
Figure 3B:
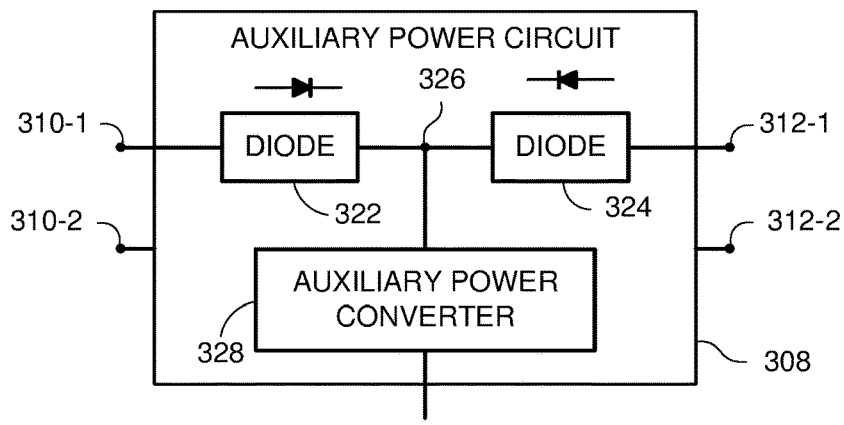
FIG. 3B shows an example of an auxiliary power circuit for a power device according to aspects of the disclosure herein.
Figure 3C:
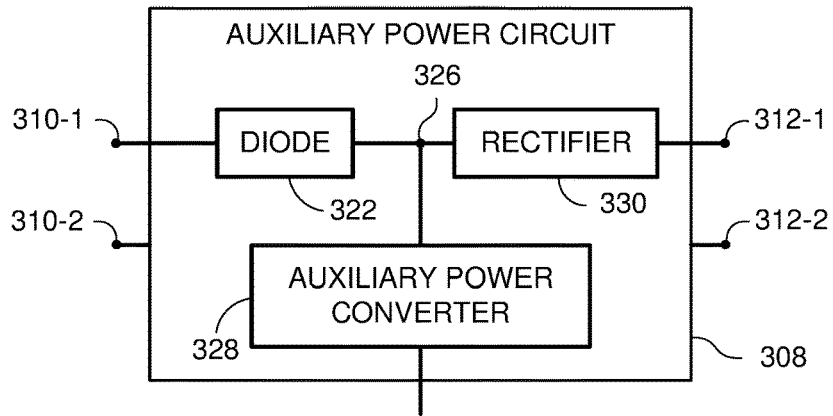
FIG. 3C shows an example of an auxiliary power circuit for a power device according to aspects of the disclosure herein.

FIGS. 3B and 3C show examples of auxiliary power circuit 308. Auxiliary power circuit 308 may comprise a first diode 322 and a second diode 324 as shown in FIG. 3B. Auxiliary power circuit 308 may optionally comprise an auxiliary power converter 328. The cathodes of diodes 322 and 324 may be connected at a connection point 326. The anode of first diode 322 may be connected to first terminal 310-1. The anode of second diode 324 may be connected to third terminal 312-1. Connection point 326 may be connected to the components and modules of power device 116. In instances in which auxiliary power circuit 308 comprises auxiliary power converter 328, connection point 326 may be connected to the input of auxiliary power converter 328. The output of auxiliary power converter 328 may be connected to the components and modules of power device 116. Auxiliary power converter 328 may be a DC-DC converter (e.g., a buck converter, a boost converter, a buck and boost converter, or a buck-boost converter). Auxiliary power converter 328 may be controlled by a PWM controller which may receive its operating power either from first and second terminals 310-1 and 310-2, or from third and fourth terminals 312-1 and 312-2. Such a PWM controller may be integrated into auxiliary power converter 328 or power device controller 302 or may be a separate controller. First diode 322 or second diode 324 may be implemented by ideal diode circuits (e.g., using ideal diode integrated circuits such as LTC4451 or LM73100, or using discrete components). First diode 322 and second diode 324 may be OR-ing diodes (e.g., diodes which perform a logical OR operation) configured to provide power device 116 with auxiliary power from one of photovoltaic panel 114 (e.g., via first and second terminals 310-1 and 310-2) or from power system controller 104 (e.g., via third and fourth terminals 312-1 and 312-2). In instances where power converter 204 is a DC-AC converter, or in instances in which AC power is provided between third and fourth terminals 312-1 and 312-2, second diode 324 may be replaced with a rectifier 330, as shown in FIG. 3C. Rectifier 330 may transform the AC voltage to DC voltage.

As mentioned above, power system controller 104 may use power lines connecting power devices 116-1, 116-2, . . . , 116-N to power converter 204 as a communications medium. In such cases, power system controller 104 may use communications interface 206 to produce an alternating voltage signal (e.g., an AC voltage) between, and/or an AC current signal on, terminals 118-1 and 118-2, and thus on lines connecting power devices 116-1, 116-2, . . . , 116-N to power converter 204. Rectifier 330 may transform the AC voltage and/or current to DC voltage and/or current. Optionally, auxiliary power circuit 308 may comprise a resonator (e.g., comprising a capacitor and inductor) having a resonant frequency at the frequency of the signal generated by communications interface 206.

As described above in FIG. 1A, power devices 116-1 through 116-N may be connected in series. When power system controller 104 produces a voltage across string 112, this voltage may be divided between the corresponding third and fourth terminals 312-1 and 312-2 of power devices 116-1 through 116-N, based on the number of and relative output impedances of power devices 116-1 through 116-N. In some cases, any one of the power devices (e.g., power device 116-N) in string 112 may become active before others. For example, auxiliary power circuit 308 may provide power to power device controller 302 and power device communications interface 304, and power device controller 302 may transmit signals (e.g., to power system controller 104) using power device communications interface 304. In such a case, power device 116-N may draw current. Consequent to power device 116-N drawing current, the voltage level across third and fourth terminals 312-1 and 312-2 of power device 116-N may reduce, causing the voltage level across third and fourth terminals 312-1 and 312-2 of the other ones of power devices 116-1-116-N to increase. In some cases, the voltage level across third and fourth terminals 312-1 and 312-2 of power device 116-N may reduce to a level in which power device 116-N may reset. According to the disclosure herein, and with reference to FIG. 3D, power device 116 may comprise an adjustable shunt regulator 332 which regulates the voltage level between third and fourth terminals 312-1 and 312-2, based on a sensed voltage prior to the initiating the operation of auxiliary power circuit 308 (e.g., prior to initiating the operation of auxiliary power converter 328, of power device controller 302, or of both).

Figure 3D:
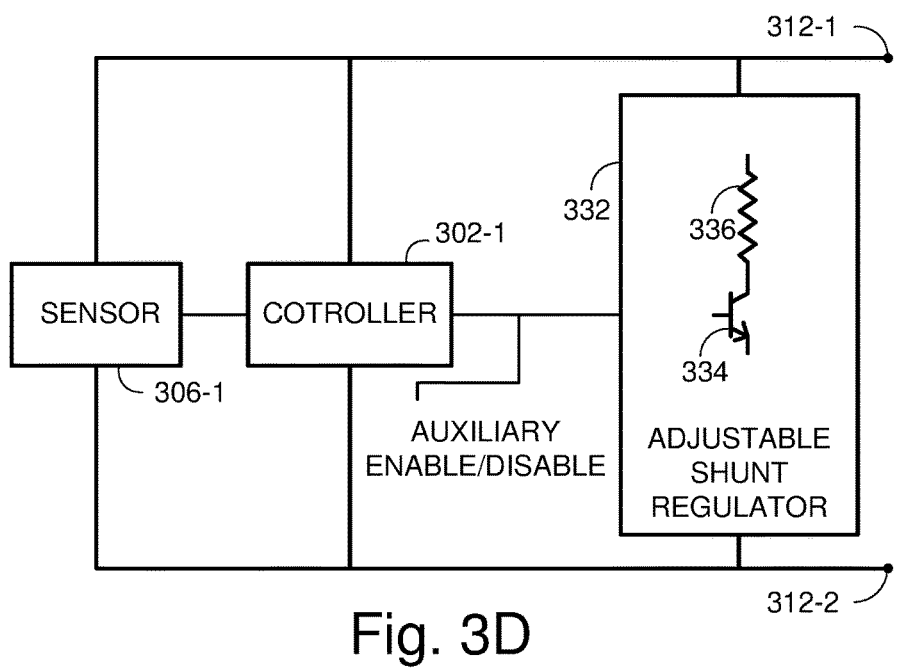
FIG. 3D shows an example of an auxiliary power circuit for a power device according to aspects of the disclosure herein, where the auxiliary power circuit comprises an adjustable shunt regulator.
Figure 3E:
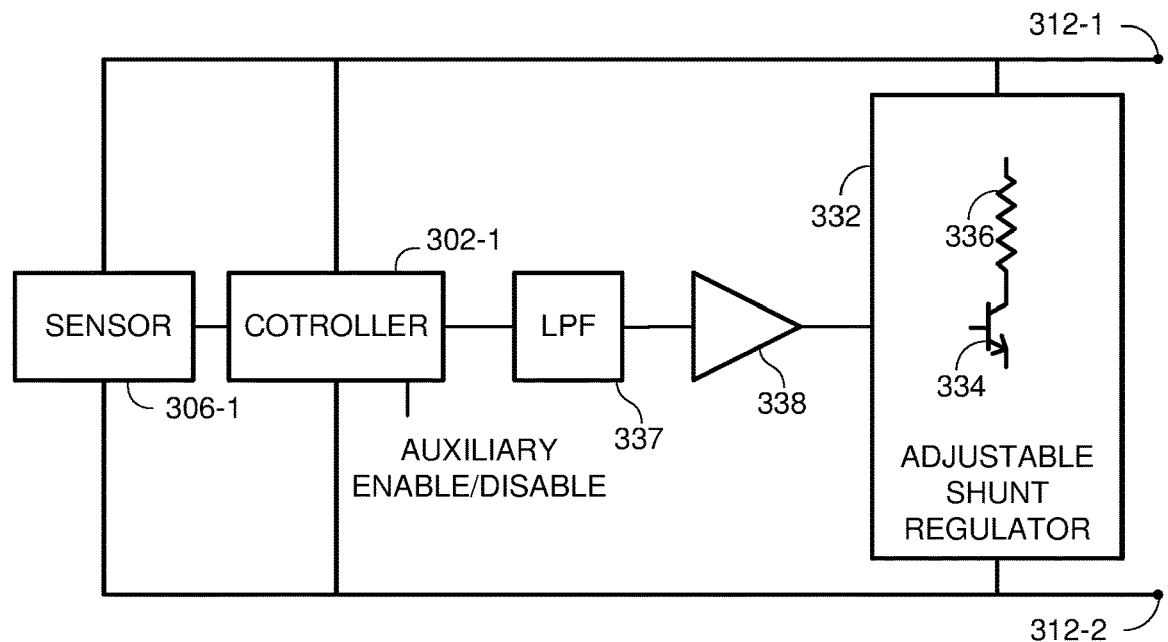
FIG. 3E shows an example of an auxiliary power circuit for a power device according to aspects of the disclosure herein, where the auxiliary power circuit comprises an adjustable shunt regulator.
Figure 3F:
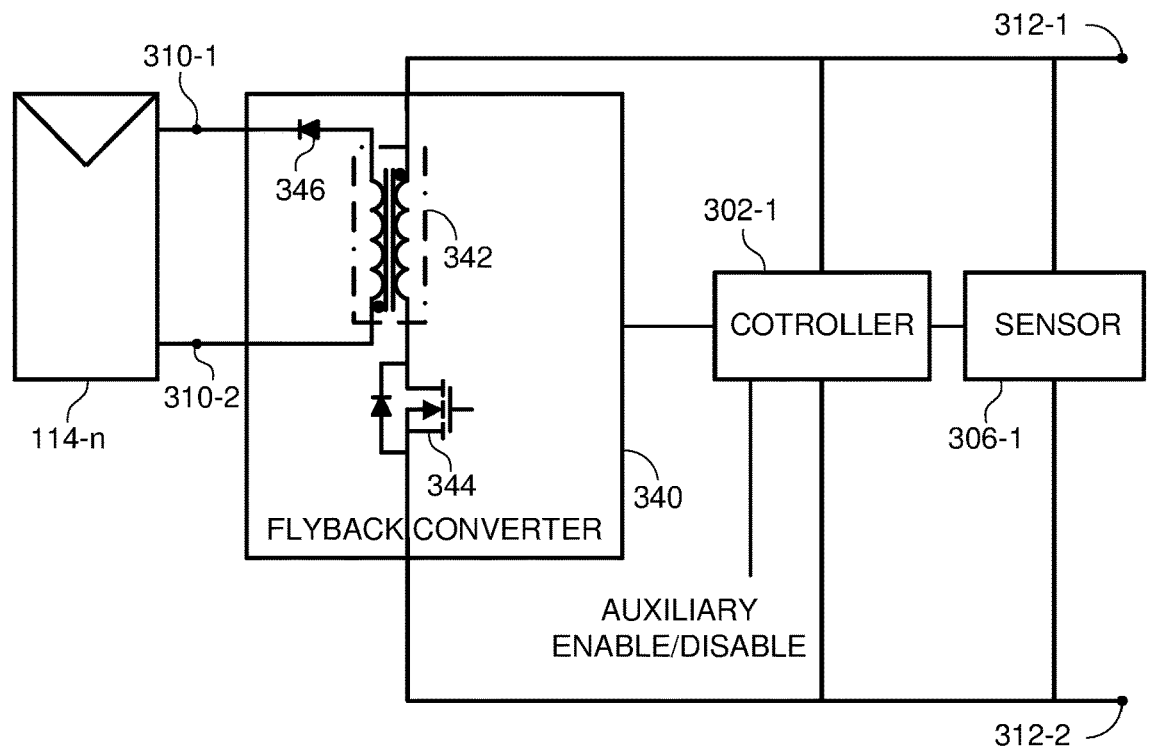
FIG. 3F shows an example of an auxiliary power circuit for a power device according to aspects of the disclosure herein, where the auxiliary power circuit comprises a flyback converter.

As shown in FIG. 3D, adjustable shunt regulator 332 connected between third and fourth terminals 312-1 and 312-2. For example, adjustable shunt regulator 332 may comprise a transistor 334 coupled in series with a resistor 336. A voltage sensor 306-1 (which may be part of sensor(s) 306) may measure a level of a voltage between third and fourth terminals 312-1 and 312-2 and provides this measured voltage level to controller 302-1 (which may be incorporated with, or separate from, power device controller 302). Controller 302-1 may use this measured voltage level as a reference voltage level, and control adjustable shunt regulator 332 to maintain the reference voltage level between third and fourth terminals 312-1 and 312-2. For example, controller 302-1 may generate a signal for controlling transistor 334 to alter the current through resistor 336, thus regulating the voltage level between third and fourth terminals 312-1 and 312-2. Once controller 302-1 controls adjustable shunt regulator 332 to regulate the voltage level between third and fourth terminals 312-1 and 312-2 to the reference voltage level, controller 302-1 may change a state of an auxiliary enable/disable signal, which was initially at a disabled state, to an enabled state. For example, the auxiliary enable signal may enable the operation of auxiliary power converter 328 or may enable the operation of power device controller 302. In some cases, controller 302-1 may be integrated with power device controller 302. In such cases, the auxiliary enable/disable signal may enable or disable power device controller 302.

FIG. 3D shows controller 302-1 coupled directly to adjustable shunt regulator 332. According to the disclosure herein, and with reference to FIG. 3E, auxiliary power circuit 308 may further comprise a Low Pass Filter (LPF) 337 optionally coupled to an amplifier 338. LPF 337 may also be coupled to controller 302-1, and amplifier 338 may also be coupled to adjustable shunt regulator 332. Controller 302-1 may generate a PWM signal corresponding to the voltage level between third and fourth terminals 312-1 and 312-2, measured by sensor 306-1. LPF 337 may filter the PWM signal to generate a control signal for adjustable shunt regulator 332. Amplifier 338 may amplify and/or integrate the control signal provided to adjustable shunt regulator 332.

In some cases, when regulating the voltage level between third and fourth terminals 312-1 and 312-2, it may be beneficial to avoid the use of a resistor such as resistor 336 (e.g., to reduce losses). According to the disclosure herein, and with reference to FIG. 3F, a converter 340, such as a flyback converter, coupled to a load, may be used instead of an adjustable shunt regulator 332. Converter 340 may comprise a coupled inductor 342, a switch 344, and a diode 346. The primary side windings of coupled inductor 342 may be connected between the drain of switch 344 and third terminal 312-1. The source of switch 344 may be connected to fourth terminal 312-2. The secondary side windings of coupled inductor 342 may be coupled to a load (e.g., a resistor). For example, the secondary side windings of coupled inductor 342 may be coupled between first and second terminals 310-1 and 310-2, and thus to corresponding photovoltaic panel 114-N (e.g., photovoltaic panel 114-N is used as a load). Thus, any excess power resulting from the regulation may be directed to photovoltaic panel 114-N. The current flowing into photovoltaic panel 114-N may be used for electroluminescence analysis purposes, for dark-IV panel characterization, or for determining the physical location of photovoltaic panel 114-N. It is noted that flyback converter 340 is as an example only, and other isolated converters (e.g., isolated buck converter, isolated boost converter) may be used as well.

According to aspects of the disclosure herein, power system controller 104 may produce, using power converter 204 a negative voltage between terminals 118-1 and 118-2 (e.g., the voltage at terminal 118-2 is higher than the voltage at terminal 118-1). This negative voltage may generate a current through, and consequently a voltage across, bypass diodes 120-1-120-N. Auxiliary power converter 328 may convert the power across the corresponding bypass diode 120-N and provide auxiliary power to power device 116-N. In some cases, in which power devices are connected in parallel (e.g., as shown in FIG. 1B), it may be beneficial to employ a current regulator instead of a shunt regulator (e.g., shunt regulator 332 of FIGS. 3D and 3E).

According to aspects of the disclosures herein and referring to FIGS. 1A-1D, FIG. 2, and FIGS. 3A-3F, central controller 202 may measure (e.g., using sensor(s) 208) an irradiance level. Central controller 202 may receive, via user interface 216, an indication from a user to capture an image for electroluminescence analysis. Based on the received indication from the user, or based the irradiance level being below a threshold (e.g., indicating low irradiance conditions such as night time), central controller 202 may control power converter 204 to convert power from power source 110 to power devices 116. Central controller 202 may control power converter 204 to convert power from power source 110 to power devices 116 based on the irradiance level (e.g., as sensed by sensors 208) and a received user input. Central controller 202 may control communications interface 206 to transmit a signal to power devices 116, indicating to the corresponding power device controller 302 to control power converter 300 to convert power from third terminal 312-1 and fourth terminal 312-2, to first terminal 310-1 and second terminal 310-2. Central controller 202 may control imager 108 to capture an image of photovoltaic panel 114 for electroluminescence analysis and/or for panel location determination. For example, central controller 202 may control imager 108 based on one or more measurements from sensor(s) 208 indicating that current is flowing from power system controller 104 to string 112.

Responsive to power system controller 104 providing power to terminals 118-1 and 118-2, voltage may develop across third terminal 312-1 and fourth terminal 312-2 of power device 116. For example, each power device 116 may comprise a bypass diode, such a bypass diode 120. When connected in series as in FIG. 1A, the output impedances of power devices 116-1 to 116-N may form a voltage divider, dividing the voltage level between terminals 118-1 and 118-2, over the third terminal 312-1 and fourth terminal 312-2 of the corresponding power device 116. Responsive to a voltage being above a threshold across third terminal 312-1 and fourth terminal 312-2, auxiliary power circuit 308 may be configured to provide power to power device controller 302 and/or power device communications interface 304.

Based on power device controller 302 receiving auxiliary power, and according to aspects of the disclosure herein, power device controller 302 may measure (e.g., using sensor(s) 306) a voltage between first terminal 310-1 and second terminal 310-2 to determine if photovoltaic panel 114 is producing power. Power device controller 302 may measure (e.g., using sensor(s) 306) a voltage between third terminal 312-1 and fourth terminal 312-2 to determine if power source 110 provides power (e.g., via power system controller 104), to power device 116. In instances where photovoltaic panel 114 does not produce power, and power source 110 provides power to power device 116, power device controller 302 may control power converter 300 to provide power from third terminal 312-1 and fourth terminal 312-2, to first terminal 310-1 and second terminal 310-2. For example, power device controller 302 may control switch 316 to transition to a conducting state, thus providing a path for current (e.g., reverse current) to flow from downstream terminals 312 to upstream terminals 310. Power converter 300 may convert power (e.g., modify one or more of a voltage and a current) from downstream terminals 312 to upstream terminals 310. Based on power converter 300 providing power from third terminal 312-1 and fourth terminal 312-2, to first terminal 310-1 and second terminal 310-2, reverse current may flow through photovoltaic panel 114 causing photovoltaic panel 114 to emit light or radiation (e.g., infrared radiation). Power device communications interface 304 may transmit a signal to power system controller 104 indicating that the power converter 300 is providing power to photovoltaic panel 114. Power system controller 104 may control imager 108 to capture an image of photovoltaic panel 114 for electroluminescence analysis and/or panel location determination. With reference to FIG. 2, the captured images may be processed by processor 210 (FIG. 2). The captured images may be stored in memory 212, or transferred via I/O ports 214 to an external memory for processing by a different processor. The captured images may be transmitted, via communication interface 206, for storage in a cloud storage or for processing by a remote processor for electroluminescence analysis and/or panel location determination. The processed images may provide information relating to the physical state of photovoltaic panel 114. Processing the images may comprise image segmentation, segment classification, and the like.

According to aspects of the disclosure herein, power device controller 302 may measure (e.g., using sensor(s) 306) a voltage between first terminal 310-1 and second terminal 310-2 to determine if photovoltaic panel 114 is under low irradiance conditions (e.g., the voltage level between first terminal 310-1 and second terminal 310-2 may be substantially zero). Power device controller 302 may receive from power device communications interface 304, a signal indicating to power device controller 302 to control power converter 300 to provide power from third terminal 312-1 and fourth terminal 312-2, to first terminal 310-1 and second terminal 310-2. Such as when photovoltaic panel 114 does not produce power, and based on the received signal, power device controller 302 may control power converter 300 to convert power from third terminal 312-1 and fourth terminal 312-2, to first terminal 310-1 and second terminal 310-2. Based on power converter 300 converting power from third terminal 312-1 and fourth terminal 312-2, to first terminal 310-1 and second terminal 310-2, a reverse current may flow through photovoltaic panel 114. Central controller 202 may control imager 108 to capture an image of photovoltaic panel 114 for electroluminescence analysis and/or panel location determination. For example, central controller 202 may control imager 108 based on one or more measurements from sensor(s) 208 indicating that current is flowing through one or more of terminals 118-1 and 118-2.

A system, such as system 100 and the various components thereof (e.g., central controller 202, photovoltaic panel 114, power device 116, power device controller 302, power converter 300 described above in conjunction with FIGS. 1A-1D, 2, 3A-3D) may operate in various ways in order to enable reverse current to follow to the photovoltaic panels and for an image to be captured for electroluminescence analysis. FIGS. 4, 5, 6, 7, and 8 may provide various examples of various ways in which a system according to the disclosure herein may operate to enable electroluminescence imaging.

Figure 4:
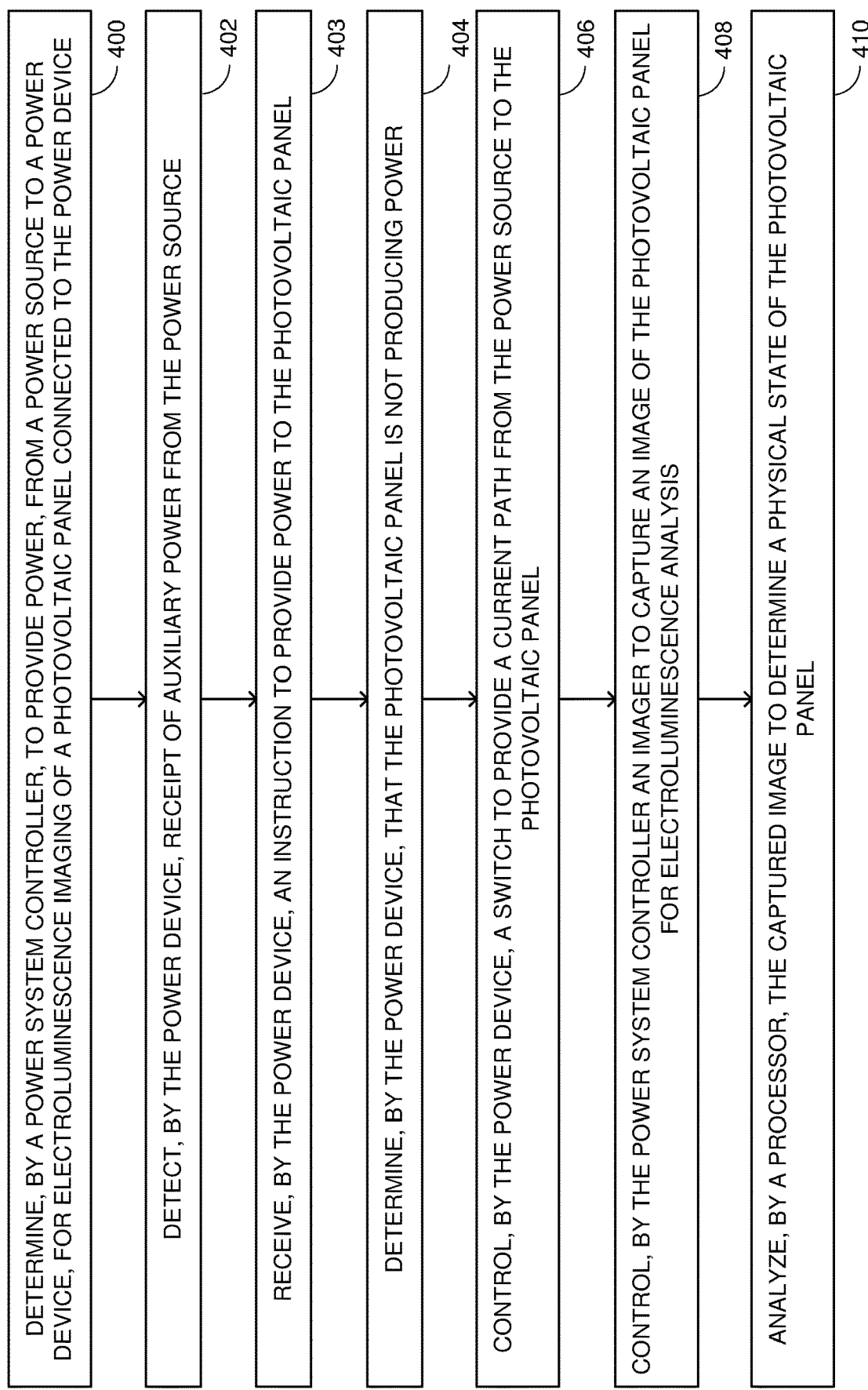
FIG. 4 shows an example of a method for electroluminescence imaging according to aspects of the disclosure herein.

Reference is now made to FIG. 4, which shows an example method performed by system 100 for capturing an image for electroluminescence analysis of photovoltaic panel 114, in instances where photovoltaic panel 114 is not producing power and power device 116 comprises diode 317 restricting reverse current for flowing toward the photovoltaic panel.

In step 400, a power system controller (e.g., power system controller 104) may determine to provide power, from a power source (e.g., power source 110), to a power device (e.g., power device 116) for electroluminescence imaging of a photovoltaic panel (photovoltaic panel 114). The determination may be the result of a user input requesting electroluminescence imaging, such as an input by an operator on a user interface of server (e.g., server 115) coupled to power system controller 104 (e.g., as may be described below in conjunction with FIG. 8). The determination may be based on a measurement of irradiance level (e.g., as may be described below in conjunction with FIG. 7). The photovoltaic panel may be connected to the power device. The power device may comprise a diode (e.g., diode 317) restricting current flow (e.g., reverse current) from the power source toward the photovoltaic panel.

In step 402, the power device may detect that it is receiving auxiliary power from the power source. For example, power device 116 may receive auxiliary power from power source 110 via downstream terminals 312 and auxiliary power circuit 308. The power system controller 104 may initiate transmission of power from the power source 110 to the power device 116 in response to the indication received in step 400. The auxiliary power may enable the various modules and components of the power device 116 (e.g., power device controller 302, sensor(s) 306, gate driver 309, or power device communications interface 304) to operate regardless of whether the photovoltaic panel produces power or not.

In step 403, the power device 116 may receive an instruction to provide power to the photovoltaic panel in order to enable electroluminescence imaging of the panel. The instruction may be sent by the power system controller 104, or from some other remote device (e.g., a server associated with a service provider). The instructions may be in the form of a voltage and/or current that the power system controller 104 provides to the power device (e.g., from power source 110 via terminals 118-1 and 118-2 to downstream terminals 312) as may be described in FIG. 5. The instructions may be in the form of a signal (e.g., received by power device 116 via power device communications interface 304) as may be described in FIG. 6. Based on the instruction, a controller of the power device 116 may cause performance of steps 402 through 404, as discussed below.

In step 404, the power device 116 may determine that the photovoltaic panel is not producing power. For example, as described in conjunction with FIGS. 5 and 6 below, the power device 116 may measure a voltage level between the upstream terminals (e.g., upstream terminals 310) to determine if the photovoltaic panel is producing power. In another example, the power device 116 may determine (e.g., based on a measurement of an irradiance level at or near the photovoltaic panel 114 by sensor(s) 306) that the photovoltaic panel is not producing power.

In step 406, the power device may control a switch (e.g., based on the determination that the photovoltaic panel is not producing power or based on the instruction received in step 401) to provide a current path from the power source to the photovoltaic panel. For example, power device 116 may control switch 316 to transition to a conducting state, thereby providing a current path (e.g., which may bypass diode 317) from downstream terminals 312 to upstream terminals 310. Thus, current may flow from the power source 110 to the photovoltaic panel 114, and cause photovoltaic panel to emit radiation. This current flow may have the advantage of avoiding a restriction in reverse current flow imposed by the diode in the power device.

In step 408, the power system controller may control an imager to capture an image of the photovoltaic panel for electroluminescence analysis. For example, power system controller 104 may control imager 108 to capture an image of the photovoltaic panel 114 either directly or wirelessly (e.g., via communications interface 206).

In step 410, a processor may analyze the captured image to determine a physical state of the photovoltaic panel. The processor may be, for example, processor 210 (FIG. 2) of power system controller 104, or a remote processor. Analysis of the captured image may comprise image segmentation and segment classification. The physical state may comprise one or more defects in the photovoltaic panel. For example, the captured image may depict abnormalities in light or radiation emission from certain cells in a panel indicating cells failures, hot spots, and the like. In some instances, an entity may initiate repair or replacement of the photovoltaic panel in response to determining the defects.

It is noted that the steps of the method shown in FIG. 4 are optional and may be performed in a different order. For example, step 404 may be omitted or may be performed before step 403.

Figure 5:
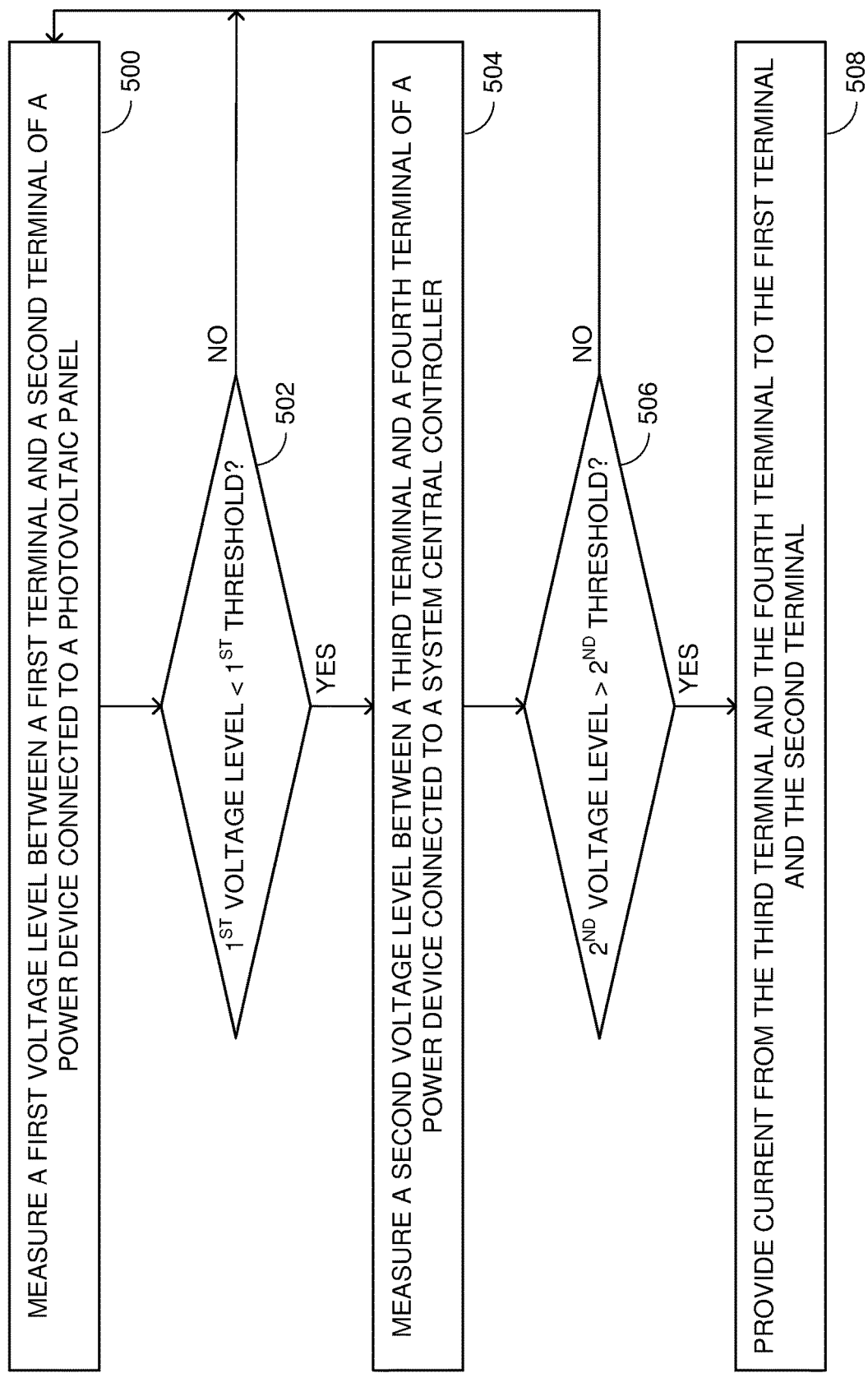
FIG. 5 shows an example of a method for electroluminescence imaging according to aspects of the disclosure herein.

Reference is now made to FIG. 5, which is an example method (e.g., performed by power device 116) to determine if reverse current is to be provided to the corresponding photovoltaic panel for electroluminescence imaging purposes. In step 500, the power device may measure (e.g., by sensor(s) 306) a first voltage level between a first terminal (e.g., first terminal 310-1) and a second terminal (e.g., 310-2) of a power device 116 (e.g., and of power converter 300) connected to a photovoltaic panel (e.g., photovoltaic panel 114). This measurement may indicate if the photovoltaic panel is under low irradiance conditions and may not produce power, or under high illumination conditions and may be producing power.

In step 502, the power device 116 may determine (e.g., by power device controller 302) if the measured first voltage level is below a first threshold. This threshold of the voltage level may relate to the output voltage of the photovoltaic panel under low irradiance conditions. If the measured first voltage level is not below the first threshold, then the photovoltaic panel may be producing power (e.g., which may limit the ability to perform electroluminescence imaging) and the method may return to step 500. If the measured first voltage level is below the first threshold, than the photovoltaic panel may not be producing power (e.g., which may make electroluminescence imaging possible), and the method may proceed to step 504.

In step 504, the power device 116 may measure (e.g., by sensor(s) 306) a second voltage level between a third terminal (e.g., third terminal 312-1) and a fourth terminal (e.g., fourth terminal 312-2) of the power device 116 (e.g., and of power converter 300) connected to a power system controller (e.g., power system controller 104). This measurement may indicate to the power device that the power source (e.g., power source 110) may be providing power (e.g., via power system controller 104) for electroluminescence analysis.

In step 506, the power device may determine (e.g., by power device controller 302) if the measured second voltage level is above a second threshold. In a case where the measured second voltage level is not above a second threshold, then the power source may not be providing power to the power device 116, and the method may return to step 500. If the measured first voltage level is above the second threshold, then the power source may be providing power to the power device 116, and the method may proceed to step 508.

In step 508, the power device 116 may provide power (e.g., by power converter 300) from the downstream terminals (e.g., downstream terminals 312) to upstream terminals (e.g., upstream terminals 310). For example, power device controller 302 may control switch 316 to transition to a conducting state, thus providing a path for current to flow from downstream terminals to the upstream terminals. The power converter may convert power (e.g., modify one or more of a voltage level and a current level) from the downstream terminals to the upstream terminals. Thus, reverse current may be provided to the corresponding photovoltaic panel of the power device. The power at the third terminal and the fourth terminal may be provided, for example, by power system controller 104, from power source 110. This power may also be used as auxiliary power for the power device 116.

It is noted that the steps of the method shown in FIG. 5 are optional and may be performed in a different order. For example, steps 500 and 502 may be omitted, and/or steps 504 and 506 may be performed before step 500 and 502.

Figure 6:
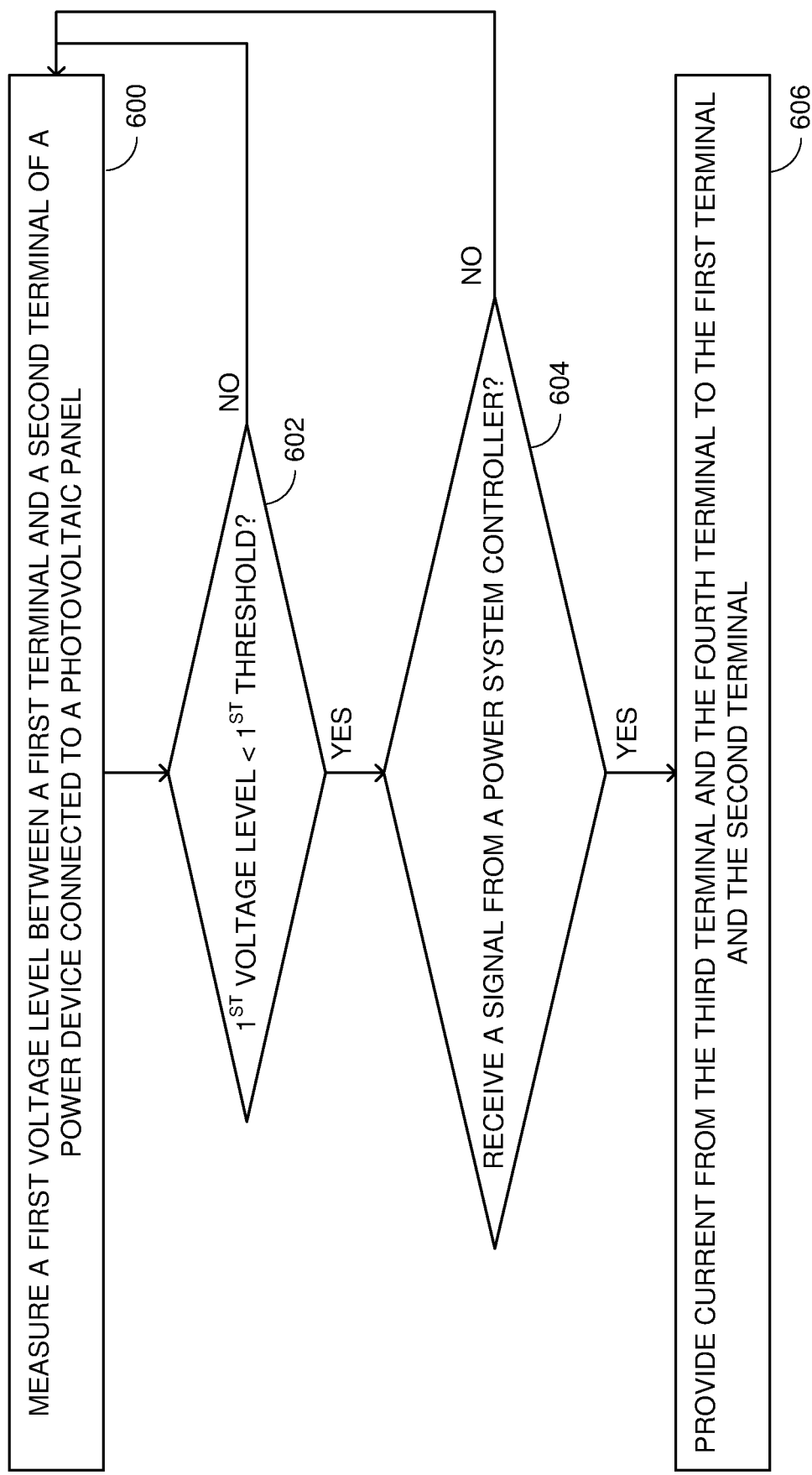
FIG. 6 shows an example of a method for electroluminescence imaging according to aspects of the disclosure herein.

Reference is now made to FIG. 6, which an example method (e.g., performed by the power device 116) to determine if reverse current is to be provided to the corresponding photovoltaic panel for electroluminescence imaging purposes. In step 600, the power device 116 may measure (e.g., by sensor(s) 306) a first voltage level between a first terminal (e.g., first terminal 310-1) and a second terminal (e.g., 310-2) of the power device (e.g., and of power converter 300) connected to a photovoltaic panel (e.g., photovoltaic panel 114). This measurement may indicate if the photovoltaic panel is under low irradiance conditions and may not produce power, or under high illumination conditions and may be producing power.

In step 602, the power device 116 may determine (e.g., by power device controller 302) if the measured first voltage level is below a first threshold. This threshold of the voltage level may relate to the output voltage of the photovoltaic panel under low irradiance conditions. In a case where the measured first voltage level is not below a first threshold, then the photovoltaic panel may be producing power (e.g., which may limit the ability to perform electroluminescence imaging) and the method may return to step 600. In a case where the measured first voltage level is below the first threshold, than the photovoltaic panel may not be producing power and the method may proceed to step 604.

In step 604, power device 116 may determine if a signal was received (e.g., by power device controller 302, via power device communications interface 304). The signal may be transmitted by the power system controller 104 (e.g., via communication interface 206). The signal may indicate to the power device that the power supply is providing power for electroluminescence imaging. If a signal was not received, the method returns to step 600. If a signal was received, the method may proceed to step 606.

In step 606, the power device 116 may provide power (e.g., by power converter 300) from downstream terminals (e.g., downstream terminals 312) to upstream terminals (e.g., upstream terminals 310). For example, power device controller 302 may control switch 316 to transition to a conducting state, thus providing a path for current to flow from downstream terminals to the upstream terminals. The power converter may convert power (e.g., modify one or more of a voltage level and a current level) from the downstream terminals to the upstream terminals. Thus, reverse current may be provided to the corresponding photovoltaic panel of the power device. The power at the third terminal 118-1 and the fourth terminal 118-2 may be provided, for example, by converter 204, from power source 110. This power may also be used as auxiliary power for the power device 116.

It is noted that the steps of the method shown in FIG. 6 are optional and may be performed in a different order. For example, step 604 may be omitted or may be performed before step 602.

Figure 7:
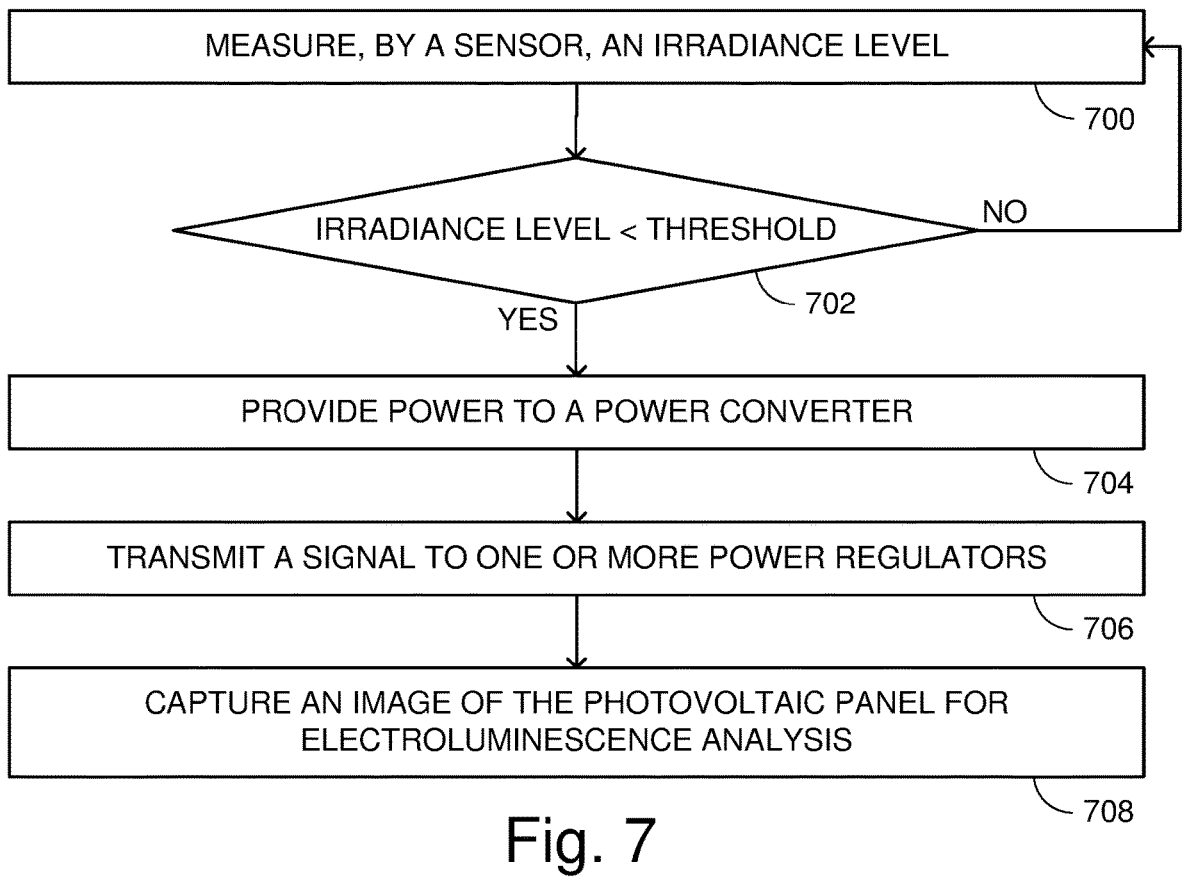
FIG. 7 shows an example of a method for electroluminescence imaging according to aspects of the disclosure herein.

Reference is now made to FIG. 7, which shows an example method (e.g., performed by power system controller 104) for providing power to the power devices (e.g., power devices 116) for electroluminescence imaging purposes. In step 700, the power device may measure (e.g., by sensor(s) 208) an irradiance level. The irradiance level may relate to a time of day and provide an indication if the photovoltaic panel or panels are producing power.

In step 702, the power device may determine (e.g., by central controller 202) if the measured irradiance level (e.g., from the sun) is below a threshold. A measured irradiance level above the threshold may correspond to a daylight irradiance level and may indicate that the photovoltaic panel or panels are producing power. A measured irradiance level below the threshold may correspond to a nighttime irradiance level and may indicate that the photovoltaic panel or panels are not producing power. If the measured irradiance level is not below a threshold, the method may return to step 700. If the measured irradiance level is below a threshold, the method may proceed to step 704.

In step 704, the power system controller 104 may provide power to the power device 116. This power may be employed by the power device as auxiliary power, and may be used for proving reverse current to the corresponding photovoltaic panel.

In step 706, the power system controller 104 may transmit (e.g., via communications interface 206) a signal to one or more power devices (e.g., power devices 116-1, 116-2, . . . , 116-N). The signal may indicate to the power device or power devices that the power source is providing power for electroluminescence imaging purposes. For example, such as when system 100 comprises a power device 116, coupled as described in FIGS. 1A-1C, power system controller 104 may transmit the signal as a unicast signal transmitted to one of the power devices 116, as a multicast signal to a group of power devices 116, or as a broadcast signal to all of power devices 116. The signal may comprise operational instructions to the power device 116. For example, when power devices 116 are connected in a series string as in FIG. 1A, power system controller 104 may transmit a unicast signal to one of power devices 116 to provide a current path to the corresponding photovoltaic panel 114. Power system controller 104 may transmit a multicast signal to the other power devices 116 to short circuit their respective downstream terminals 312 (e.g., by transitioning switch 316 and second switch 906 (FIGS. 9A and 9B) to a conducting state, such as by transitioning switch 316 (FIG. 9C) to a conducting state, or by transitioning switch 316 and switch 922 (FIG. 9D) to a conducting state). Short circuiting downstream terminals 312 of the other power devices may allow reverse current to flow through the string (e.g., short circuiting bypass diodes 120 of the other power devices).

In step 708, the power system controller may control the imager (e.g., imager 108) to capture an image of the photovoltaic panel for electroluminescence analysis.

It is noted that the steps of the method shown in FIG. 7 are optional and may be performed in a different order. For example, step 706 may be omitted, and/or step 704 may be performed before step 700.

Figure 8:
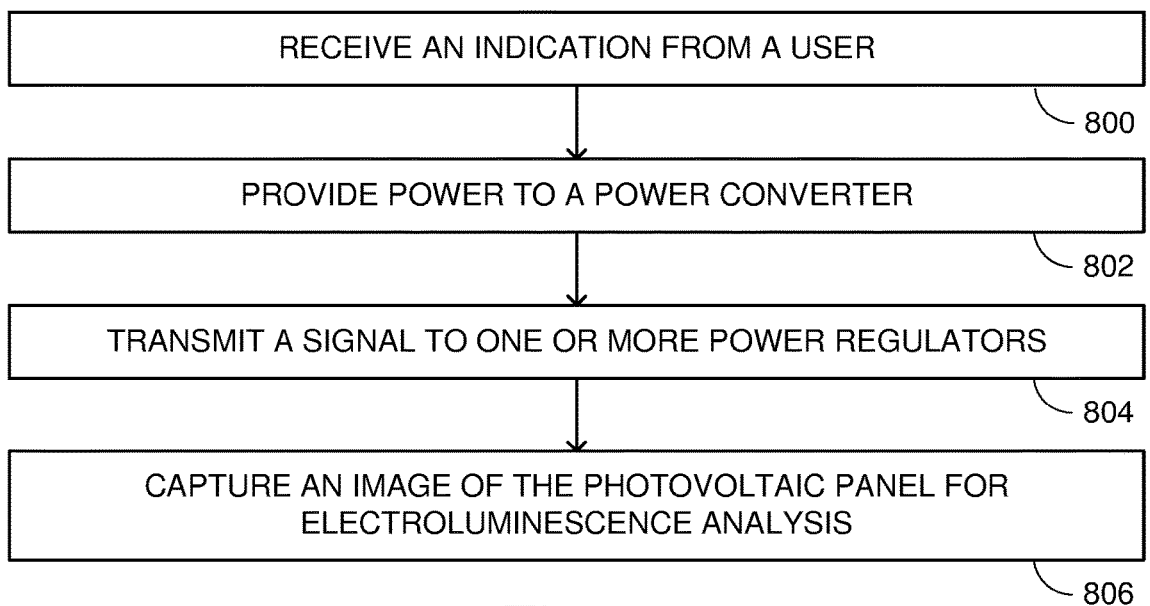
FIG. 8 shows an example of a method for electroluminescence imaging according to aspects of the disclosure herein.

Reference is now made to FIG. 8, which is an example method (e.g., performed by power system controller 104) for providing power to the power devices 116 for electroluminescence imaging purposes. In step 800, the power system controller may receive an indication from a user via a user interface (e.g., user interface 216). For example, the user may provide the user indication if the user determines that electroluminescence analysis is to be performed on the photovoltaic panels. For example, the user may provide the user indication via user interface 216.

In step 802, the power system controller (e.g., power system controller 104) may provide power from a power source (e.g., power source 110) to a power device 116. The power device 116 may employ this power as auxiliary power to operate one or more circuits (e.g., controller, gate-drivers, sensors, etc.). In addition, the power device 116 may provide the power to a photovoltaic panel coupled to its input terminals. The power device may provide a reverse current to the corresponding photovoltaic panel.

In step 804, the power system controller may transmit (e.g., via communications interface 206) a signal to one or more power devices (116-1, 116-2, . . . , 116-N). The signal may indicate to the power devices that the power source is providing power for electroluminescence imaging purposes. As described above (e.g., in conjunction with FIG. 6) the power device may provide reverse current to the respective photovoltaic panel based on receiving this signal.

In step 806, the power system controller may control the imager (e.g., imager 108) to capture an image (e.g., by imager 108) of the photovoltaic panel for electroluminescence analysis.

It is noted that the steps of the method shown in FIG. 8 are optional and may be performed in a different order. For example, step 804 may be performed before step 802.

Figure 9A:
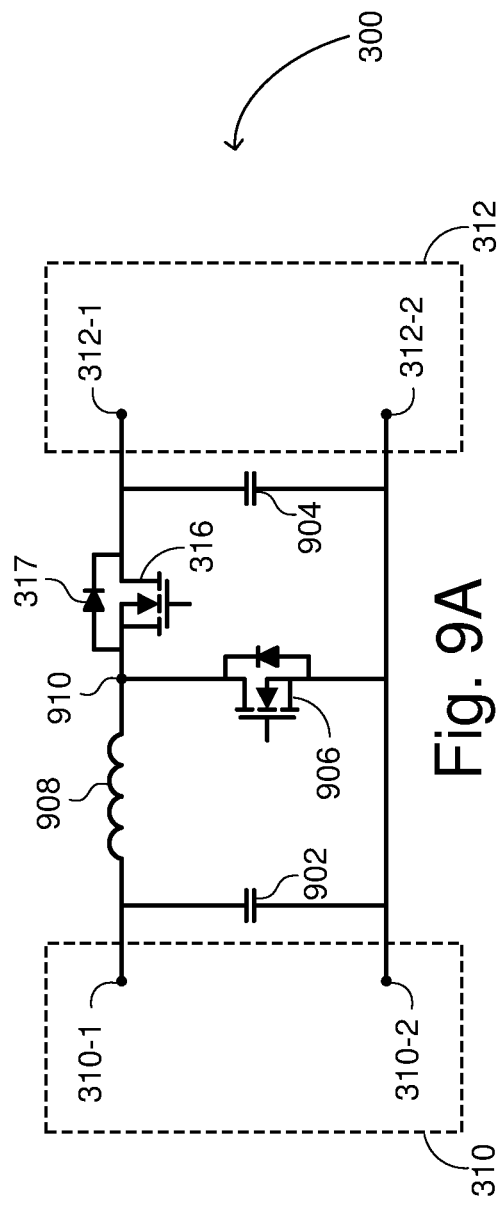
FIG. 9A shows an example of a boost converter in a power device according to aspects of the disclosure herein.

As mentioned above, the power device may comprise a power converter that includes a diode that restricts reverse current from flowing to the corresponding photovoltaic panel of the power device. Reference is now made to FIGS. 9A-9E, which show various examples of a power converter 300 according to aspects of the disclosure herein. FIGS. 9A-9D illustrate examples of DC-DC converters and FIG. 9E illustrates an example of a DC-AC converter (e.g., an inverter or a microinverter). As mentioned above in conjunction with FIG. 3A, power converter 300 may be a bi-directional converter, which may convert power from first (upstream) terminals 310 to second (downstream) terminal 312 and/or convert power from downstream terminals 312 to upstream terminals 310. For example, as elaborated herein in conjunction with FIGS. 9A-9E, power converter 300 may modify (e.g., increase or decrease) one or more of a voltage and a current, based on a duty cycle of a pulse width modulation (PWM) signal. In the example of FIG. 9A, power converter 300 may comprise switch 316, a second switch 906, an inductor 908, a first capacitor 902, and/or a second capacitor 904. In the examples of FIGS. 9A-9E, the switches are shown as Metal Oxide Semiconductor Field Effect Transistors (MOSFETs), but any suitable switch or transistor may be used (e.g., Bipolar Junction Transistor (BJT), Insulated Gate Bipolar Transistor (IGBT), Gallium Nitride (Gan) Transistors, Silicon Carbide (SiC) MOSFETS, Thyristor, etc.). A source of switch 316 may be connected to a drain of second switch 906 at a connection point 910. Inductor 908 may be connected between first terminal 310-1 and connection point 910. First capacitor 902 may be connected between first terminal 310-1 and second terminal 310-2. Second capacitor 904 may be connected between third terminal 312-1 and fourth terminal 312-2. Second terminal 310-2 and fourth terminal 312-2 may be connected to each other. As shown in FIG. 9A, diode 317 of switch 316 may restrict current from flowing from third terminal 312-1 toward first terminal 310-1 where switch 316 is in a non-conducting state (e.g., switch 316 does not enable current to flow from the drain to the source of switch 316).

FIG. 9A shows an example in which power converter 300 may operate as a synchronous boost converter when converting power from first (upstream) terminals 310 to second (downstream) terminals 312. Power converter 300 may operate as a synchronous buck converter when converting power from downstream terminals 312 to upstream terminals 310. Converter 300 may use a PWM signal to control the states of switches 316 and 906. When power converter 300 operates as a boost converter (e.g., as controlled by power device controller 302) to convert power from upstream terminals 310 to downstream terminals 312 using a PWM signal, the voltage level at downstream terminals 312 may be related to the voltage level at upstream terminals 310 by a factor of 1/1−D1, where D1 is a first duty cycle (e.g., a value between 0 and 1) of the PWM signal. Such as when power device controller 302 controls power converter 300 as buck converter to convert power from downstream terminals 312 to upstream terminals 310 using a PWM signal, the voltage level at upstream terminals 310 may be related to voltage levels at downstream terminals 312 by D2, where D2 is a second duty cycle of the PWM signal, which may be the same as, or different from, D1.

Figure 9B:
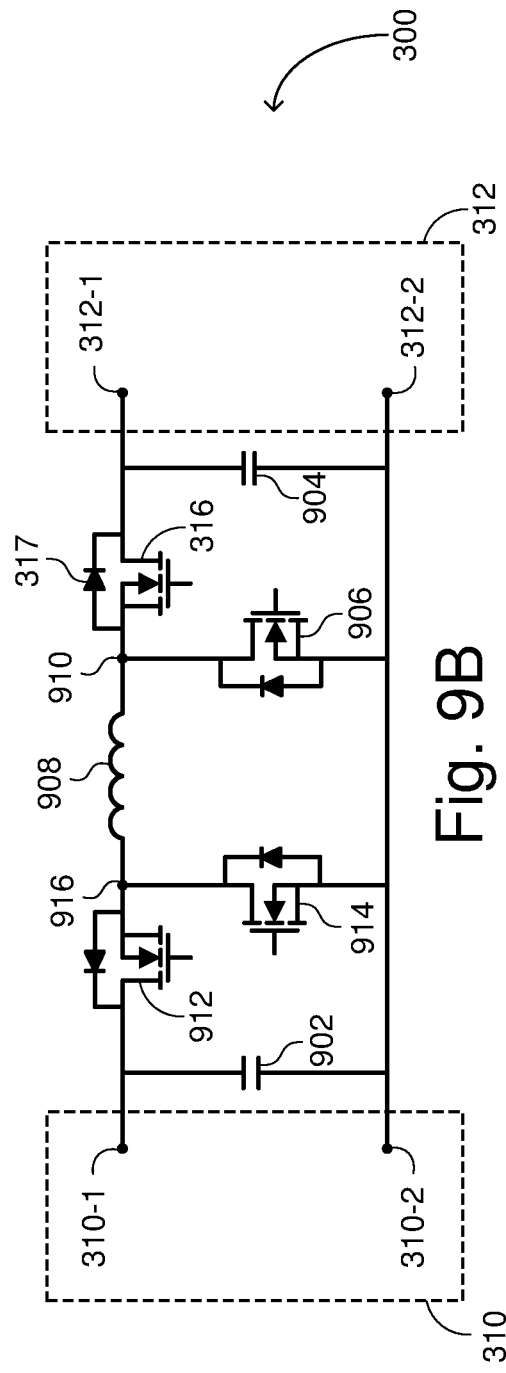
FIG. 9B shows an example of a buck and boost converter in a power device according to aspects of the disclosure herein.

FIG. 9B shows an example in which power converter 300 may operate as a synchronous buck and boost converter and may comprise a switch 316, a second switch 906, a third switch 912, a fourth switch 914, an inductor 908, a first capacitor 902, or a second capacitor 904. In the example of FIG. 9B, third switch 912 and fourth switch 914 are shown as MOSFETs, but any suitable switch or transistor could be used (e.g., Bipolar Junction Transistor (BJT), Insulated Gate Bipolar Transistor (IGBT), Gallium Nitride (Gan) Transistors, Silicon Carbide (SiC) MOSFETS, Thyristor, etc.). The source of switch 316 may be connected to the drain of the second switch 906 at a connection point 910. A source of third switch 912 may be connected to a drain of the fourth switch 914 at a connection point 916. The drain of third switch 912 may be connected to first terminal 310-1. The drain of switch 316 may be connected to third terminal 312-1. Inductor 908 may be connected between connection point 910 and connection point 916. First capacitor 902 may be connected between first terminal 310-1 and second terminal 310-2. Second capacitor 904 may be connected between third terminals 312-1 and fourth terminal 312-2. Second terminal 310-2 and fourth terminal 312-2 may be connected to each other. Similar to as shown in FIG. 9A, in FIG. 9B, diode 317 of switch 316 may restrict current from flowing from third terminal 312-1 toward first terminal 310-1 when switch 316 is in a non-conducting state.

Power converter 300, when comprising a synchronous buck and boost converter, may be used as either a buck converter, a boost converter, or a buck-boost converter, either when converting power from upstream terminals 310 to downstream terminals 312, or from downstream terminals 312 to upstream terminals 310. When power device controller 302 controls power converter 300 as a buck-boost converter to convert power from upstream terminals 310 to downstream terminals 312 using a PWM signal, the voltage level at downstream terminals 312 may be related to the voltage level at upstream terminals 310 by a factor D3/(1−D3), where D3 is a duty cycle of the PWM signal. When power device controller 302 controls converter 300 as a buck-boost converter to convert power from downstream terminals 312 to upstream terminals 310 using a PWM signal, the voltage level at upstream terminals 310 may be related to the voltage level at downstream terminals 312 by a factor D4/(1−D4), where D4 is a duty cycle of the PWM signal.

Figure 9C:
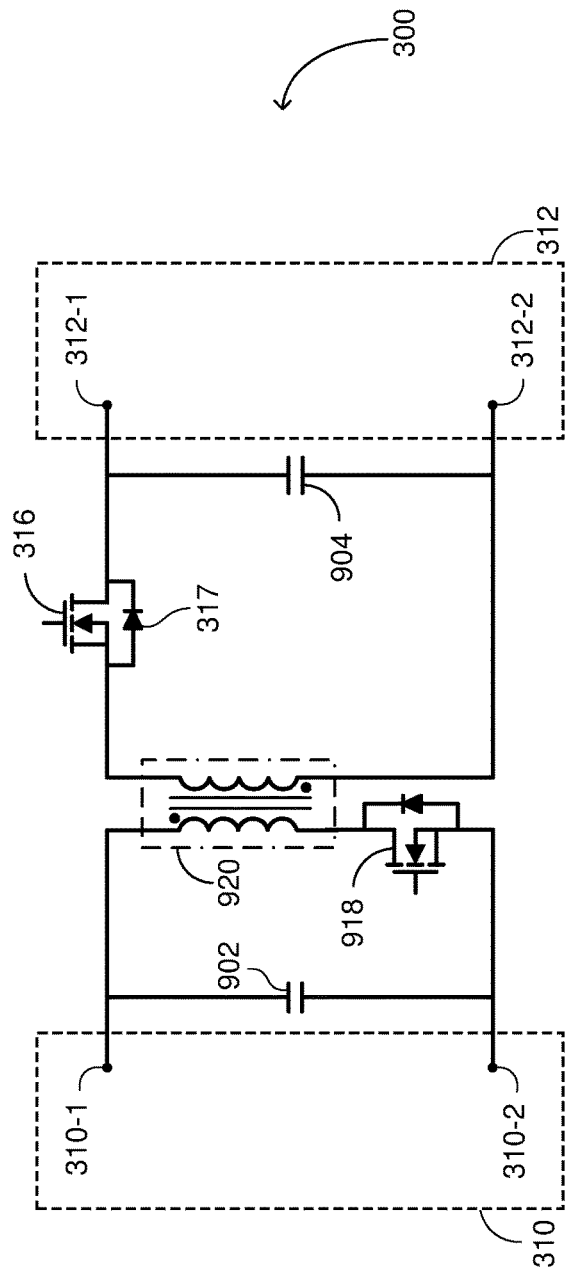
FIG. 9C shows an example of a flyback converter in a power device according to aspects of the disclosure herein.

FIG. 9C shows an example in which power converter 300 may comprise a synchronous flyback converter, which may be an isolated non-inverting buck-boost converter. Power converter 300 comprising a synchronous flyback converter may comprise a switch 316, a second switch 918, a coupled inductor 920, a first capacitor 902 and a second capacitor 904. In the example of FIG. 9C, second switch 918 is also shown as a MOSFET, though any suitable switch or transistor may be used (e.g., Bipolar Junction Transistor (BJT), Insulated Gate Bipolar Transistor (IGBT), Gallium Nitride (Gan) Transistors, Silicon Carbide (SiC) MOSFETS, Thyristor, etc.). The primary side windings of coupled inductor 920 may be connected between the drain of second switch 918 and first terminal 310-1. The source of second switch 918 may be connected to second terminal 310-2. The secondary side windings of coupled inductor 920 may be connected between the source of switch 316 and fourth terminal 312-2. The drain of switch 316 may be connected to third terminal 312-1. First capacitor 902 may be connected between first terminal 310-1 and second terminal 310-2. Second capacitor 904 may be connected between third terminal 312-1 and fourth terminal 312-2. Similar to as shown in FIGS. 9A and 9B, diode 317 of switch 316 in FIG. 9C may restrict current from flowing from third terminal 312-1 toward first terminal 310-1 if switch 316 is in a non-conducting state.

Such as when power device controller 302 controls flyback converter 300 to convert power from upstream terminals 310 to downstream terminals 312 using a PWM signal, the voltage level at downstream terminals 312 may be related to the voltage level at upstream terminals 310 by a factor of (n*D5)/(1−D5), where D5 is a duty cycle of the PWM signal and n is a turns ratio of coupled inductor 920 (e.g., a ratio between the number of turns in secondary side of coupled inductor 920, and the number of turns in the primary side of coupled inductor 920). Converter 300 operates (e.g., as controlled by power device controller 302) to convert power from downstream terminals 312 to upstream terminals 310 using a PWM signal, the voltage level at upstream terminals 310 may be related to the voltage level at downstream terminals 312 by a factor D6/n*(1−D6), where D6 is a duty cycle of the PWM signal.

Figure 9D:
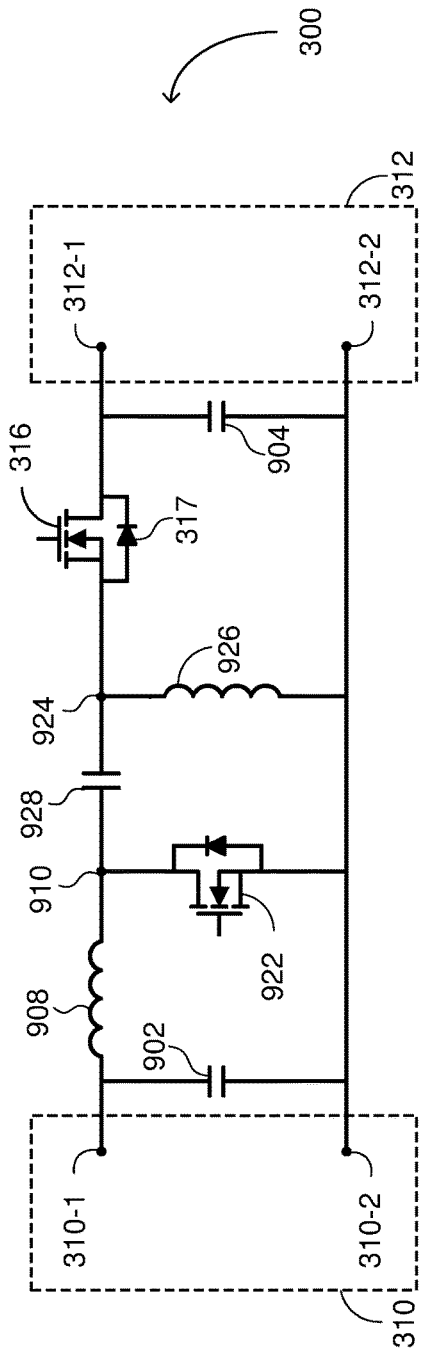
FIG. 9D shows an example of a SEPIC converter in a power device according to aspects of the disclosure herein.
Figure 9E:
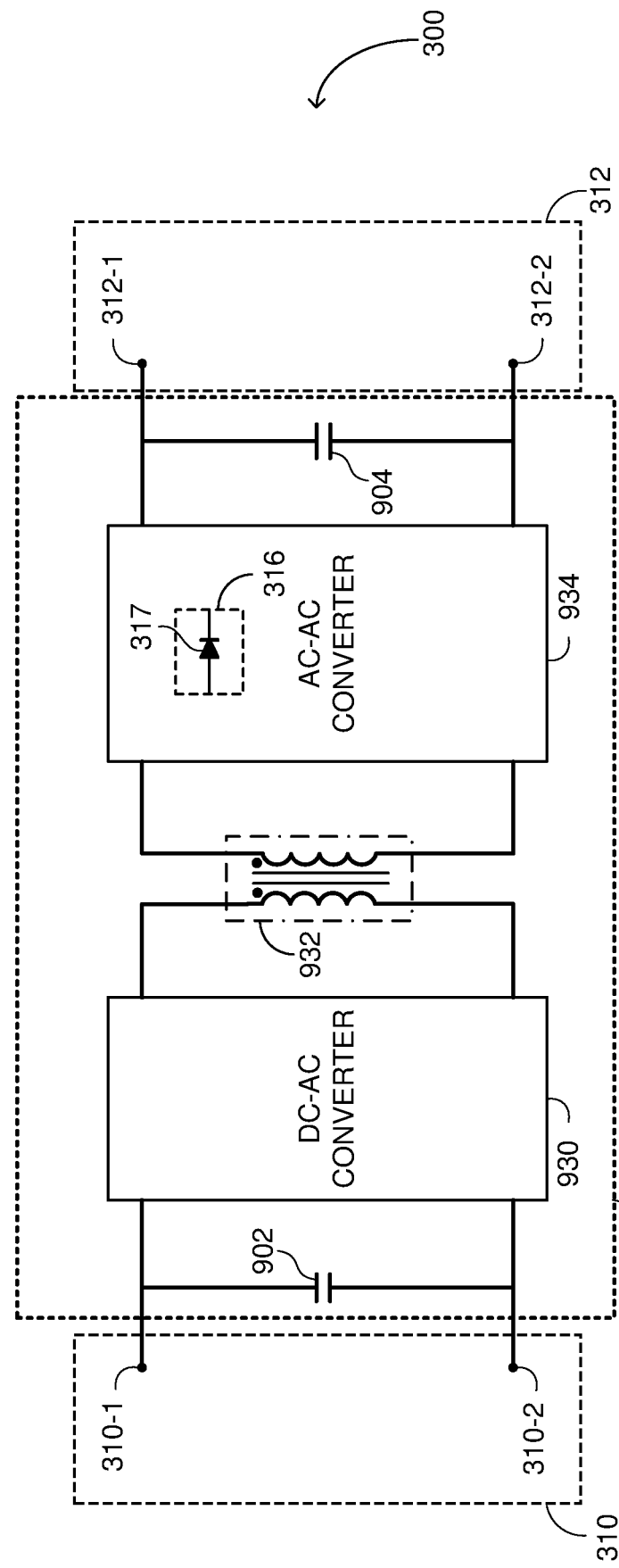
FIG. 9E shows an example of a DC-AC converter in a power device according to aspects of the disclosure herein.

FIG. 9D shows an example of power converter 300 comprising a synchronous Dual Single-Ended Primary-Inductor (Dual SEPIC) converter, which may be a non-inverting buck-boost converter. Power converter 300 comprising a synchronous Dual-SEPIC converter may comprise switch 316, a second switch 922, a first inductor 908, a second inductor 926, a first capacitor 902, a second capacitor 904 and a third capacitor 928. In the example of FIG. 9D, second switch 922 is also shown as a MOSFET, though any suitable switch or transistor could be used (e.g., Bipolar Junction Transistor (BJT), Insulated Gate Bipolar Transistor (IGBT), Gallium Nitride (Gan) Transistors, Silicon Carbide (SiC) MOSFETS, Thyristor, etc. The source of switch 316 may be connected to connection point 924, and the drain of switch 316 may be connected to third terminal 312-1. The drain of second switch 922 may be connected to connection point 910, and the source of second switch 922 may be connected to second terminal 310-2. Third capacitor 928 may be connected between connection points 910 and 924. First inductor 908 may be connected between connection point 910 and first terminal 310-1. Second inductor 926 may be connected between connection point 924 and fourth terminal 312-2. First capacitor 902 may be connected between first terminal 310-1 and second terminal 310-2. Second capacitor 904 may be connected between third terminals 312-1 and fourth terminal 312-2. Second terminal 310-2 and fourth terminal 312-2 may be connected to each other. Similar to as shown in FIGS. 9A, 9B, and 9C, in FIG. 9D, diode 317 of switch 316 may restrict current from flowing from third terminal 312-1 toward first terminal 310-1 if switch 316 is in a non-conducting state.

Dual SEPIC converter 300 may operate (e.g., as controlled by power device controller 302) to convert power from upstream terminals 310 to downstream terminals 312 using a PWM signal, the voltage level at downstream terminals 312 may be related to the voltage level at upstream terminals 310 by a factor D7/(1−D7), where D7 is a duty cycle of the PWM signal. Converter 300 may operate (e.g., as controlled by power device controller 302) to convert power from downstream terminals 312 to upstream terminals 310 using a PWM signal, the voltage level at upstream terminals 310 may be related to the voltage level at downstream terminals 312 by a factor D8/(1-D8), where D8 is a duty cycle of the PWM signal.

Reference is now made to FIG. 9E, which shows an example of power converter 300 comprising a DC-AC inverter 901. Power converter 300 comprising a DC-AC inverter 901 may comprise a DC-AC inverter 930, a transformer 932, an AC-AC converter 934, a first capacitor 902, and/or a second capacitor 904. DC-AC inverter 930 may comprise, for example, a half-bridge or a full-bridge converter, a Neutral Point Clamped converter, a flying capacitor converter, or the like. AC-AC converter 934 may be configured to modulate the frequency of an AC power waveform. AC-AC converter 934 may comprise switch 316, which may comprise diode 317. DC-AC inverter 930 may be connected to first terminal 310-1 and second terminal 310-2. AC-AC converter 934 may be connected to third terminal 312-1 and fourth terminal 312-2. Transformer 932 may be connected to DC-AC inverter 930 and to AC-AC converter 934. First capacitor 902 may be connected between first terminal 310-1 and second terminal 310-2. Second capacitor 904 may be connected between third terminals 312-1 and fourth terminal 312-2.

DC-AC inverter 930 may receive DC power at first terminal 310-1 and second terminal 310-2, and may convert the DC power to a first AC power waveform having a first frequency. In some embodiments, transformer 932 may be a step-up transformer, in which the number of windings in the secondary windings may be larger than the number of windings in the primary windings. Thus, the voltage level at the secondary side may be larger (e.g., stepped-up) than the value of the voltage and the primary side. AC-AC converter 934 may convert the first AC power (e.g., stepped-up) waveform to a second AC power waveform having a second frequency, which may be different (e.g., lower or higher) from the first frequency. For example, the second AC power waveform may be on the order of tens of Hertz. Producing a first AC power waveform with a frequency higher frequency (e.g., hundreds of Hertz or higher) may enable a reduction in the size of transformer 932 (e.g., the size of a transformer may be inversely proportional to the frequency of the first AC waveform). Similar to as shown in FIGS. 9A, 9B, 9C and 9D, in FIG. 9E, diode 317 of switch 316 may restrict current from flowing from third terminal 312-1 to first terminal 310-1 when switch 316 is in a non-conducting state.

As mentioned above, power converter 300 may be a bi-directional converter, which may convert power from upstream terminals 310 to downstream terminals 312, or from downstream terminals 312 to upstream terminals 310. The conversion ratio between the voltages when power converter 300 converts power from upstream terminals 310 to downstream terminals 312 may be different from the conversion ratio between the voltage levels when power converter 300 converts power from downstream terminals 312 to upstream terminals 310. For example, power converter 300 may convert power from upstream terminals 310 to downstream terminals 312, where the voltage level at upstream terminals 310 may be 36 volts and the voltage level at downstream terminals 312 may be 100V. Power converter 300 may convert power from downstream terminals 312 to upstream terminals 310, where the voltage level at downstream terminals 312 may be 90 volts and the voltage level at first terminal 310 may be 24V. It is noted that the numerical examples are non-limiting and are brought herein for the sake of clarity of the explanation. Other numbers or ratios may be employed.

With reference to FIG. 3A and FIGS. 9A-9E, power device controller 302 may control parameters when power converter 300 converts power from upstream terminals 310 to downstream terminals 312, that are different from the parameters when power converter 300 converts power from downstream terminals 312 to upstream terminals 310. For example, when power converter 300 converts power from upstream terminals 310 to downstream terminals 312, the controlled parameter may be one or more of the voltage level at upstream terminals 310, and the voltage level at downstream terminals 312. When power converter 300 converts power from downstream terminals 312 to upstream terminals 310, the controlled parameter may be one or more of the current level through first terminal 310-1, second terminal 310-2, third terminal 312-1, or fourth terminal 312-2. For example, when power converter 300 converts power from downstream terminals 312 to upstream terminals 310 for electroluminescence imaging purposes, power device controller 302 may employ the current through first terminal 310-1 as the controlled parameter. For example, when power converter 300 converts power from upstream terminals 310 to downstream terminals 312 for power production purposes, power device controller 302 may employ the voltage at upstream terminals 310 as the controlled parameter.

Aspects of the disclosure herein may include a power device 116 that comprises a bypass circuit, which may provide a path for reverse current to follow to the corresponding photovoltaic panel. Such a bypass circuit may be useful in non-synchronous converters where the diode is not connected to a switch (e.g., a non-synchronous boost converter) or in DC isolated converters, such as those in FIGS. 9C-9E. The bypass circuit may comprise a switch or switches which may be controlled by power device controller 302, or may operate independently. FIGS. 10A-10B, 11A-11C, and 12A-11B show examples of such bypass circuits.

Reference is made to FIGS. 10A and 10B, which show a power device 116, which may comprise a bypass circuit 1000 connected to power device controller 302. Other components, modules, or features of power device 116, which are described herein above, are omitted for the sake of clarity of FIG. 10A. In the example shown in FIG. 10A, auxiliary power circuit 308 may receive power from first terminal 310-1 and second terminal 310-2, or from third terminal 312-1 and fourth terminal 312-2, or from both. Power device controller 302 may control bypass circuit 1000, (e.g., by generating a control signal) to create a current path between third terminal 312-1 and first terminal 310-1 (e.g., enabling current to flow to the photovoltaic panel, for example, for an electroluminescence test). Power device controller 302 may control bypass circuit 1000 based on one or more of a measured voltage between third terminal 312-1, a fourth terminal 312-2, and based on a received signal (e.g., similar to as described above in conjunction with FIG. 4). FIG. 10B shows an example of bypass circuit 1000 which may be controlled by power device controller 302. In FIG. 10B, bypass circuit 1000 is shown as comprising two N-type MOSFETs switches 1002-1 and 1002-2, but any suitable switch or transistor may be used. The drain of switch 1002-1 may be connected to the drain of switch 1002-2. The source of switch 1002-1 may be connected to first terminal 310-1 and the source of switch 1002-2 may be connected to third terminal 312-1. The gates of switches 1002-1 and 1002-2 may be connected to power device controller 302. Additional elements such as gate drivers, level shifters, and logic circuits may be included in the connection of each gate to power device controller 302 and/or to each other. In FIG. 10B, bypass circuit is shown as including two switches (e.g., switch 1002-1 and switch 1002-2). It is noted that bypass circuit 1000 may include one or more additional components such as resistors (e.g., a resistor divider), capacitors, inductors, and diodes.

Reference is made to FIGS. 11A, 11B and 11C, which show examples of a power device 116, which may comprise a bypass circuit 1100. Other components, modules, or features of power device 116, which are described herein above, are omitted for the sake of clarity of FIGS. 11A-11C. In the example shown in FIGS. 11A-11C, auxiliary power circuit 308 may receive power from first terminal 310-1 and second terminal 310-2 only. Bypass circuit 1100 may operate independently (e.g., independent of power device controller 302), to create a current path between third terminal 312-1 and first terminal 310-1). For example, based on the voltage at third terminal 312-1 being higher than the voltage at first terminal 310-1, bypass circuit may create a current path between third terminal 312-1 and first terminal 310-1. FIG. 11B shows an example of bypass circuit 1100, which may comprise N-type MOSFET switch 1102 and a P-type MOSFET switch 1104, but any suitable switch or transistor may be used. The source of switch 1102 may be connected to the drain of switch 1104. The drain and gate of switch 1102 may be connected to third terminal 312-1. The source and gate of switch 1104 may be connected to first terminal 310-1. When the voltage level between third terminal 312-1 and first terminal 310-1 is below a first threshold, switch 1102 and switch 1104 may be in a non-conducting state, thereby blocking a current path between third terminal 312-1 and first terminal 310-1. When the voltage level between third terminal 312-1 and first terminal 310-1 is above or increases above a second threshold, switch 1102 and switch 1104 may be in or transition to, respectively, a conducting state, thus creating a current path between third terminal 312-1 and first terminal 310-1. The first threshold and the second threshold may be the same, or they may be different. FIG. 11C shows another example of bypass circuit 1100, which may comprise a diode for alternating current (DIAC) (also referred to as a diode AC switch) 1106 and a diode 1108. The anode of diode 1108 may be connected to one terminal (e.g., Main Terminal 2 (MT2)) of DIAC 1106. The cathode of diode 1108 may be connected to first terminal 310-1. The other terminal (e.g., MT1) of DIAC 1106 may be connected to third terminal 312-1. Such as when the voltage level between third terminal 312-1 and first terminal 310-1 increases above a threshold, DIAC 1106, and consequently diode 1108 may be come conductive, thus creating a current path between third terminal 312-1 and first terminal 310-1. It is noted that bypass circuit 1100 may include one or more additional components other than the components described in FIGS. 11A-11C. Such one or more additional components may be resistors (e.g., a resistor divider), capacitors, inductors, and diodes.

Reference is made to FIGS. 12A and 12B, which show a power device 116, which may comprise a bypass circuit 1200 connected to comparator circuit 1202 for determining if power is provided by power system controller 104 (e.g., from power source 110) at downstream terminals 312. Other components, modules, or features of power device 116, which are described hereinabove in conjunction with FIGS. 3A-3C, are omitted for the sake of clarity of FIG. 10A. Bypass circuit 1200 may be similar to bypass circuit 1000 (FIG. 10B). Comparator circuit 1202 may compare the voltage level between third terminal 312-1 and first terminal 310-1 and control bypass circuit 1200 to create a current path between third terminal 312-1 and first terminal 310-1 (e.g., based on the voltage level between third terminal 312-1 and first terminal 310-1 exceeding a threshold). FIG. 12B shows an example of comparator circuit which may be used to control bypass circuit 1200. Comparator circuit 1202 may comprise a comparator 1204, a diode 1206 and a capacitor 1208. Comparator circuit 1202 optionally comprises a voltage divider 1210. Diode 1206 and capacitor 1208 may form a bootstrap power supply for providing auxiliary power for comparator 1204. Capacitor 1208 may be connected to first terminal 310-1, to the negative supply terminal, Vs−, of comparator 1204, and to the cathode of diode 1206. The cathode of diode 1206 may be connected to the positive supply terminal, Vs+, of comparator 1204. The anode of diode 1206 may be connected to third terminal 312-1. Third terminal 312-1 may be connected to the positive input of comparator 1204, optionally, via voltage divider 1210. Voltage divider 210 may be connected between third terminal 312-1 and fourth terminal 312-2. The negative input of comparator 1204 may be connected to first terminal 310-1. Responsive to the voltage at third terminal 312-1 being higher than the voltage at first terminal 310-1, capacitor 1208 may charge via diode 1206, thereby providing power for comparator 1204 to operate. Comparator 1204 may compare the voltage at the positive input with the voltage at the negative input, and may control bypass circuit 1200 to create a current path between third terminal 312-1 and first terminal 310-1 (e.g., based on the voltage at the positive input being higher than the voltage at the negative input). In the example shown in FIGS. 12A-12B, comparator circuit 1202 is power from downstream terminals 312, the power devices 116-N may use auxiliary power circuit 308 may receive power from upstream terminals 310 only (e.g., as in normal operation when photovoltaic panel 114 produces power).

As described above, a power device according to aspects of the disclosure herein (e.g., power device 116-N—FIGS. 1A-1C & 3A, 10A, 10B, 11A, 11B, 12A, 12B) may comprise an auxiliary power circuit (e.g., auxiliary power circuit 308—FIGS. 3A-3C), which may receive power either from a photovoltaic panel (photovoltaic panel 114-N—FIGS. 1A-1C), from a power source via power system controller (e.g., power source 110 via power system controller 106—FIGS. 1A-1C), or from both. A power device with such an auxiliary power circuit may be used to characterize and/or determine the physical state of a photovoltaic panel (e.g., with electroluminescence analysis). According to some non-limiting examples, characterizing a photovoltaic panel may include determining an I-V curve corresponding to the photovoltaic panel or determining parameters of a model corresponding to the photovoltaic panel. Such parameters may be open circuit voltage (Voc), shout circuit current (Isc), shunt resistance (Rsh), series resistant (Rsr), fill factor (FF) to name a few. Characterizing a photovoltaic panel may aid in determining the physical, electrical, and functional properties of the panel. For example, characterizing a photovoltaic panel may aid in determining a degradation of the photovoltaic panel over time.

In some cases, determining an I-V curve of a photovoltaic panel during times in which the photovoltaic panel produces power may be challenging, since determining an I-V curve requires changing both the voltage level across, and the current level through the photovoltaic panel (e.g., which may affect the power produced by the photovoltaic panel). Also, determining an I-V curve of a photovoltaic panel during times in which the photovoltaic panel produces power may be affected by the temperature of the photovoltaic panel. In some cases, it may be possible to characterize a photovoltaic panel, when the photovoltaic panel does not produce power (e.g., during low irradiation conditions) using a reverse current. As mentioned above, an I-V curve determined when the photovoltaic panel does not produce power may be referred to as a "dark I-V curve".

According to the disclosure herein, a power device 116-N such as described above in conjunction with FIGS. 1A-1C & 3A, 10A, 10B, 11A, 11B, 12A, 12B may be used to perform dark I-V curve measurements of a photovoltaic panel. It is noted that performing dark I-V curve measurements may be performed with power devices which may comprise a power converter (e.g., a buck converter) that does not have a diode restricting current flowing toward the photovoltaic panel.

Figure 13A:
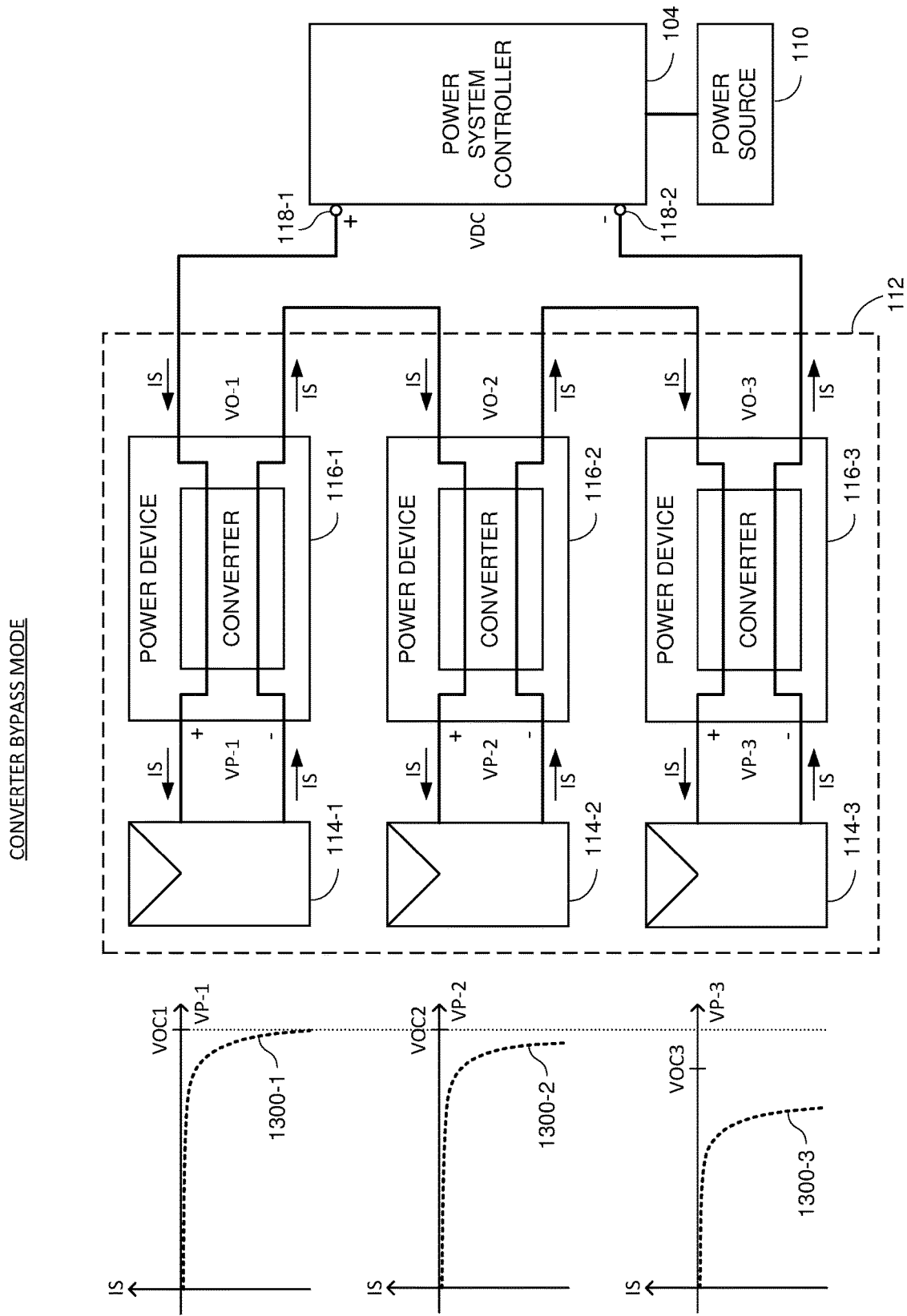
FIG. 13A shows aspects of the system of FIG. 1A, with power devices connected in a series string according to aspects of the disclosure herein.

Reference is now made to FIG. 13A (and also referring to FIGS. 1A-1C, 2 & 3A, 10A, 10B, 11A, 11B, 12A, 12B), which may show aspects of system 100 (FIG. 1A), where power devices 116-1, 116-2, . . . , 116-N may be connected in a series string. For the sake of clarity of FIG. 13A, string 112 is shown to have three power devices 116-1, 116-2, and 116-3, and corresponding photovoltaic panels 114-1, 114-2, and 114-3, though any number of power devices and panels may be included. To characterize photovoltaic panels 114-1-114-3 when photovoltaic panels 114-1-114-3 do not produce power, power system controller 104 may receive power from power source 110, and provide this power at terminals 118-1 and 118-2 (e.g., using power converter 204—FIG. 2). For example, power system controller 104 may produce a voltage, VDC, between terminals 118-1 and 118-2, such that a current may be drawn from power system controller 104 (as further elaborated below). Responsive to VDC between terminals 118-1 and 118-2, a corresponding voltage, VO-n, may develop across third terminal 312-1 and fourth terminal 312-2 of each of corresponding power device 116-N of power devices 116-1, 116-2, . . . , 116-N. Responsive to VO-n (e.g., being above a threshold), the corresponding auxiliary power circuit 308 may be configured to provide power to the various modules of power device 116-N (e.g., power device controller 302, power device communications interface 304, sensor(s) 306 to name a few).

To characterize photovoltaic panels 114-1-114-3, power device controller 302 of each of corresponding power devices 116-1-116-3 may control the corresponding switch 316 (e.g., of FIGS. 9A-9E) to a conducting state. Controlling switch 316 of each power device 116-1-116-3 to a conducting state may enable a reverse current to flow from the third terminal 312-1 to first terminal 310-1, through photovoltaic panel 114, and from second terminal 310-2 to fourth terminal 312-2. In cases in which power devices 116-1-116-3 are connected in a series string, and as shown in FIG. 13A, the same reverse string current, IS, may flow through power devices 116-1-116-3 and corresponding photovoltaic panels 114-1-114-3. Also, since transitioning switch 316 to a conducting state may couple third terminal 312-1 to first terminal 310-1, and second terminal 310-2 is coupled to fourth terminal 312-2, the voltage, VO-n, between third terminal 312-1 and fourth terminal 312-2 is the same as the voltage, VP-n, between first terminal 310-1 and second terminal 310-2.

Figure 13B:
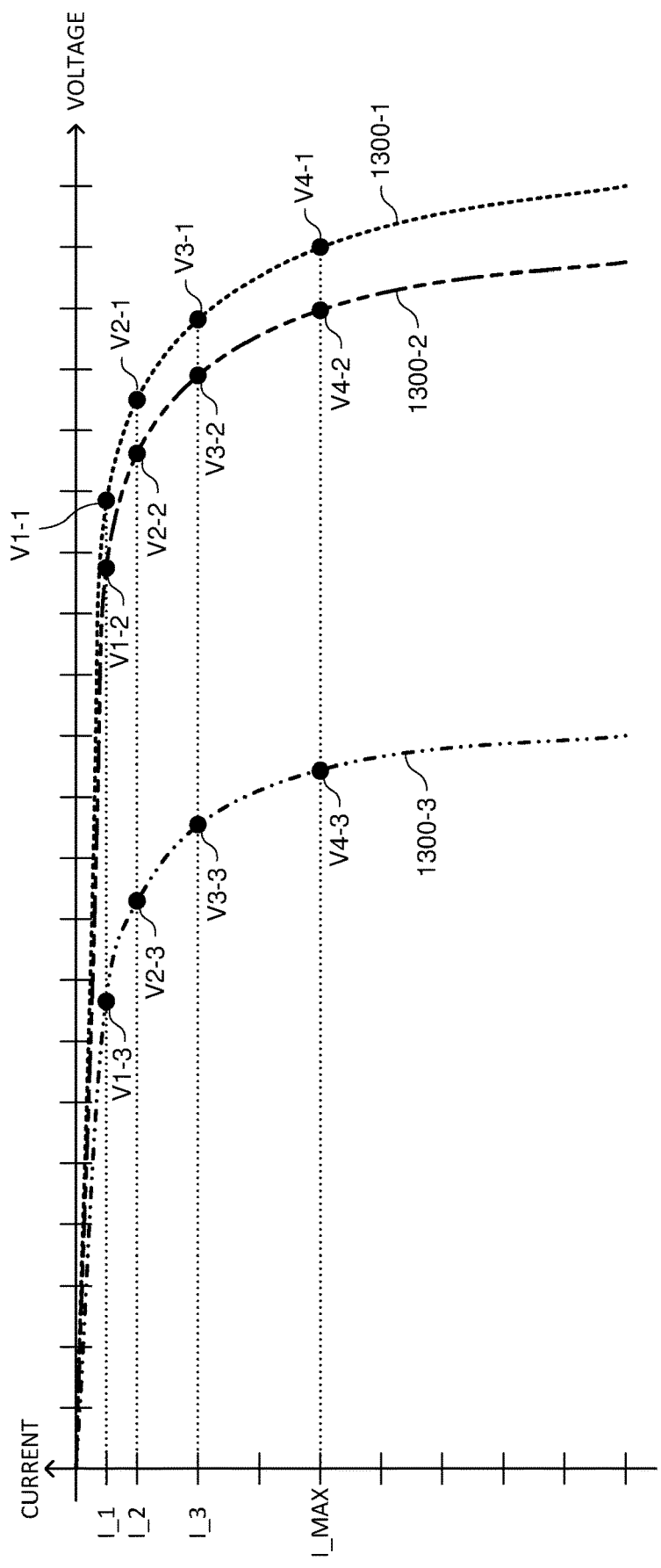
FIG. 13B shows three dark I-V curves according to aspects of the disclosure herein.

According to the disclosure herein, and still referring to FIG. 13A, each level of VDC produced by power system controller 104 may result in a different level IS and thus different levels of VO-n's (and thus a different level of VP-n's). The combination of IS and VP-n may correspond to a point on the dark I-V curve of the corresponding photovoltaic panel 114-1-114-3. Referring to FIGS. 13A and 13B which show three dark I-V curves 1300-1, 1300-2, and 1300-3. Dark I-V curve 1300-1 corresponds to photovoltaic panel 114-1, dark I-V curve 130-2 corresponds to photovoltaic panel 114-2, dark I-V curve 1300-3 corresponds to photovoltaic panel 114-3. Power system controller 104 may produce a voltage, VDC, between terminals 118-1 and 118-2, at a first level. This first level of VDC may result in a reverse string current, IS, of a level I_1 flowing through photovoltaic panels 114-1, 114-2, and 114-3. The first level of VDC may result in a voltage V1-1 across panel 114-1 (across corresponding first terminal 310-1 and second terminal 310-2), a voltage V1-2 across panel 114-2, and a voltage V1-3 across panel 114-3. The combination of I_1 and V1-1 corresponds to a point on dark I-V curve 1300-1 of panel 114-1. The combination of I_1 and V1-2 corresponds to a point on dark I-V curve 1300-2 of panel 114-2. The combination of I_1 and V1-3 corresponds to a point on dark I-V curve 1300-3 of panel 114-3.

Power system controller 104 may increase VDC to a second level, which may result in a reverse string current, IS, of a level I_2. The second level of VDC may result in a voltage V2-1 across panel 114-1, a voltage V2-2 across panel 114-2, and a voltage V2-3 across panel 114-3. The combination of I_2 and V2-1 corresponds to a second point on dark I-V curve 1300-1 of panel 114-1. The combination of I_2 and V2-2 corresponds to a second point on dark I-V curve 1300-2 of panel 114-2. The combination of I_2 and V2-3 corresponds to a second point on dark I-V curve 1300-3 of panel 114-3. Power system controller 104 may increase VDC to various levels, for example, until the reverse string current, IS, reaches a maximum level, where each level results in a power point (voltage and current) on a dark I-V curve 1300-1, 1300-2, and 1300-3, corresponding to photovoltaic panels 114-1-114-3, respectively. Power system controller 104 may increase VDC to various levels until a maximum power level of power system controller 104 is reached. Thus, each of dark I-V curves 1300-1, 1300-2 and 1300-3 may be sampled with a plurality of combinations of VP-n's and IP-n's, where IP-n is a reverse current through the corresponding photovoltaic panel 114-*n* (which may be equal to IS in the example shown in FIGS. 13A and 13B).

According to the disclosure herein, sensor(s) 306 of each of power devices 116-1-116-3 may measure the corresponding VO-n or VP-n. Sensors(s) 306 of each of power devices 116-1-116-3, or sensor(s) 208 of power system controller 104 may measure the reverse string current IS. Power devices 116-1-116-3 may transmit the corresponding measurements to power system controller 104, using the corresponding power device communications interface 304, for example, to central controller 202. Using central controller 202 (FIG. 2), power system controller 104 may determine various characteristics of photovoltaic panels 114-1-114-3, based on the received measurements from power devices 116-1-116-3. For example, using central controller 202, power system controller 104 may fit corresponding curves to the received measurements (e.g., samples) from power devices photovoltaic panels 116-1-116-3 and determine characteristics of the corresponding photovoltaic panels 114-1-114-3 using these curves.

Figure 14:
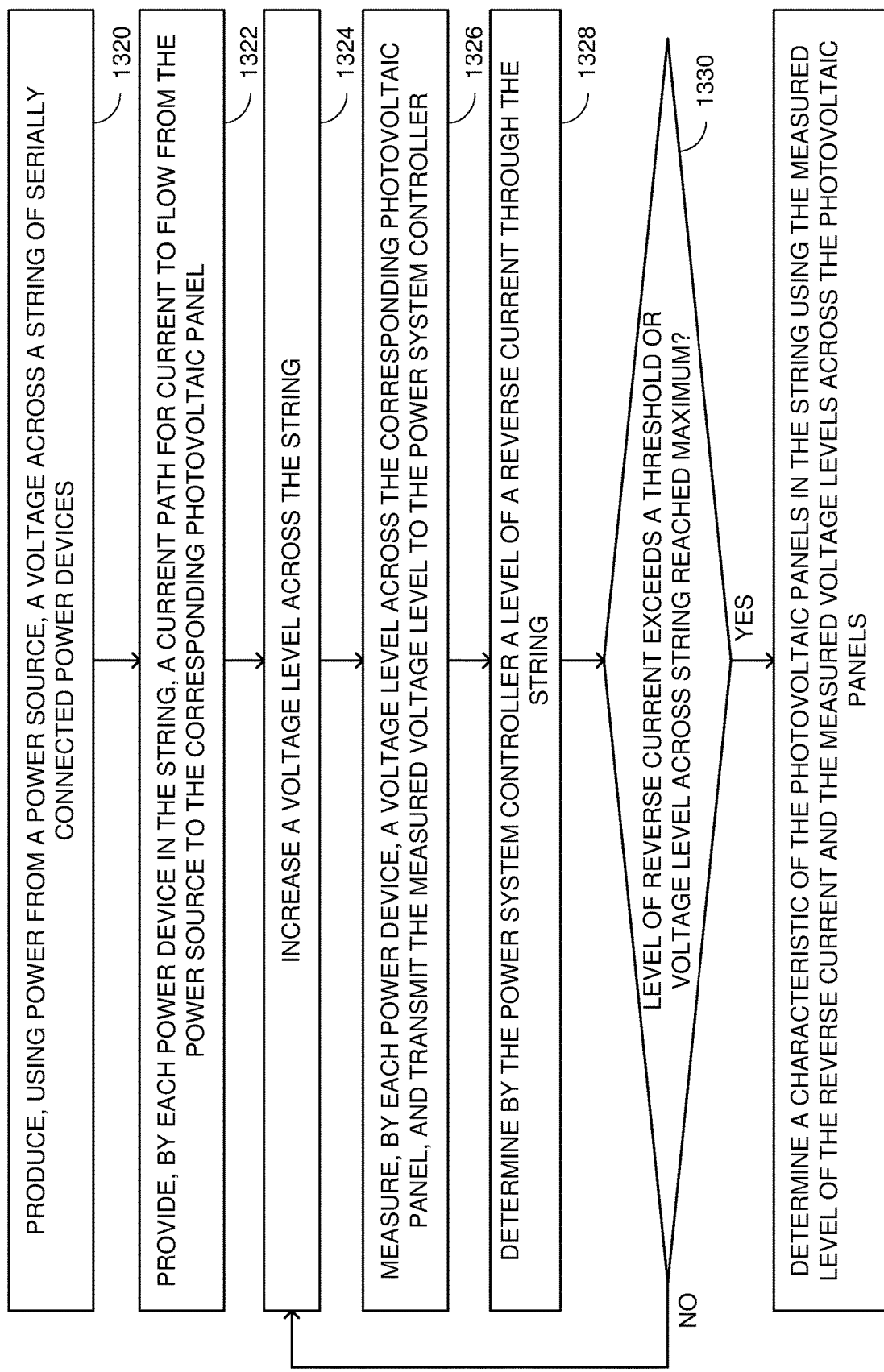
FIG. 14 shows a method for characterizing photovoltaic panels in a series string according to aspects of the disclosure herein.

Reference is now made to FIG. 14, which shows a method for characterizing photovoltaic panels in a string. In step 1320, power from power source 110 is produced, resulting in a voltage being generated across a string 112 of serially connected power devices 116-1-116-N. For example, in cases in which string 112 is coupled to a power system controller 104, which is coupled to power source 110, power system controller 104 may produce (e.g., using power converter 204—FIG. 2) a voltage across string 112 using power from power source 110. The string may include a single power device 116 or multiple power devices 116.

Step 1322 includes providing, e.g., by each power device of power devices 116-1-116-N in string 112, a current path for current to flow to a corresponding photovoltaic panel 114-1-114-N. For example, power device controller 302 of each of power devices 116-1-116-N may control switch 316 of the corresponding power converter 300 to a conducting state. Controlling switch 316 to a conducting state may enable a reverse current to flow from the third terminal 312-1 to first terminal 310-1, through photovoltaic panel 114, and from second terminal 310-2 to fourth terminal 312-2. It is noted that determining a dark I-V curve may be performed with power devices which may comprise power converter (e.g., buck converters) which do not have a diode restricting current flowing toward the photovoltaic panel. In such cases step 1322 is optional.

Step 1324, increase the voltage level across string 112. For example, in cases in which power source 110 is controllable and directly connected to string 112, power source 110 may be configured to increase the voltage level across string 112. In cases in which power source 110 is coupled to power system controller 104, power system controller 104 may increase the voltage level across string 112 using power from power source 110 and power converter 204 (FIG. 2).

Step 1326 includes measuring, e.g., by each power device of power device 116-1-116-N, using the corresponding sensor(s) 306, a voltage level (VP-i) across the corresponding photovoltaic panel (e.g., across first terminal 310-1 and second terminal 310-2), and transmit, using power device communications interface 304, the measured voltage level to the power system controller 104.

Step 1328 includes determining, e.g., by power system controller 104, a level of the reverse current (IS) through the string. For example, power system controller 104 may measure, using sensor(s) 208 (FIG. 2) a level of the reverse current (IS) through the string. Additionally or alternatively, each power device of power devices 116-1-116-N may measure the level of IS (e.g., using sensor(s) 306) and transmit (e.g., using power device communications interface 304) the measurements of IS to the power system controller 104. Power system controller 104 may determine IS based on the received measurements.

Step 1330 includes determining, e.g., by power system controller 104 (e.g., using sensor(s) 208), if the level of the reverse current exceeds a threshold, or if the voltage level across string 112 reached a maximum. In cases in which the level of the reverse current did not exceed a threshold, or the voltage level across string 112 did not reach a maximum the method may return to step 1324. In cases in which the level of the reverse current exceeds a threshold, or if the voltage level across string 112 reaches a maximum, the method may proceed to step 1332.

Step 1332 includes determining, e.g., for example by power system controller 104 (e.g., using processor 210), a characteristic of the photovoltaic panels in string 112 using the measured level of the reverse current and the measured voltage levels across the photovoltaic panels. Determining a characteristic of a photovoltaic panel 114-N may comprise determining an I-V curve corresponding photovoltaic panel 114-N. Determining a characteristic of a photovoltaic panel 114-N may comprise determining electrical parameters (e.g., Rsh, Rs, Voc, etc.) corresponding to photovoltaic panel 114-N.

When using panel characterization as described above in conjunction with FIGS. 13A-13B, and 14, the dark I-V curves of some of photovoltaic panels 114-1-114-N may not be sufficiently sampled to characterize the photovoltaic panels. For example, curve 1300-1 may not be sufficiently sampled to characterize the photovoltaic panel 114-1. In some cases, string 112 comprises a large number of photovoltaic panels 114-1-114-N. In such cases, the voltage division of VDC between photovoltaic panels 114-1-114-N may render the highest voltage at each photovoltaic panel lower than required to characterize the panel. According to aspects of the disclosure herein, each of power devices 116-1-116-N may use the corresponding power converter 300 to convert power from third terminal 312-1 and fourth terminal 312-2, to first terminal 310-1 and second terminal 310-2. Thus, each photovoltaic panel may be characterized using points having different voltages and currents on the corresponding dark I-V curve as further elaborated below.

Figure 15A:
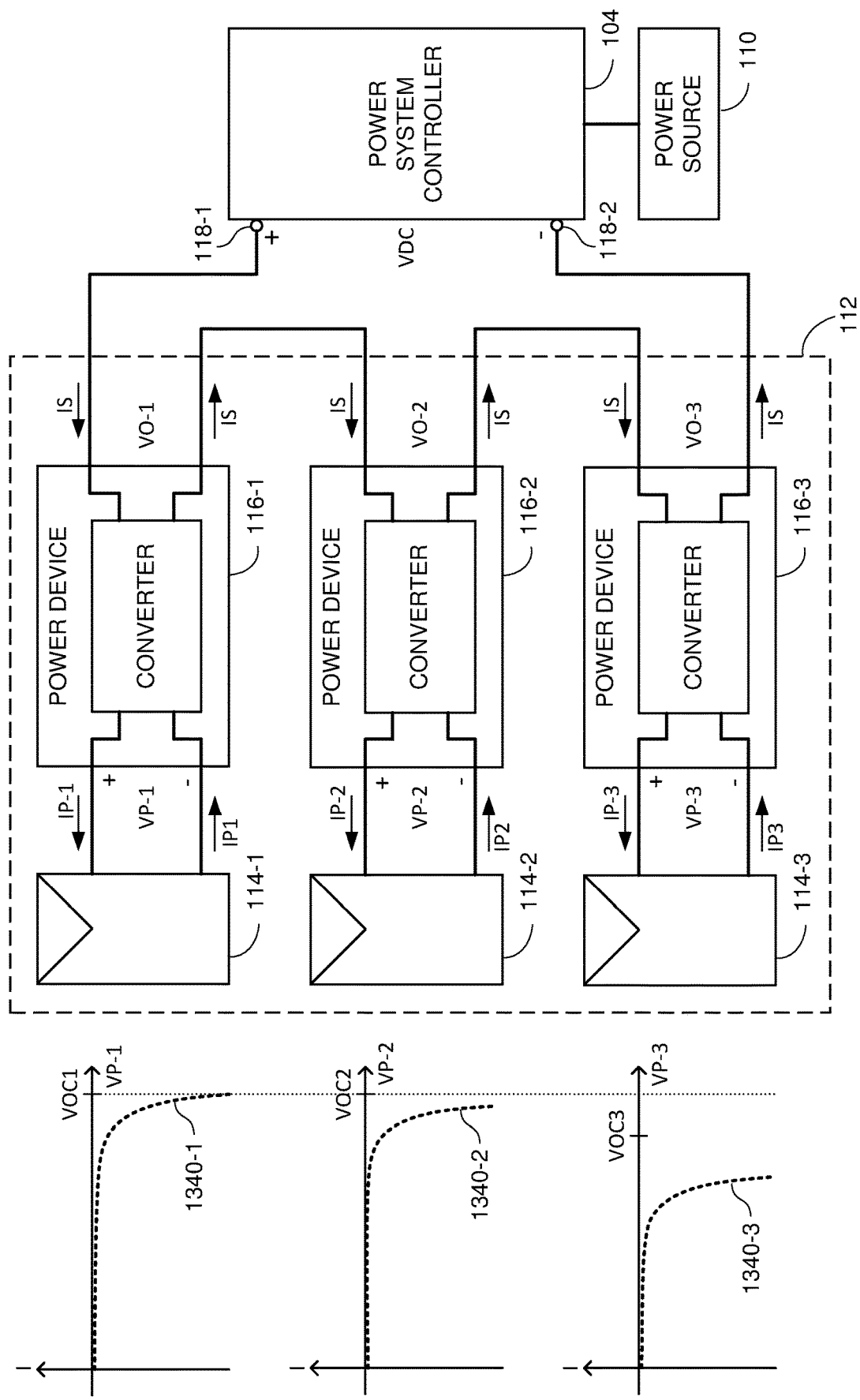
FIG. 15A shows aspects of the system of FIG. 1A, with power devices connected in a series string according to aspects of the disclosure herein.

Reference is made to FIG. 15A, which shows aspects of system 100 described herein above in conjunction with FIG. 1A, where power devices 116-1, 116-2, . . . , 116-N may be connected in series string 112. For the sake of clarity of FIG. 15A, string 112 is shown to have three power devices 116-1, 116-2, and 116-3, and corresponding photovoltaic panels 114-1, 114-2, and 114-3, though the system could include any number of power devices and panels. To characterize photovoltaic panels 114-1-114-3 when photovoltaic panels 114-1-114-3 do not produce power, power system controller 104 may use power from power source 110 and produce power at terminals 118-1 and 118-2 (e.g., using power converter 204—FIG. 2). For example, power system controller 104 may produce a voltage, VDC, between terminals 118-1 and 118-2, such that a current may be drawn from power system controller 104. Responsive to VDC between terminals 118-1 and 118-2, a corresponding voltage, VO-n, may develop across third terminal 312-1 and fourth terminal 312-2 of each corresponding power device 116-N of power devices 116-1-116-3. Responsive to receiving VO-n (e.g., VO-n being above a threshold), the corresponding auxiliary power circuit 308 may be configured to provide power to the various modules of power device 116-N.

According to the disclosure herein, power system controller 104 may use power from power source 110 and may produce VDC at a determined level. Power system controller 104 may transmit, using communications interface 206 a signal corresponding to a power level, Pn, to each of power devices 116-1-116-3. Each one of power devices 116-1-116-3, which received the signal, may convert the power, Pn, from third and fourth terminals 312-1 and 312-2, to first and second terminals 310-1 and 310-2. Since power devices 116-1-116-3 are connected in a series string, and VDC is determined by power system controller 104, the reverse current, IS, through string 112 may be determined by:

$$IS = \frac{\sum_{n=1}^{N} Pn}{VDC} \quad (1)$$

The reverse string current, IS, is defined by the total power from power system controller 104 and VDC. The power, Pn, converted by power device 116-N, is determined by power system controller 104. The voltage, VO-n, between third terminals 312-1 and fourth terminal 312-2 of power device 116-N, may be given by:

$$VO\text{-}n = \frac{Pn}{IS} \quad (2)$$

Since the power at terminal third 312-1 and fourth terminals and 312-2 is equal (ignoring losses) to the power at first and second terminals 310-1 and 310-2, Pn is also the power provided to photovoltaic panel. Thus, Pn may also determine a voltage, VP-n, across the photovoltaic panel 114-N, and a reverse current, IP-n through photovoltaic panel 114-N as follows:

$$Pn = VP\text{-}n \cdot IP\text{-}n \quad (3)$$

VP-n and IP-n may be a point on the dark I-V curve of photovoltaic panel 114-N. By using a plurality power levels for each of power device 116-1-116-3, power system controller 104 may sample the dark I-V curves of the corresponding photovoltaic panels 114-1-114-3 at a plurality of different points.

Figure 15B:
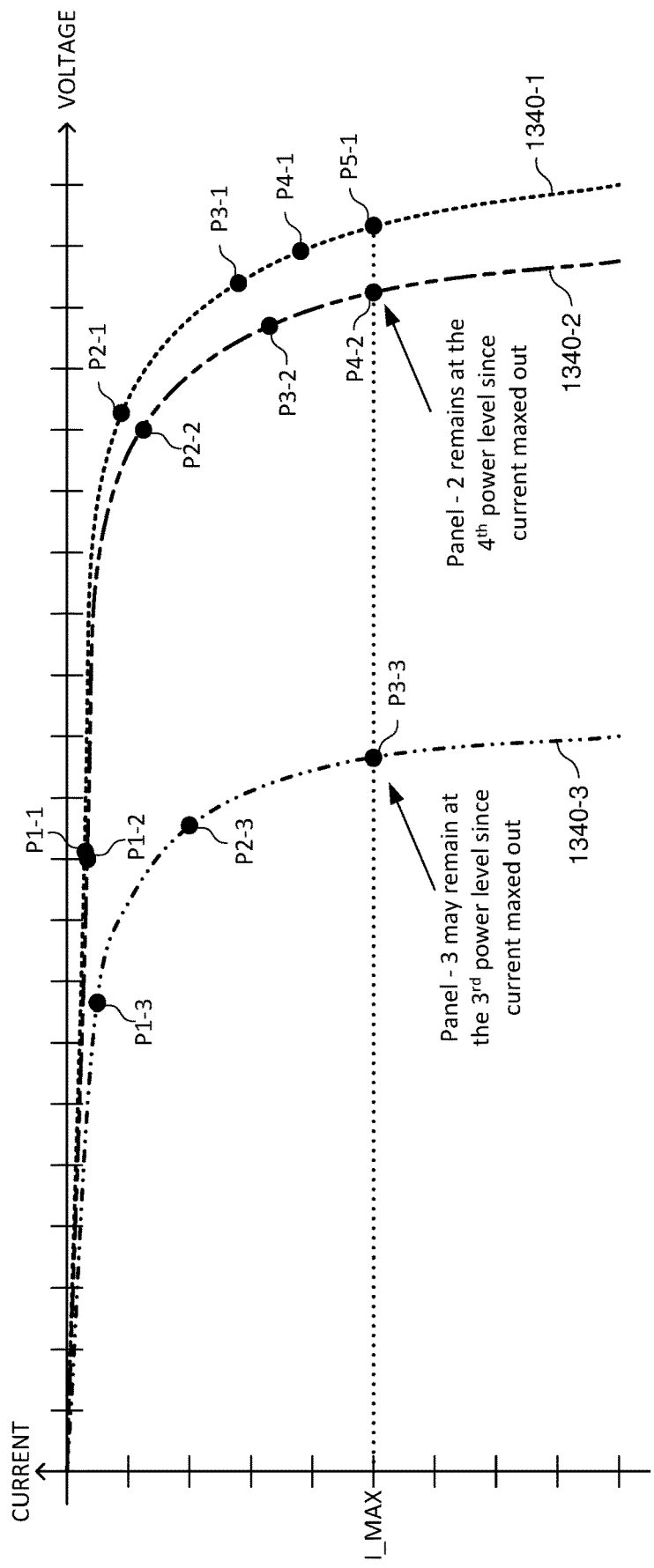
FIG. 15B shows three dark I-V according to aspects of the disclosure herein.

Reference is made to FIGS. 15A and 15B, which may show three dark I-V curves 1340-1, 1340-2, and 1340-3. Dark I-V curve 1340-1 corresponds to photovoltaic panel 114-1, dark I-V curve 1340-2 corresponds to photovoltaic panel 114-2, dark I-V curve 1340-3 corresponds to photovoltaic panel 114-3. In the example shown in FIG. 15B, power system controller 104 transmits power levels P1-1, P1-2, and P1-3 to power devices 116-1-116-3 respectively. Each of power devices 116-1-116-3 receives corresponding power levels, and convert the received power levels to corresponding Ips and VPs equal to the received power levels. The corresponding Ips and VPs may result in corresponding points on the respective dark I-V curves 1340-1, 1340-2, and 1340-3. According to the disclosure herein, each of power devices 116-1-116-3 may measure the levels of the corresponding VP-n and IP-n (e.g., using sensor(s) 306) and transmit (e.g., using power device communications interface 304) the measurements to power system controller 104.

Similarly, power system controller 104 may transmit power levels P2-1, P2-2, and P2-3 to and P3-1, P3-2, and P3-3 to power devices 116-1-116-3. After receiving the measurements from one of the power devices 116-1-116-3 corresponding to one or more of the currents IP-1-IP-2, (e.g., measurements from 116-3 corresponding to IP-3), power system controller 104 may determine that the reverse current for the corresponding panel (e.g., IP-3 through photovoltaic panel 114-3) reached a maximum level. Therefore, power system controller 104 may maintain the power level transmitted to power device 116-3 at P3-3 or reduce the power level transmitted to power device 116-3. Power system controller 104 may proceed and transmit higher power levels to the remaining power devices, such as transmitting P4-1 and P4-2 to power devices 116-1 and 116-2. After receiving the measurements corresponding to P4-2 from power device 116-2, power system controller 104 may determine that the reverse current IP-2 through photovoltaic panel 114-2 reached a maximum level. Therefore, power system controller 104 may maintain the power level transmitted to power device 116-2 at P4-2 or reduce the power level transmitted to power device 116-2. Power system controller 104 may proceed and transmit power levels P5-1 to power device 116-1, where the reverse current IP-1 may also reach a maximum. Thus, power system controller 104 may sample dark I-V curves 1340-1, 1340-2 and, 1340-3, and use these samples to characterize the corresponding photovoltaic panels 114-1-114-3. By maintaining or reducing the power levels of power devices 116-1-116-3 that reach a maximum reverse current level, power system controller may enable the other power devices to continue and sample the corresponding dark I-V curves, where the only constraint is that the some of the power levels, Pn's, is equal or smaller than the maximum power, power system controller 104 may produce.

Figure 16:
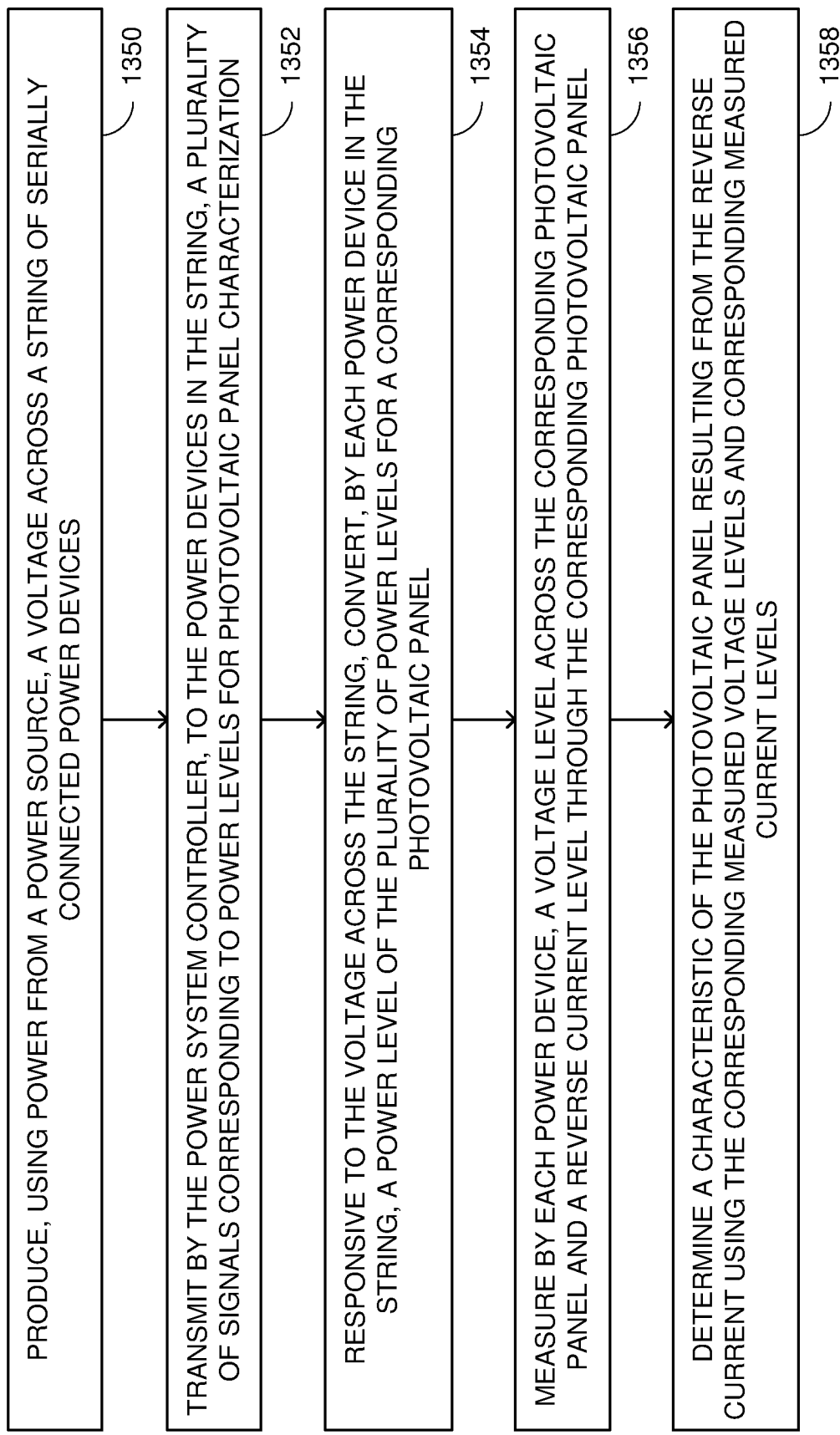
FIG. 16 shows a method for characterizing a photovoltaic panel or panels according to aspects of the disclosure herein.

Reference is now made to FIG. 16, which may show a method for characterizing a photovoltaic panel or panels. In step 1350, produce, using power from power source 110, a voltage across string 112 of serially connected power devices 116-1-116-N. For example, in cases in which string 112 is coupled to a power system controller 104, which is coupled to power source 110, power system controller 104 may produce a voltage across string 112 using power from power source 110.

Step 1352 includes transmitting, e.g., by the power system controller 104, to power devices 116-1-1161-N in the string 112, signals corresponding power levels for photovoltaic panel characterization of photovoltaic panels 114-1-114-N. The corresponding power levels transmitted by power system controller 104 to power devices 116-1-1161-N need not be equal. For example, with reference to FIG. 15B, power system controller 104 may transmit power levels P1-1-P5-1 to power device 116-1, power levels P1-2-P4-2 to power device 116-2, and power levels P1-3-P3-3 to power device 116-3.

Step 1354 includes, responsive to the voltage across string 112, converting by each power device of power devices 116-1-116-N (e.g., using power converter 300), a power level of the plurality of power levels for the corresponding photovoltaic panel 114-N. The power converted by power device 116-N may have a corresponding voltage, VP-n, across photovoltaic panel 114-N, and a corresponding reverse current IP-n through photovoltaic panel 114-N. VP-n and IP-n may define a point on the corresponding dark I-V curve of photovoltaic panel 114-N.

Step 1356 includes measuring, e.g., by each of power devices 116-1-116-N (e.g., using sensor(s) 306), a voltage level across the corresponding one of photovoltaic panels 114-1-114-N and a reverse current level through the corresponding one of photovoltaic panels 114-1-114-N. For example, the voltage level across photovoltaic panel 114-N may be measured by measuring the voltage level between first and second terminals 310-1 and 310-2. A current through photovoltaic panel 114-N may be measured by measuring a current through one of first terminal 310-1 or second terminal 310-2.

Step 1358 incudes characterizing the photovoltaic panel using the corresponding measured voltage levels and corresponding measured current levels. Characterizing the photovoltaic panel may be performed by the corresponding one of power devices 116-1-116-N. Characterizing the photovoltaic panels may be performed by power system controller 104.

Figure 17:
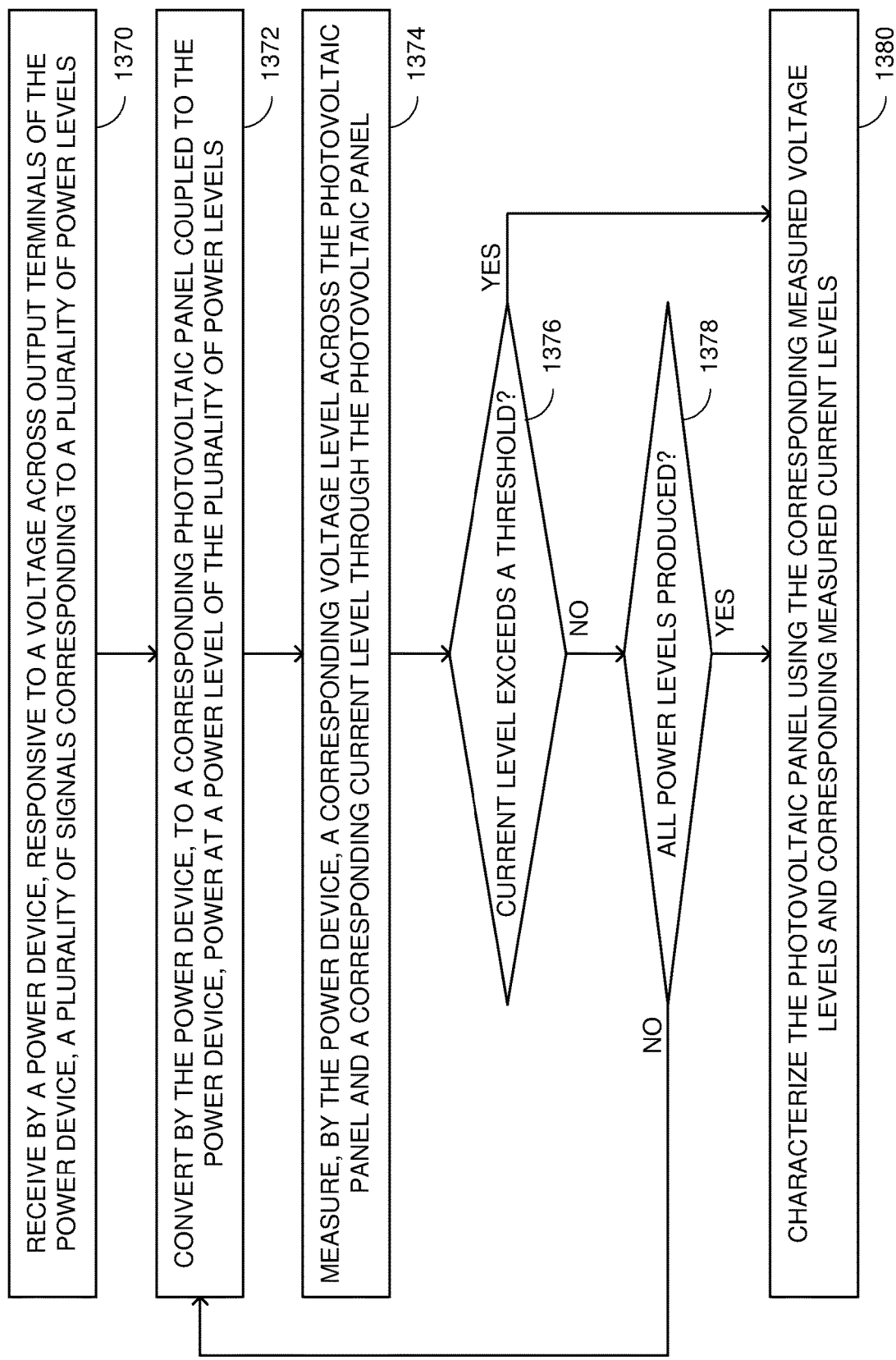
FIG. 17 shows a method for photovoltaic panel characterization by a power device according to aspects of the disclosure herein.

Reference is now made to FIG. 17, which shows a method for photovoltaic panel characterization by a power device. Step 1370 includes receiving, e.g., by a power device 116-N of power devices 116-1-116-N, and responsive to a voltage across output terminals of the power device, signals corresponding to a plurality of power levels. The received power levels may be stored in memory 316. For example, a power device 116-N may receive the plurality of power levels from power system controller 104 via power device communications interface 304 (FIG. 3A). For example, with reference to FIG. 15B, power device 116-1 may receive power levels P1-1 to P5-1, power device 116-2 may receive power levels P1-2 to P4-2 to power device 116-2, and power device 1161-3 may receive power levels P1-3 to P3-3.

Step 1372 includes converting, by power device 116-N, power at a power level of the plurality of power levels and outputting the converted power to a corresponding photovoltaic panel 114-N coupled to power device 116-N. For example, power device 116-N may use power converter 300 to convert power from third and fourth terminals 312-1 and 312-2, to first and second terminals 310-1 and 310-2. The power converted by power device 116-N may have a corresponding voltage, VP-n, across photovoltaic panel 114-N, and a corresponding reverse current IP-n through photovoltaic panel 114-N. VP-n and IP-n may define a point on the corresponding dark I-V curve of photovoltaic panel 114-N, as may be shown in FIG. 15B.

Step 1374 includes measuring, e.g., by the power device 116 (e.g., using sensor(s) 306), a corresponding voltage level, VP-n, across photovoltaic panel 114-N and/or a corresponding reverse current level, IP-n, through photovoltaic panel 114-N. For example, the voltage level across photovoltaic panel 114-N may be measured by measuring the voltage level between first and second terminals 310-1 and 310-2. A current through photovoltaic panel 114-N may be measured by measuring a current through one of first terminal 310-1 or second terminal 310-2.

Step 1374 includes determining, e.g., by power device 116-N (e.g., using power device controller 302), and based on the measurement of the reverse current level, IP-n, through photovoltaic panel 114-N, if the reverse current level, IP-n, exceeds a threshold. In cases in which the reverse current level, IP-n, does not exceed a threshold, the method may proceed to step 1378. In cases in which the reverse current level, IP-n, exceeds a threshold, the method may proceed to step 1380.

Step 1376 includes determining, e.g., by power device 116-N, if all the power levels of the plurality of power levers stored in memory 316 were produced. In cases in which not all the power levels were produced, the method may return to step 1372. In cases in which all the power levels were produced, the method may proceed to step 1380.

Step 1380 includes characterizing, e.g., by power device 116-N, the corresponding photovoltaic panel 114-N using the corresponding measured voltage levels, VP-ns, and corresponding measured reverse current levels IP-ns. Optionally power device 116 may transmit, using power device communications interface 304, the corresponding voltage levels, VP-ns, and corresponding measured reversed current levels, IP-n's, to power system controller 104 or another controller, and power system controller 104 or the other controller may characterize the photovoltaic panel 114-N using the VP-ns and the IP-ns.

As mentioned above, power system controller 104 may transmit to power device 116, using communications interface 206, a signal(s) corresponding to a power level, Pn, to each of power devices 116-1-116-N. According to the disclosure herein, transmitting a signal corresponding to a power level by power system controller 104 to a power device 116-N may comprise transmitting a corresponding duty cycle for power converter 300.

Determining panel characteristics such as described above (e.g., using electroluminescence imaging or dark-IV panel characterization) may be performed periodically. Thus, power system controller 104 may monitor the condition of the panel over time and produce alerts accordingly.

According to the disclosure herein, electroluminescence imaging may be used to determine a physical location (e.g., geo-location or relative location in the site) of photovoltaic panels 114-1-114-N, as well as determining a power device 116-N corresponding to each photovoltaic panel 114-N (e.g., the physical location of photovoltaic panel 114-N may be a characteristic of photovoltaic 114-N). It is noted that determining a physical location of a photovoltaic panel may be performed with power devices which may comprise power converter (e.g., buck converters) which do not have a diode restricting current flowing toward the photovoltaic panel.

Figure 18A:
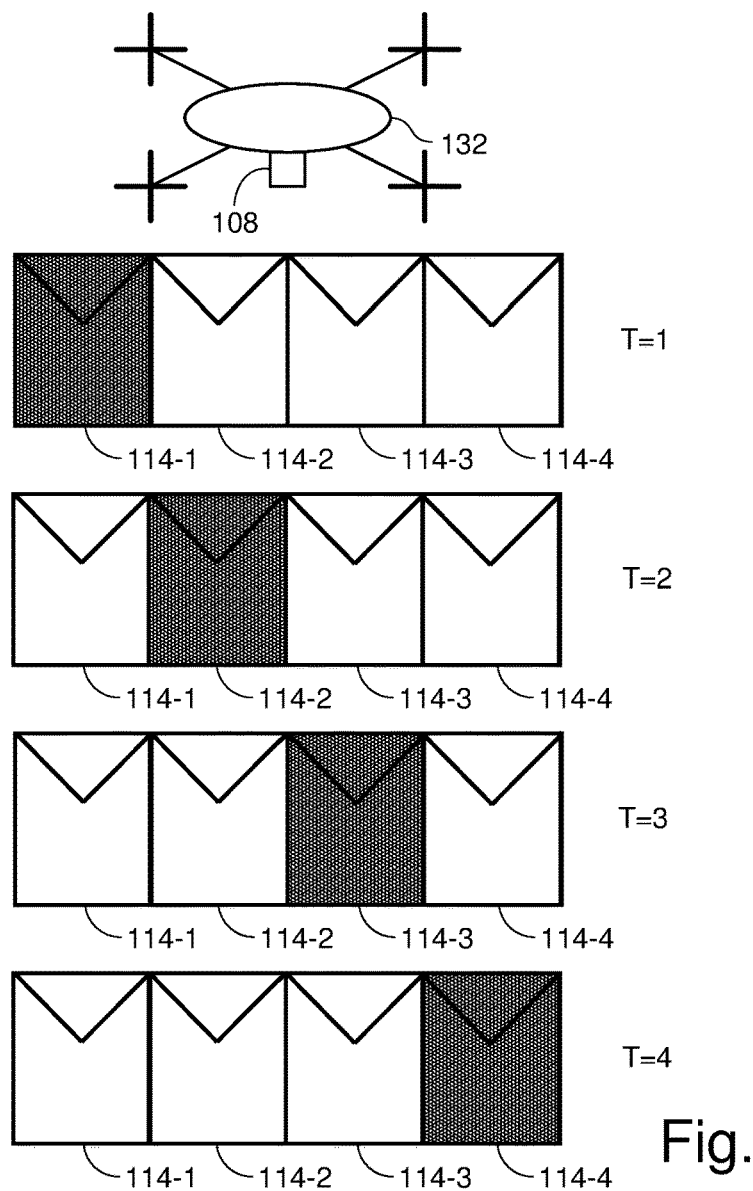
FIGS. 18A and 18B show examples for determining a physical location of a photovoltaic panel according to aspects of the disclosure herein.
Figure 18B:
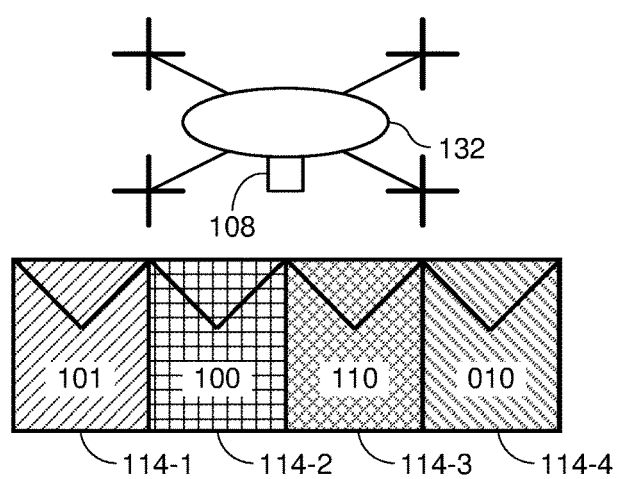
Figure 18C:
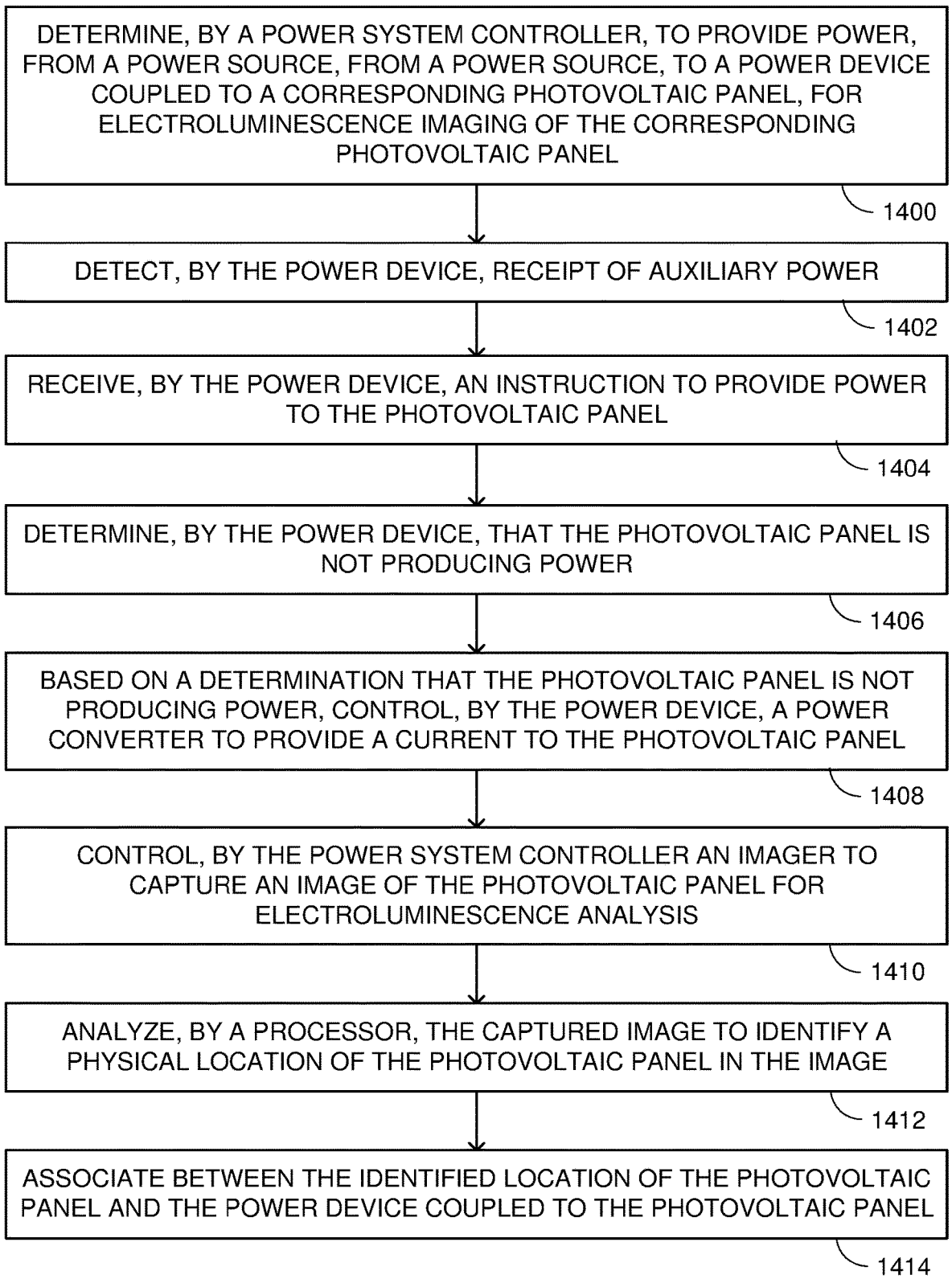
FIG. 18C shows a method for determining a photovoltaic panel's physical location, and for associating a photovoltaic panel with a power device coupled to the photovoltaic panel, according to aspects of the disclosure herein.

Reference is now made to FIGS. 18A-18C, which shows examples for determining a physical location of a photovoltaic panel 114-N, and for associating photovoltaic panel 114-N with a corresponding power device 116-N. Imager 108, mounted on aerial vehicle 132 (e.g., a drone), or pole 136, may be positioned above string 112. Power system controller 104 may instruct (e.g., by transmitting a signal) each of power devices 116-1-116-N to provide a reverse current to the corresponding one of photovoltaic panels 114-1-114-N as described in any of the embodiments above. For example, and with reference to FIG. 18A, power system controller 104 may transmit a unicast signal to each of power devices 116-1-116-N in turn, to provide a reverse current to the corresponding one of photovoltaic panels 114-1-114-N. Each of power devices 116-1-116-N may provide a reverse current to the corresponding one of photovoltaic panels 114-1-114-N, in turn, based on the received signal. The example shown in FIG. 18A shows four photovoltaic panels 114-1-114-4. At time T=1, power device 116-1 may provide a reverse current to photovoltaic panel 114-1 (e.g., responsive to a received signal from power system controller 104). Photovoltaic panel 1141-1 may emit light or radiation (e.g., infrared light) responsive to the reverse current. Imager 108 may acquire an image or images of photovoltaic panel 114-1 and transmit the acquired image or images to power system controller 104 or to server 115. Power system controller 104 or server 115 may analyze the acquired image to determine the physical location of photovoltaic panel 1141-1, e.g., by distinguishing the emissions from 114-1 as compared to the other panels, and associate between power device 116-1 and photovoltaic panel 114-1. This process may be repeated at times T=2, T=3, and T=4, for photovoltaic panels 114-2, 114-3, 114-4, and corresponding power device 116-1-116-4, respectively. Other patterns, for example by controlling multiple power devices to provide reverse currently simultaneously, may be used in this process to determine the physical location of the panels and the association between panels and power devices.

According to the disclosure herein, and with reference to FIG. 18B, power system controller 104 may transmit a broadcast signal to all power devices 116-1-116-N, to provide a reverse current to the corresponding photovoltaic panels 114-1-114-N. Each of power devices 116-1-116-N may modulate a reverse current to produce a corresponding modulated reverse current (e.g., pulse modulated) to the corresponding one of photovoltaic panels 114-1-114-N. The modulated reverse current may correspond to an identifier (e.g., ID number) of power device 116-N. For example, each power device 116-N may modulate the reverse current provided to the corresponding photovoltaic panel 114-N based on a unique code. Thus, photovoltaic panel 114-N may emit modulated light corresponding to a representation (e.g., in non-return to zero (NRZ) modulation) of the identifier of power device 116n. As shown in the example of FIG. 18B, power device 116-1 provides a modulated reverse current corresponding to a binary number 101, to photovoltaic panel 114-1. Power device 116-2 provides a modulated reverse current corresponding to a binary number 100, to photovoltaic panel 114-2. Power device 116-3, provides a modulated reverse current corresponding to a binary number 110, to photovoltaic panel 114-3, and power device 116-4, provides a modulated reverse current corresponding to a binary number 010, to photovoltaic panel 114-4. Each one of photovoltaic panels 114-1 to 114-4 may emit light corresponding to the modulated reverse current provided by the corresponding power device 1161-1 to 116-4. Imager 108 may acquire an image or images of photovoltaic panels 114-1 to 114-4 and transmit the acquired image or images (e.g., video) to power system controller 104 or to server 115. Power system controller 104 or server 115 may analyze the acquired images and identify the corresponding code of photovoltaic panels 114-1-114-4 based on the analysis of the image or images. Power system controller 104 or server 115 may determine the physical location of photovoltaic panels 114-1 to 114-4, and associate between power device 116-1 to 116-4 and photovoltaic panels 114-1 to 114-4 based on the image analysis.

Reference is now made to FIG. 18C, which is an example method for determining a physical location of a photovoltaic panel, and for associating each the photovoltaic panel with a power device coupled to the photovoltaic panel, according to aspects of the disclosure herein. Step 1400 includes determining, e.g., by a power system controller (e.g., power system controller 104—FIG. 1A), to provide power from a power source (e.g., power source 110—FIG. 1A) to a power device (e.g., power device 116-N—FIG. 3A) coupled to a corresponding photovoltaic panel (e.g., photovoltaic panel 114-N) for electroluminescence imaging of the corresponding photovoltaic panel. The determination may be a result of a user input requesting mapping of power devices 116-1 to 116-N and corresponding photovoltaic panels 114-1 to 114-N. The user input may be an input by an operator on a user interface of the server coupled to the power system controller.

Step 1402 includes detecting, e.g., by the power device 116-N, that it is receiving auxiliary power. For example, power device 116-N may receive auxiliary power from power source 110 via downstream terminals 312 and auxiliary power circuit 308. The auxiliary power may enable the various modules and components of the power device (e.g., power device controller 302, sensor(s) 306, gate driver 309, or power device communications interface 304) to operate regardless of whether the photovoltaic panel produces power or not.

Step 1404 includes receiving, e.g., by the power device, an instruction to provide power to the photovoltaic panel, to enable electroluminescence imaging of the panel. The instruction may be sent by the power system controller, or from some other remote device (e.g., a server associated with a service provider). The instructions may be in the form of a voltage that the power system controller provides to the power device (e.g., from power source 110 via terminals 118-1 and 118-2 to downstream terminals 312) as may be described in FIG. 5. The instructions may be in the form of a signal (e.g., received by power device 116 via power device communications interface 304) as may be described in FIG. 6. Based on the instruction, a controller of the power device (e.g., power device controller 302) may cause performance of steps 1406 through 1408, as discussed below.

Step 1406 includes determining, e.g., by the power device, that the photovoltaic panel is not producing power. For example, as described in conjunction with FIGS. 5 and 6 above, the power device may measure a voltage level between the upstream terminals (e.g., upstream terminals 310) to determine if the photovoltaic panel is producing power. In another example, the power device may determine (e.g., based on a measurement of an irradiance level at or near the photovoltaic panel 114 by sensor(s) 306) that the photovoltaic panel is not producing power.

Step 1408 includes controlling, e.g., by the power device, a power converter (e.g., power converter 300) to provide a current to the photovoltaic panel. For example, power device controller 302 of power device 116-N may control power converter 300 to provide current to upstream terminals 310. Thus, current may flow from the power source 110 to photovoltaic panel 114-N and cause photovoltaic panel to emit radiation. The power device may control the power converter to provide a modulated reverse current (e.g., pulse modulated) to the corresponding photovoltaic panel 114-N. For example, the modulated reverse current may correspond to an identifier (e.g., ID number) of the power device 116-N and/or a unique code. Thus, the corresponding photovoltaic panel may emit light which may be modulated based on the identifier and or unique code of the corresponding power device.

Step 1410 includes controlling, e.g., by the power system controller, an imager to capture an image or images (e.g., video) of the photovoltaic panel. For example, power system controller 104 may control imager 108 to capture an image of the photovoltaic panel 114 either directly or wirelessly (e.g., via communications interface 206). Power system controller may control imager 108 to capture a plurality of images and/or a video.

Step 1412 includes analyzing, e.g., by a processor, the captured image, images, and/or video, to determine to identify a location (e.g., a geo location or a relative location in the site) of the photovoltaic panel. The processor may be, for example, processor 210 of power system controller 104, or a remote processor (e.g., at server 115). Analysis of the captured image may comprise image segmentation and segment classification. For example, the captured image may depict the location of the photovoltaic panel relative to other photovoltaic panels in string 112 (FIG. 1A), or the location of the photovoltaic panel in the site. In some cases, where the geo-location of imager 108 is known (e.g., via GPS), the processor may determine the geo-location of the photovoltaic panel from the image.

Step 1414 includes associating, e.g., by the power system controller or by the server, the identified location of the photovoltaic panel and the corresponding power device coupled to the photovoltaic panel. For example, in cases in which the current the power device provides to the corresponding photovoltaic panel is modulated based on an identifier of the power device, the power system controller or the server may analyze the modulated light emitted by the photovoltaic panel and may determine the identifier of the corresponding power device which provides power to the photovoltaic panel emitting the light. Thus, the power system controller or the server may associate between the identified location of the photovoltaic panel, and the corresponding power device coupled to the photovoltaic panel.

It is noted that the steps of the method shown in FIG. 18C are optional and may be performed in a different order. For example, step 1406 may be omitted.

According to the disclosure herein, photoluminescence may be used to characterize a photovoltaic panel (e.g., assessing the physical state of the photovoltaic panel, determining a location of the photovoltaic panel). In photoluminescence imaging, a first image of the photovoltaic panel may be acquired when the photovoltaic panel is generating current at a first operating point on the I-V curve of the photovoltaic panel (e.g., I short-circuit where the panel absorbs a large amount of light). A second image of the photovoltaic panel may be acquired when the photovoltaic panel is generating current at a second operating point on the I-V curve of the photovoltaic panel (e.g., Voc where the panel reflects a large amount of light). Subtracting the two images may provide a difference image relating to the light absorbed by the panel. This difference image may be used to characterize the photovoltaic panel similar to an electroluminescence image.

According to the disclosure herein, power system controller 104 may transmit a signal (e.g., a broadcast or unicast signal) to all or some of power devices 116-1-116-N, to harvest power from the corresponding photovoltaic panels 114-1-114-N at two different power levels (e.g., modulating between the harvesting between the two different power levels). The amount of light reflected from the surface of the photovoltaic panel may vary in relation to the amount of power being harvested. Thus, power devices 116-N may cause the modulation of the reflected light from the panel by modulating between two different levels of power being harvested. For example, each of power devices 116-1-116-N may harvest power from the corresponding photovoltaic panel by transitioning between the power levels based on an identifier (e.g., ID number) of power device 116-N or a unique code. The amount of light reflected from the surface of the photovoltaic panel may vary in relation to the transitioning between power levels. Thus, by power devices 116-N modulating the power harvested from the photovoltaic panel between two different levels of power, photovoltaic panel 114-N may reflect modulated light corresponding to a representation (e.g., in non-return to zero (NRZ) modulation) of the identifier of power device 116n. In one example, power system controller 104 may transmit a unicast signal to each of power devices 116-1-116-N in turn, to harvest power from the corresponding photovoltaic panels 114-1-114-N at two different power levels.

Figure 19:
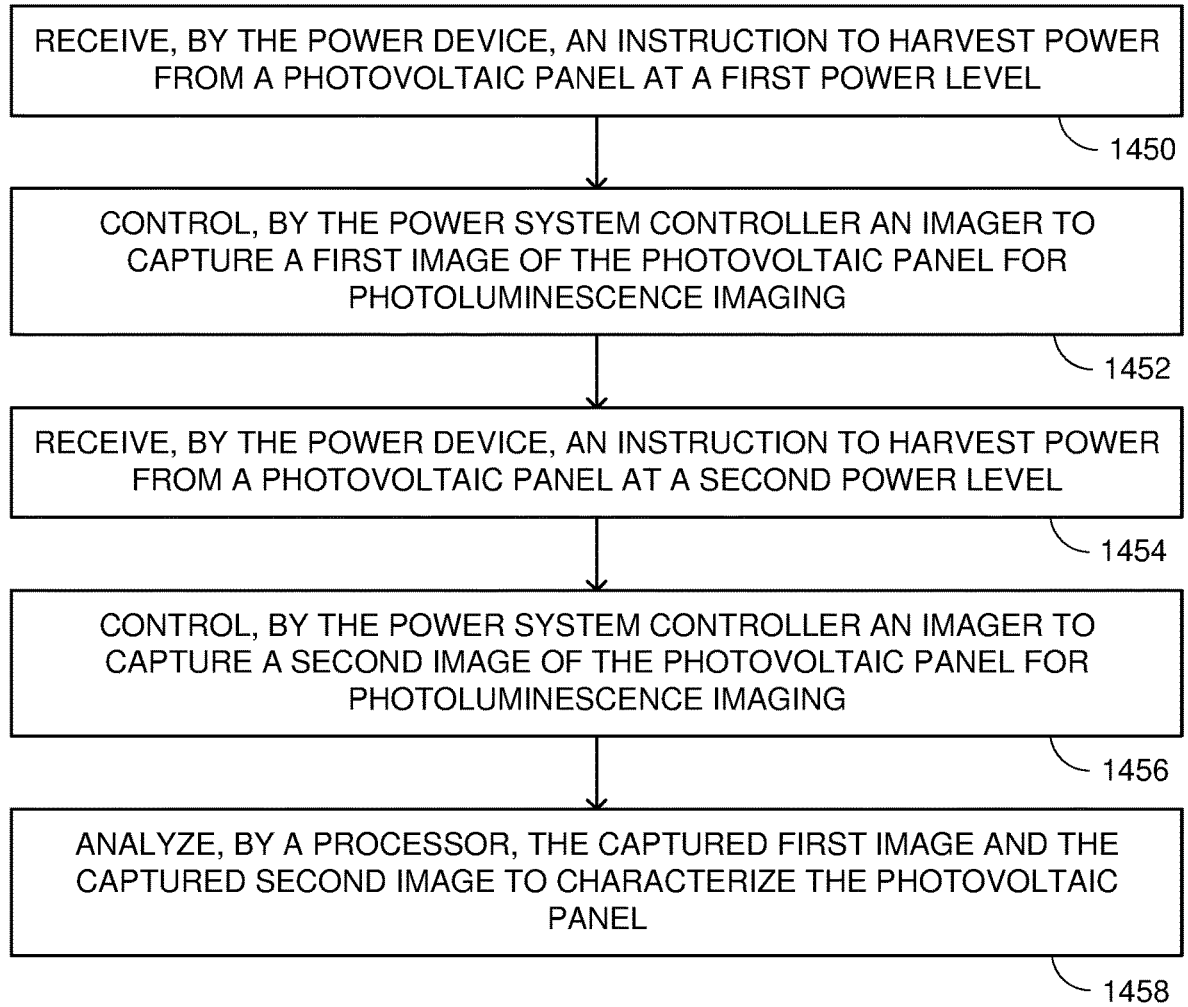
FIG. 19 shows an example method for characterizing a photovoltaic panel according to aspects of the disclosure herein.

Reference is now made to FIG. 19 which shows a method for characterizing a photovoltaic panel using photoluminescence. Step 1450 includes receiving, e.g., by the power device 116-N, an instruction to harvest power from a photovoltaic panel at a first power level, which may result in the photovoltaic panel reflecting a light having a first spectral response. The instruction may be sent by the power system controller 104, or from some other remote device (e.g., a server associated with a service provider). The instructions may be in the form of a voltage that the power system controller 104 provides to the power device (e.g., from power source 110 via terminals 118-1 and 118-2 to downstream terminals 312) as may be described in FIG. 5. The instructions may be in the form of a signal (e.g., received by power device 116-N via power device communications interface 304) as may be described in FIG. 6.

Step 1452 includes controlling, e.g., by the power system controller, an imager to capture a first image or images (e.g., video) of the photovoltaic panel for photoluminescence imaging. For example, power system controller 104 may control either directly or wirelessly (e.g., via communications interface 206) the imager 108 to capture an image of the photovoltaic panel 114. Power system controller 104 may control imager 108 to capture a plurality of images and/or a video. It is noted that the imager (e.g., imager 108) may be configured to capture an image or images in a spectral range of the light reflected by the photovoltaic panel.

Step 1454 includes receiving, e.g., by the power device 116-N, an instruction to harvest power from a photovoltaic panel at a second power level different from the first power level, resulting in the photovoltaic panel reflecting light having a second spectral response, where the second spectral response may be different from the first spectral response (e.g., but over a similar range of wavelengths). This difference may be a result in a difference in absorption of light when the second power level is harvested versus the absorption of light when the first power level is harvested. The instruction may be sent by the power system controller 104, or from some other remote device (e.g., a server associated with a service provider). The instructions may be in the form of a voltage that the power system controller 104 provides to the power device (e.g., from power source 110 via terminals 118-1 and 118-2 to downstream terminals 312) as may be described in FIG. 5. The instructions may be in the form of a signal (e.g., received by power device 116-N via power device communications interface 304) as may be described in FIG. 6.

Step 1456 includes controlling, e.g., by the power system controller, an imager to capture a second image or images (e.g., video) of the photovoltaic panel for photoluminescence imaging. For example, power system controller 104 may control either directly or wirelessly (e.g., via communications interface 206) the imager 108 to capture an image of the photovoltaic panel 114. Power system controller may control imager 108 to capture a plurality of images and/or a video.

Step 1458 includes analyzing, e.g., by a processor, the captured first image(s) and the captured second image(s) to characterize the photovoltaic panel. Characterizing the photovoltaic panel may include assessing the physical state of the photovoltaic panel (e.g., for cracks, and/or for hotspots) as described above (e.g., in conjunction with FIG. 4). Characterizing the photovoltaic panel may include determining a location (e.g., a geo location or a relative location in the site) of the photovoltaic panel as well as associating between the photovoltaic panel and the corresponding power device (e.g., as described above in conjunction with FIG. 18C).

It is noted that the steps of the method shown in FIG. 19 are optional and may be performed in a different order. For example, steps 1450 and 1454 may performed successively or be combined together (e.g., in a single set of instructions), and steps 1452 and 1456 may be performed successively or be combined together. As another example, step 1458 may be performed multiple times and concurrently with other steps (e.g., as each image is captured).

One or more aspects of the disclosure may be embodied in computer-usable data and computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting The claims set as filed in the priority provisional U.S. application 63/496,549 are included herein as clauses in order to preserve all subject matter in the present application. The present application also discloses:

Clause 1. An apparatus comprising:
  a first terminal and a second terminal, each connected to a photovoltaic panel;
  a third terminal and a fourth terminal, each connected to a power source;
  a power converter comprising a first diode restricting current from flowing from the third terminal and fourth terminal to the first terminal and the second terminal;
  a controller configured to control the power converter to draw power from the photovoltaic panel at a maximum power operating point, and provide power to the photovoltaic panel; and
  an auxiliary power circuit, connected to each of the first, second, third, and fourth terminals, configured to provide power to the controller from one or more of the photovoltaic panel and the power source.

Clause 2. The apparatus of clause 1, further comprising:
  a first sensor for measuring a first voltage level between the first terminal and the second terminal; and
  a second sensor for measuring a second voltage level between the third terminal and the fourth terminal,
  wherein the controller is configured to control, based on the first voltage level being below a threshold and the second voltage level being above a threshold, the power converter to provide power from the power source to the photovoltaic panel.

Clause 3. The apparatus of clause 2, wherein the power converter comprises a switch, coupled across the first diode, and
  wherein the controller controls the switch to provide a current path between the power source and the photovoltaic panel.

Clause 4. The apparatus of any one of clauses 1-3 further comprising a communications interface configured to receive a signal,
  wherein the controller is configured to control the power converter, based on the signal, to provide power to the photovoltaic panel.

Clause 5. The apparatus of any one of clauses 1-4, wherein the power converter is a boost converter configured to convert power from:
  a first voltage level between the first terminal and second terminal to a second voltage level between the third terminal and fourth terminal,
  wherein the second voltage level is higher than the first voltage level.

Clause 6. The apparatus of any one of clauses 1-4, wherein the power converter is a buck and boost converter configured to convert power from:
  a first voltage level between the first terminal and the second terminal, to a second voltage level at the third terminal and the fourth terminals.

Clause 7. The apparatus of any one of clauses 1-4, wherein the power converter is a non-inverting buck-boost converter configured to convert power from:
  a first voltage level between the first terminal and the second terminals, to a second voltage level at the third terminal and the fourth terminals.

Clause 8. The apparatus of clause 7, wherein the non-inverting buck-boost converter comprises a single-ended primary inductor converter (SEPIC).

Clause 9. The apparatus of clause 7, wherein the non-inverting buck-boost converter comprises a flyback converter.

Clause 10. The apparatus of any one of clauses 1-9, wherein the auxiliary power circuit comprises a plurality of switches.

Clause 11. The apparatus of clause 10, wherein the plurality of switches comprises a second diode and a third diode,
  wherein a first cathode of the second diode is connected to a second cathode of the third diode,
  wherein a first anode of the second diode is connected to the first terminal, and
  wherein a second anode of the third diode is connected to the third terminal.

Clause 12. The apparatus of clause 11, wherein the second diode is an ideal diode.

Clause 13. The apparatus of any one of clauses 11-12, wherein the third diode is an ideal diode.

Clause 14. The apparatus of any one of clauses 1-13, wherein the auxiliary power circuit comprises an auxiliary power converter.

Clause 15. The apparatus of any one of clauses 1-14, wherein the auxiliary power circuit comprises adjustable shunt regulator and a controller coupled to the adjustable shunt regulator,
  wherein the adjustable shunt regulator is coupled between the third terminal and the fourth terminal,
  wherein the controller is configured to control the adjustable shunt regulator to regulate the voltage level between the third terminal and the fourth terminal based on a measurement of a level of the voltage level between the third terminal and the fourth terminal.

Clause 16. The apparatus of clauses 1-14, wherein the auxiliary power circuit comprises a flyback converter and a controller coupled to the flyback converter,
  wherein the flyback converter comprises a coupled inductor coupled in series with a switch, wherein primary windings of the coupled inductor are coupled to the third and fourth terminals, and secondary windings of the coupled inductor are coupled to the first and second terminals, and wherein the controller is configured to control the flyback converter to regulate the voltage level between the third terminal and the fourth terminal based on a measurement of a level of the voltage level between the third terminal and the fourth terminal.

Clause 17. The apparatus of any one of clauses 1-16 wherein, responsive to a voltage between the third terminal and the fourth terminal, the controller is configured to control the power converter to provide reverse current to the photovoltaic panel for characterizing the photovoltaic panel.

Clause 18. The apparatus of any one of clauses 1-17, wherein the controller is configured to control the power converter to sequentially provide a plurality of determined power levels from the power source to the photovoltaic panel, for characterizing the photovoltaic panel.

Clause 19. A system comprising:
- a string of serially connected power devices, a power device of the serially connected power devices comprising:
  - a first terminal and a second terminal, connected to a photovoltaic panel;
  - a third terminal and a fourth terminal;
  - a first power converter comprising a diode restricting current from flowing from the third terminal and fourth terminal to the first terminal and the second terminal;
  - a first controller configured to control the first power converter to draw power from the photovoltaic panel at a maximum power operating point; and
  - an auxiliary power circuit, connected to each of the first, second, third, and fourth terminals, configured to provide power to the first controller from one or more of the photovoltaic panel or a power source;
- a power system controller comprising:
  - a fifth terminal connected to the third terminal; and
  - a sixth terminal connected to the fourth terminal,
  - wherein the power system controller is configured to provide reverse current using power from the power source, to the third terminal and the fourth terminal, via the fifth terminal and the sixth terminal, and
  - wherein the power system controller is configured to determine a characteristic of the photovoltaic panel resulting from the reverse current.

Clause 20. The system of clause 19 further comprising an imager, connected to the power system controller, configured to capture, based on a signal from the power system controller, an image of the photovoltaic panel.

Clause 21. The system of clause 20, wherein the imager is configured to be mounted on an aerial vehicle.

Clause 22. The system of clause 21, wherein the aerial vehicle is an Unmanned Aerial Vehicle (UAV).

Clause 23. The system of clause 20, wherein the imager is mounted on a vehicle configured to traverse over the photovoltaic panel.

Clause 24. The system of clause 23, wherein the vehicle is an Unmanned Ground Vehicle (UGV).

Clause 25. The system of clause 20, wherein the imager is mounted on a pole over the photovoltaic panel.

Clause 26. The system of clause 20, wherein the imager is mounted on a satellite.

Clause 27. The system of any one of clauses 19-26, wherein the power system controller further comprises a second power converter, and wherein the second power converter is configured to convert Direct Current (DC) power from the fifth terminal and the sixth terminal to Alternating Current (AC) power.

Clause 28. The system of clause 27, wherein the second power converter is configured to convert AC power from the power source to DC power at the fifth terminal and the sixth terminals.

Clause 29. The system of any one of clauses 19-28, wherein the power system controller further comprises a communications interface configured to transmit the signal to the imager.

Clause 30. The system of any one of clauses 19-28, wherein the power system controller further comprises a second communications interface configured to transmit a second signal to the first power converter,
  wherein the power device further comprises a third communications interface configured to receive the second signal, and
  wherein the first controller is configured to control, based on the second signal, the power device to provide power to the photovoltaic panel.

Clause 31. The system of clause 30, wherein the power device further is further configured to transmit via the third communications interface a third signal to the second communications interface based on the power converter generating a voltage across the first terminal and the second terminal.

Clause 32. The system of clause 31, wherein the second communications interface is configured to provide a fourth signal to an imager based on receiving the third signal.

Clause 33. The system of clause 19-32, wherein the power system controller comprises a second controller coupled to a second power converter.

Clause 34. The system of clause 33, wherein the power system controller further comprises a second sensor connected with the second controller, configured to measure an irradiance level of light at a vicinity of the photovoltaic panel, wherein the second controller is configured to control, based on the measured irradiance level, the second power converter to provide power to the string.

Clause 35. The system of any one of clauses 33, wherein the power system controller further comprises a first sensor configured to measure a current level at the fifth terminal or the sixth terminals,
  wherein the second controller is configured to provide the signal to the imager based on the measured current level.

Clause 36. The system of any one of clauses 20-35, further comprising a processor, wherein the processor is configured to analyze the captured image for electroluminescence analysis.

Clause 37. The system of any one of clauses 20-35, further comprising a processor, wherein the processor is configured to analyze the captured image to determine the physical location of the photovoltaic panel.

Clause 38. The system of clause 37, wherein the power device is configured to modulate the reverse current.

Clause 39. The system of any one of clauses 37-38, wherein the processor is further configured to associated the photovoltaic panel with the power device based on the captured image and the signal.

Clause 40. The system of any one of clauses 19-39, wherein the power device further comprises:
  a third sensor configured to measure a voltage level between the first terminal and the second terminal; and
  a fourth sensor configured to measure a voltage level between the third terminal and the fourth terminal,
  wherein, based on a measurement from the third sensor indicating that the photovoltaic panel is not producing power, and based on a measurement from the fourth sensor indicating power is available at the third and fourth terminals, the first controller is configured to control the first power converter to provide power to the photovoltaic panel.

Clause 41. The system of any of clauses 19-40, wherein the first power converter comprises a boost converter configured to convert power from:
  a first voltage level between the first terminal and the second terminal, to a second voltage level between the third terminal and the fourth terminal,
  wherein the second voltage level is higher than the first voltage level.

Clause 42. The system of any of clauses 19-40, wherein the first power converter comprises a buck and boost converter configured to convert power from:
  a first voltage level between the first terminal and the second terminal, to a second voltage level between the third terminal and the fourth terminal.

Clause 43. The system of any one of clauses 19-40, wherein the first power converter comprises a non-inverting buck-boost converter configured to convert power from:
  a first voltage level between the first terminal and the second terminal, to a second voltage level between the third terminal and the fourth terminal.

Clause 44. The system of clause 13, wherein the non-inverting buck-boost converter comprises a single-ended primary inductor converter (SEPIC).

Clause 45. The system of clause 13, wherein the non-inverting buck-boost converter comprises a flyback converter.

Clause 46. The system of any one of clauses 19-45, wherein the auxiliary power circuit is connected to each of the first terminal, the second terminal, the third terminal and the fourth terminal, and comprises a plurality of switches.

Clause 47. The system of clause 46, wherein the plurality of switches comprises a second diode and a third diode,
  wherein a first cathode of the second diode is connected to a second cathode of the third diode,
  wherein a first anode of the second diode is connected to the first terminal, and
  wherein a second anode of the third diode is connected to the third terminal.

Clause 48. The system of clause 47, wherein the second diode is an ideal diode.

Clause 49. The system of clause 47, wherein the third diode is an ideal diode.

Clause 50. The system of any one of clauses 19-49, wherein the auxiliary power circuit comprises an auxiliary power converter.

Clause 51. The apparatus of any one of clauses 19-50, wherein the auxiliary power circuit comprises adjustable shunt regulator and a controller coupled to the adjustable shunt regulator,
  wherein the adjustable shunt regulator is coupled between the third terminal and the fourth terminal,
  wherein the controller is configured to control the adjustable shunt regulator to regulate the voltage level between the third terminal and the fourth terminal based on a measurement of a level of the voltage level between the third terminal and the fourth terminal.

Clause 52. The apparatus of any one of clauses 19-51, wherein the auxiliary power circuit comprises a flyback converter and a controller coupled to the flyback converter,
  wherein the flyback converter comprises a coupled inductor coupled in series with a switch, wherein primary windings of the coupled inductor are coupled to the third and fourth terminals, and secondary windings of the coupled inductor are coupled to the first and second terminals,
  wherein the controller is configured to control the flyback converter to regulate the voltage level between the third terminal and the fourth terminal based on a measurement of a level of the voltage level between the third terminal and the fourth terminal.

Clause 53. The system of any one of clauses 19-52, wherein, responsive to a voltage across the third terminal and the fourth terminal, the first controller is configured to control the first power converter to provide a determined power level to the photovoltaic panel,
  wherein the power device further comprises a current sensor configured to measure a level of the reverse current corresponding to the determined power level, and
  wherein the power device further comprises a voltage sensor, configured to measure a level of a voltage between the first terminal and the second terminal,
  wherein the power system controller determines the characteristic of the photovoltaic panel based on the level of a voltage between the first terminal and the second terminal, and the level of the reversed current.

Clause 54. The system of clause 53, wherein the power system controller is configured to transmit to the power device the determined power level.

Clause 55. The system of any one of clauses 53-54, wherein the power system controller comprises a system power converter configured to convert power from the power source to the string of serially connected power devices.

Clause 56. The system of clause 55, wherein the power source is a grid.

Clause 57. The system of any one of clauses 53-56, wherein the power device maintains a power level provided to the photovoltaic panel responsive to a level of the reverse current exceeding a threshold.

Clause 58. The system of any one of clauses 19-57, wherein, responsive to a voltage from the power source, across the third terminal and the fourth terminal, the first controller is configured to control the power converter to provide a path for current to flow between the first terminal and the third terminal and between the fourth terminal and the second terminal, and
  wherein the power device further comprises a voltage sensor, configured to measure a level of a voltage between the first terminal and the second terminal.

Clause 59. The system of clause 58, wherein the power device further comprises a current sensor configured to measure a level of the reverse current, and
wherein the power system controller determines the characteristic of the photovoltaic panel based on the level of a voltage between the first terminal and the second terminal, and the level of the reversed current.

Clause 60. The system of any one of clauses 58-59 wherein the power system controller further comprises a current sensor configured to measure a level of the reverse current, and wherein the power system controller determines the characteristic of the photovoltaic panel based on the level of a voltage between the first terminal and the second terminal, and the level of the reversed current.

Clause 61. The system of any one of clauses 58-60, wherein the power device is configured to transmit to the power system controller the measure level of a voltage between the first terminal and the second terminal.

Clause 62. The system of any one of clauses 58-61, wherein the power system controller is configured to sequentially produce a plurality of string voltage levels across the string for photovoltaic panel characterization.

Clause 63. The system of any one of clauses 58-62, wherein the power system controller is configured to produce a plurality of voltage levels between the fifth terminal and the sixth terminal.

Clause 64. The system of any one of clauses 53-63, wherein determining a characteristic of the photovoltaic panel comprises determining a curve of the current through the photovoltaic panel vs the voltage level between the first terminal and the second terminal using the measured level of a voltage between the first terminal and the second terminal and the measured level of the reverse current.

Clause 65. The system of any of clauses 53-64 wherein determining a characteristic of the photovoltaic panel comprises determining one or more electrical parameters of the photovoltaic panel using the measured level of a voltage between the first terminal and the second terminal and the measured level of the reverse current.

Clause 66. The system of clause 65 wherein the one or more electrical parameters comprise:
Open Circuit Voltage;
Shunt Resistance; and
Series Resistance.

Clause 67. A method comprising the steps of:
determining, by a power device, that auxiliary power is being received from a power source;
receiving, by the power device and from a power system controller, an instruction to provide power from the power source to a photovoltaic panel connected to the power device for determining a characteristic of the photovoltaic panel;
determining, by the power device and in response to the instruction, that the photovoltaic panel is not producing power; and
based on a determination that the photovoltaic panel is not producing power, controlling, by the power device, a switch to provide a current path from the power source to the photovoltaic panel, wherein the current path bypasses a restriction in current flow from the power source to the photovoltaic panel.

Clause 68. The method of clause 63, further comprising causing, by the power system controller, an imager to capture an image of the photovoltaic panel for electroluminescence analysis.

Clause 69. The method of clause 64, further comprising the step of analyzing the image to determine a physical state of the photovoltaic panel.

Clause 70. The method of any one of clauses 63-65, wherein the steps of determining that the photovoltaic panel is not producing power comprises the steps of:
measuring, by a first sensor, a first voltage level between a first terminal of the power device and a second terminal of the power device, wherein the first terminal and the second terminal are connected to the photovoltaic panel; and
determining that the first voltage level is lower than a threshold.

Clause 71. The method of any one of clauses 63-66, further comprising converting, by the power device, power received from the power source and delivered to the photovoltaic panel.

Clause 72. The method of any one of clauses 63-67, further comprising, prior to receiving the instruction, receiving, by the power system controller, a r to provide the current path.

Clause 73. The method of any one of clauses 63-68, further comprising determining, by the power system controller, to send the instruction based on:
measuring, by a sensor in the power system controller, an irradiance level; and
determining by the power system controller that the irradiance level is lower than a threshold.

Clause 74. The method of any one of clauses 63-69, wherein further comprising determining, by the power system controller, to send the instruction responsive to receiving an indication from a user via a user interface.

Clause 75. The method of any one of clause 63-70, further comprising the step of transmitting, by the power system controller, the instruction.

Clause 76. An apparatus comprising:
a first terminal and a second terminal, each connected to a photovoltaic panel;
a third terminal and a fourth terminal, each connected to a power source;
a power converter comprising a first diode restricting current from flowing from the third terminal and fourth terminal to the first terminal and the second terminal; and
a bypass circuit connected to the first terminal and the third terminal, configured to create a current path between the third terminal and the first terminal based on the voltage at the third terminal being higher than the voltage at the first terminal.

Clause 77. The apparatus of clause 72, further comprising a comparator circuit comprising a comparator, configured to compare the voltage at the third terminal with the voltage at the first terminal and control the bypass circuit to create the current path between the third terminal and the first terminal.

Clause 78. The apparatus of clause 73, wherein the comparator circuit comprises a bootstrap power supply for providing, from the third terminal and the first terminal, auxiliary power to the comparator circuit.

Clause 79. The apparatus of clause 73, further comprising an auxiliary power circuit, connected to the third and fourth terminals, configured to provide power to the comparator circuit from the power source.

Clause 80. An system comprising:
- a plurality of serially connected power devices, the serially connected power devices configured to be connected to a power source, each power device comprising:
  - a first terminal and a second terminal, wherein a photovoltaic panel is connected between the first and second terminals;
  - a third terminal and a fourth terminal;
  - a power converter;
  - a power device controller configured to control the power converter to:
    - draw, at a first mode of operation, power from the photovoltaic panel at a maximum power operating point, and
    - provide, at a second mode of operation, power to the photovoltaic panel; and
  - an auxiliary power circuit, connected to each of the first, second, third, and fourth terminals, configured to provide power to the controller from one or more of the photovoltaic panel and the power source; and
  - a current sensor configured to measure a level of a current through the photovoltaic panel,
- wherein, responsive to a voltage across the third terminal and the fourth terminal, the power converter is configured to sequentially provide a plurality of determined power levels from the power source to the photovoltaic panel, for characterizing the photovoltaic panel.

Clause 81. A system comprising:
- a string comprising a plurality of serially connected power devices, the serially connected power devices configured to be connected to a power source, each power device of the plurality of serially connected power devices comprising:
  - a first terminal and a second terminal, each connected to a photovoltaic panel;
  - a third terminal and a fourth terminal;
  - a power converter;
  - a controller configured to control the power converter to draw power from the photovoltaic panel at a maximum power operating point, and to provide power to the photovoltaic panel,
  - an auxiliary power circuit, connected to each of the first, second, third, and fourth terminals, configured to provide power to the controller from one or more of the photovoltaic panel and the power source,
  - a voltage sensor configured to measure a level of a voltage between the first terminal and the second terminal; and
- a power system controller, coupled to the string, configured to sequentially produce a plurality of string voltage levels across the string,
- wherein, responsive to a voltage from the power source, across the third terminal and the fourth terminal, the controller is configured to control the power converter to provide a path for current to flow between the first terminal and the third terminal and between the fourth terminal and the second terminal, for determining a characteristic of the photovoltaic panel.

Clause 82. A method comprising:
- producing, by a power system controller, a voltage across a string of serially connected power devices;
- providing, by a power device in the string, a current path for current to flow to a corresponding photovoltaic panel;
- increasing, by the power system controller, a voltage level across the string;
- measuring, by each power device, a voltage level across the corresponding photovoltaic panel, and transmit the measured voltage level to the power system controller;
- determine by the power system controller a level of a reverse current through the string; and
- determine a characteristic of the photovoltaic panel resulting from the reverse current.

Clause 83. A method comprising:
- producing by a power system controller a voltage across a string of serially connected power devices;
- transmitting to a power device in the string a plurality of power levels;
- responsive to the voltage level across the string, producing, by the power device in the string, a power level for a photovoltaic panel;
- measuring, by the power device a voltage level across a corresponding photovoltaic panel and a level of a reverse current through the corresponding photovoltaic panel; and
- determining a characteristic of the photovoltaic panel using the measured voltage level and measured reverse current level.

Clause 84. The method of clause 83, further comprising measuring, by a current sensor, a reverse current flowing through the photovoltaic panel.

Clause 85. The method of any one of clauses 83-84, further comprising regulating, using a shunt regulator, a voltage across the downstream terminals of the power device.

Clause 86. The method of clause 85, further comprising, responsive to regulating the voltage across the downstream terminals of the power device, changing a state of an auxiliary enable/disable signal to an enabled state.

Clause 87. The method of any one of clauses 83-84, further comprising regulating, using a flyback converter, a voltage across the downstream terminals of the power device.

Clause 88. The method of clause 87, wherein, responsive to regulating the voltage across the downstream terminals of the power device, changing a state of an auxiliary enable/disable signal to an enabled state.

Clause 89. A method comprising the steps of:
- determining, by a power device, that auxiliary power is being received from a power source;
- receiving, by the power device and from a power system controller, an instruction to provide power from the power source to a photovoltaic panel connected to the power device for determining a characteristic of the photovoltaic panel;
- determining, by the power device and in response to the instruction, that the photovoltaic panel is not producing power; and
- based on a determination that the photovoltaic panel is not producing power, controlling, by the power device, a power converter to provide a revers current to the photovoltaic panel; and
- determining a characteristic of the photovoltaic panel resulting from the reverse current.

Clause 90. The method of clause 89, further comprising capturing an image of the photovoltaic panel.

Clause 91. The method of clause 90, further comprising determining a physical location of the photovoltaic panel using the captured image.

Clause 92. The method of any one of clauses 90-91, further comprising associating the photovoltaic panel with the power device.

Clause 93. The method of any one of clauses 90-92, further comprising analyzing the image to determine a physical state of the photovoltaic panel.

Clause 94. The method of any one of clauses 89-93, further comprising:
  measuring, by a current sensor, a level of the reverse current;
  measuring, by a voltage sensor, a level of the voltage level across terminals of the photovoltaic panel;
  wherein the determining of the characteristic of the photovoltaic panel is based on the level of the reverse current and the level of the reverse voltage.

Clause 95. A method comprising:
  receive, by the power device, an Instruction to harvest power from a photovoltaic panel at a first power level;
  control, by the power system controller an imager to capture a first image of the photovoltaic panel for photoluminescence imaging;
  receive, by the power device, an Instruction to harvest power from a photovoltaic panel at a second power level;
  control, by the power system controller an imager to capture an image of the photovoltaic panel for photoluminescence imaging; and
  analyze, by a processor, the captured first image and the captured second image to characterize the photovoltaic panel.

Clause 96. A system comprising:
  a power system controller;
  a string of serially connected power devices, coupled to the power system controller, a power device of the serially connected power devices comprising:
  first terminals connected to a corresponding photovoltaic panel;
  second terminals serially connecting the power device in the string;
  a power converter connected to the first terminals and to the second terminals;
  a controller configured to control the power converter to selectively enable and disable a reverse current to the corresponding photovoltaic panel; and
  an auxiliary power circuit connected to the first terminals and to the second terminals and configured to receive auxiliary power for the controller via one or more of the first terminals and the second terminals,
  wherein the power system controller is configured to provide power to the power devices via the string for characterizing the corresponding photovoltaic panel based on the reverse current.

Clause 97. The system of clause 96, further comprising an imager connected to the power system controller and configured to capture, based on a signal from the power system controller, an image of the corresponding photovoltaic panel.

Clause 98. The system of any one of clauses 96-97, wherein the power system controller comprises a second power converter,
  wherein the second power converter is configured to convert Direct Current (DC) power from the string to Alternating Current (AC) power; and
  wherein the second power converter is further configured to convert AC power from a power source to DC power, wherein the power system controller is configured to provide the DC power to the string.

Clause 99. The system of any one of clauses 97-98, wherein the power system controller further comprises a communications interface configured to:
  transmit a first signal to the imager; and
  transmit a second signal to the power device, Clause 100. The system of clause 99, wherein the power device further comprises a second communications interface configured to receive the second signal, and
  wherein the controller is configured to control, responsive to receiving the second signal, the power converter to enable the reverse current to the corresponding photovoltaic panel.

Clause 101. The system of any one of clauses 97-100, further comprising a processor, wherein the processor is configured to analyze the image for electroluminescence analysis.

Clause 102. The system of any one of clauses 97-101, further comprising a processor, wherein the processor is configured to analyze the image to determine a physical location of the corresponding photovoltaic panel.

Clause 103. The system of clause 102, wherein the power device is configured to modulate the reverse current to produce a modulated reverse current.

Clause 104. The system of clause 103, wherein the processor is further configured to associated the corresponding photovoltaic panel with the power device based on the image and the modulated reverse current.

Clause 105. The system of any one of clauses 96-104, wherein the power device comprises a switch and diode restricting current from flowing from the second terminals toward the first terminals, and
  wherein the controller is configured to transition from disabling to enabling the reverse current to the corresponding photovoltaic panel by controlling the switch to bypass the diode; and
  wherein the auxiliary power circuit comprises an auxiliary power converter.

Clause 106. The system of any one of clauses 96-105, wherein the auxiliary power circuit comprises adjustable shunt regulator and a controller coupled to the adjustable shunt regulator,
  wherein the adjustable shunt regulator is coupled to the second terminals, and
  wherein the controller is configured to control the adjustable shunt regulator to regulate a voltage level between the second terminals based on a measurement of a level of the voltage level between the second terminals.

Clause 107. The system of any one of clauses 96-106, wherein the auxiliary power circuit comprises a flyback converter and an auxiliary controller coupled to the flyback converter,
  wherein the flyback converter comprises a coupled inductor coupled and a switch, wherein primary windings of the coupled inductor are connected in series with the switch to the second terminals, and secondary windings of the coupled inductor are connected to the first terminals, and wherein the auxiliary controller is configured to control the flyback converter to regulate a voltage level between the second terminals based on a measurement of the voltage level between the second terminals.

Clause 108. The system of any one of clauses 96-107, wherein, responsive to a voltage across the second terminals, the controller is configured to control the power converter to provide a determined power level to the corresponding photovoltaic panel,
wherein the power device further comprises a current sensor configured to measure a level of the reverse current corresponding to the determined power level, and
wherein the power device further comprises a voltage sensor, configured to measure a level of a voltage across the first terminals,
wherein the power system controller determines a characteristic of the corresponding photovoltaic panel based on the level of the voltage across the first terminals, and the level of the reverse current.

Clause 109. The system of any one of clauses 96-108, wherein, responsive to a voltage from the power source, across the second terminals, the controller is configured to control the power converter to provide a path for current to flow between the second terminals and the first terminals,
wherein the power device further comprises:
a current sensor configured to measure a level of the reverse current; and
a voltage sensor, configured to measure a level of the voltage across the second terminals,
wherein the power system controller determines the characteristic of the corresponding photovoltaic panel based on the level of the voltage across the second terminals, and the level of the reverse current.

Clause 110. A method comprising the steps of:
determining, by a power device, that auxiliary power is being received from a power source;
receiving, by the power device and from a power system controller, an instruction to provide power from the power source to a photovoltaic panel connected to the power device for determining a characteristic of the photovoltaic panel;
determining, by the power device and in response to the instruction, that the photovoltaic panel is not producing power; and
based on a determination that the photovoltaic panel is not producing power, controlling, by the power device, a power converter to provide a revers current to the photovoltaic panel; and
determining the characteristic of the photovoltaic panel resulting from the reverse current.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A system comprising:
a power system controller;
a string of serially connected power devices, coupled to the power system controller, a power device of the serially connected power devices comprising:
first terminals connected to a corresponding photovoltaic panel;
second terminals serially connecting the power device in the string;
a power converter connected to the first terminals and to the second terminals;
a controller configured to control the power converter to selectively enable and disable a reverse current to the corresponding photovoltaic panel; and
an auxiliary power circuit connected to the first terminals and to the second terminals, and configured to receive auxiliary power for the controller via one or more of the first terminals and the second terminals,
wherein the power system controller is configured to provide power to the power devices via the string for characterizing the corresponding photovoltaic panel based on the reverse current.

2. The system of claim 1, further comprising an imager connected to the power system controller and configured to capture, based on a signal from the power system controller, an image of the corresponding photovoltaic panel.

3. The system of claim 2, wherein the imager is mounted on an Unmanned Aerial Vehicle (UAV).

4. The system of claim 2, wherein the imager is mounted on a pole over the corresponding photovoltaic panel.

5. The system of claim 2, wherein the power system controller further comprises a communications interface configured to:
transmit a first signal to the imager; and
transmit a second signal to the power device.

6. The system of claim 5, wherein the power device further comprises a second communications interface configured to receive the second signal, and
wherein the controller is configured to control, responsive to receiving the second signal, the power converter to enable the reverse current to the corresponding photovoltaic panel.

7. The system of claim 2, further comprising a processor, wherein the processor is configured to analyze the image for electroluminescence analysis.

8. The system of claim 2, further comprising a processor, wherein the processor is configured to analyze the image to determine a physical location of the corresponding photovoltaic panel.

9. The system of claim 8, wherein the power device is configured to modulate the reverse current to produce a modulated reverse current.

10. The system of claim 9, wherein the processor is further configured to associate the corresponding photovoltaic panel with the power device based on the image and the modulated reverse current.

11. The system of claim 1, wherein the power system controller comprises a second power converter,
wherein the second power converter is configured to convert Direct Current (DC) power from the string to Alternating Current (AC) power.

12. The system of claim 11, wherein the second power converter is further configured to convert AC power from a power source to DC power, wherein the power system controller is configured to provide the DC power to the string.

13. The system of claim 1, wherein the power device comprises: a switch and a diode restricting current from flowing from the second terminals toward the first terminals, and wherein the controller is configured to transition from disabling to enabling the reverse current to the corresponding photovoltaic panel by controlling the switch to bypass the diode.

14. The system of claim 1, wherein the auxiliary power circuit comprises an auxiliary power converter.

15. The system of claim 1, wherein the auxiliary power circuit comprises adjustable shunt regulator and a controller coupled to the adjustable shunt regulator,
   wherein the adjustable shunt regulator is coupled to the second terminals, and
   wherein the controller is configured to control the adjustable shunt regulator to regulate a voltage level between the second terminals based on a measurement of a level of the voltage level between the second terminals.

16. The system of claim 1, wherein the auxiliary power circuit comprises a flyback converter and an auxiliary controller coupled to the flyback converter,
   wherein the flyback converter comprises a coupled inductor and a switch, wherein primary windings of the coupled inductor are connected in series with the switch to the second terminals, and secondary windings of the coupled inductor are connected to the first terminals,
   wherein the auxiliary controller is configured to control the flyback converter to regulate a voltage level between the second terminals based on a measurement of the voltage level between the second terminals.

17. The system of claim 1, wherein, responsive to a voltage across the second terminals, the controller is configured to control the power converter to provide a determined power level to the corresponding photovoltaic panel,
   wherein the power device further comprises a current sensor configured to measure a level of the reverse current corresponding to the determined power level, and
   wherein the power device further comprises a voltage sensor configured to measure a level of a voltage across the first terminals, and
   wherein the power system controller determines a characteristic of the corresponding photovoltaic panel based on the level of the voltage across the first terminals, and the level of the reverse current.

18. The system of claim 1, wherein, responsive to a voltage across the second terminals, the controller is configured to control the power converter to provide a path for current to flow between the second terminals and the first terminals.

19. The system of claim 18, wherein the power device further comprises:
   a current sensor configured to measure a level of the reverse current; and
   a voltage sensor, configured to measure a level of the voltage across the second terminals,
   wherein the power system controller determines a characteristic of the corresponding photovoltaic panel based on the level of the voltage across the second terminals, and the level of the reverse current.

* * * * *